US012650215B2

(12) United States Patent
Takacs et al.

(10) Patent No.: US 12,650,215 B2
(45) Date of Patent: Jun. 9, 2026

(54) MULTI-FUNCTION ACTIVE ACCESSORIES FOR LED LAMPS

(71) Applicant: Korrus, Inc., Los Angeles, CA (US)

(72) Inventors: Laszlo Takacs, Fremont, CA (US); Wilfred A. Martis, San Francisco, CA (US); Frank Shum, Sunnyvale, CA (US); Artem Mishin, Pacifica, CA (US); Vinod Khosla, Fremont, CA (US); Radha Nayak, Fremont, CA (US); Michael Ragan Krames, Mountain View, CA (US)

(73) Assignee: Korrus, Inc., Los Angeles, CA (US)

( * ) Notice: Subject to any disclaimer, the term of this patent is extended or adjusted under 35 U.S.C. 154(b) by 0 days.

(21) Appl. No.: 18/096,399

(22) Filed: Jan. 12, 2023

(65) Prior Publication Data

US 2023/0313977 A1 Oct. 5, 2023

Related U.S. Application Data

(63) Continuation of application No. 16/550,996, filed on Aug. 26, 2019, now abandoned, which is a (Continued)

(51) Int. Cl.

| | |
|---|---|
| ***F21V 17/10*** | (2006.01) |
| ***F21V 5/04*** | (2006.01) |
| ***F21V 17/00*** | (2006.01) |
| ***H05B 47/105*** | (2020.01) |
| ***H05B 47/11*** | (2020.01) |
| ***H05B 47/115*** | (2020.01) |
| ***H05B 47/12*** | (2020.01) |

(Continued)

(52) U.S. Cl.

CPC .............. *F21V 17/105* (2013.01); *F21V 5/04* (2013.01); *F21V 17/002* (2013.01); *H05B 47/105* (2020.01); *H05B 47/19* (2020.01); *H05B 47/22* (2020.01); *H05B 47/11* (2020.01); *H05B 47/115* (2020.01); *H05B 47/12* (2020.01)

(58) Field of Classification Search

CPC ......... F21V 17/002; F21V 17/105; F21V 5/04

See application file for complete search history.

(56) References Cited

U.S. PATENT DOCUMENTS

| | | | |
|---|---|---|---|
| 2,953,970 | A | 9/1960 | Maynard |
| 3,283,143 | A | 11/1966 | Gosnell |

(Continued)

FOREIGN PATENT DOCUMENTS

| | | | |
|---|---|---|---|
| CN | 1849707 | | 10/2006 |
| CN | 2826150 | Y | 10/2006 |

(Continued)

OTHER PUBLICATIONS

Innovation Q+ NPL Search (Year: 2023).*

(Continued)

*Primary Examiner* — Anabel Ton

(74) *Attorney, Agent, or Firm* — FisherBroyles LLP

(57) ABSTRACT

Apparatus and methods of attaching accessories to LED lamps and for providing active accessories in LED lamps are disclosed. The active accessories include single-function active accessories as well as multi-function active accessories.

2 Claims, 48 Drawing Sheets

Related U.S. Application Data continuation of application No. 14/543,164, filed on Nov. 17, 2014, now Pat. No. 10,436,422, which is a continuation-in-part of application No. 14/336,276, filed on Jul. 21, 2014, now Pat. No. 9,995,439, which is a continuation-in-part of application No. 14/014,112, filed on Aug. 29, 2013, now Pat. No. 9,109,760, which is a continuation-in-part of application No. 13/915,432, filed on Jun. 11, 2013, now abandoned, said application No. 14/336,276 is a continuation-in-part of application No. 13/909,752, filed on Jun. 4, 2013, now Pat. No. 8,888,332, and a continuation-in-part of application No. 13/894,203, filed on May 14, 2013, now Pat. No. 9,360,190, which is a continuation-in-part of application No. 13/865,760, filed on Apr. 18, 2013, now Pat. No. 9,310,052.

(60) Provisional application No. 61/776,173, filed on Mar. 11, 2013, provisional application No. 61/707,757, filed on Sep. 28, 2012, provisional application No. 61/659,386, filed on Jun. 13, 2012, provisional application No. 61/655,894, filed on Jun. 5, 2012, provisional application No. 61/646,766, filed on May 14, 2012.

(51) Int. Cl.

*H05B 47/19* (2020.01)
*H05B 47/21* (2020.01)

(56) References Cited

U.S. PATENT DOCUMENTS

| | | | | |
|---|---|---|---|---|
| 3,593,021 | A | 7/1971 | Auerbach | |
| 3,621,233 | A | 11/1971 | Harry, Jr. | |
| 3,874,443 | A | 4/1975 | Bayer | |
| 4,165,919 | A | 8/1979 | Little | |
| 4,225,904 | A | 9/1980 | Linder | |
| 4,279,463 | A | 7/1981 | Little | |
| 4,293,892 | A | 10/1981 | Plummer | |
| 5,005,109 | A | 4/1991 | Carleton | |
| 5,764,674 | A | 6/1998 | Hibbs-Brenner | |
| 6,116,758 | A | 9/2000 | Lin | |
| 6,204,602 | B1 | 3/2001 | Yang | |
| 6,501,154 | B2 | 12/2002 | Morita | |
| D471,881 | S | 3/2003 | Hegde | |
| 6,577,080 | B2 | 6/2003 | Lys | |
| 6,787,999 | B2 * | 9/2004 | Stimac | F21K 9/238 362/800 |
| 6,864,572 | B2 | 3/2005 | Lee | |
| 6,889,006 | B2 | 5/2005 | Kobayashi | |
| 6,942,368 | B1 | 9/2005 | Kane | |
| 6,964,877 | B2 | 11/2005 | Chen | |
| 7,207,694 | B1 | 4/2007 | Petrick | |
| D545,457 | S | 6/2007 | Chen | |
| 7,311,417 | B1 | 12/2007 | Lemke | |
| 7,318,659 | B2 | 1/2008 | Demarest | |
| 7,344,279 | B2 | 3/2008 | Mueller | |
| 7,388,751 | B2 | 6/2008 | Hood | |
| 7,431,071 | B2 | 10/2008 | Wenger | |
| D581,583 | S | 11/2008 | Peng | |
| 7,458,706 | B1 | 12/2008 | Liu | |
| 7,488,097 | B2 | 2/2009 | Reisenauer | |
| 7,506,998 | B2 | 3/2009 | Ansems | |
| D592,613 | S | 5/2009 | Plonski | |
| 7,631,987 | B2 | 12/2009 | Wei | |
| 7,637,635 | B2 | 12/2009 | Xiao | |
| 7,658,528 | B2 | 2/2010 | Hoelen | |
| 7,663,229 | B2 | 2/2010 | Lu | |
| 7,674,015 | B2 | 3/2010 | Chien | |
| 7,712,922 | B2 | 5/2010 | Hacker | |
| D618,634 | S | 6/2010 | Lin | |
| 7,744,259 | B2 | 6/2010 | Walczak | |
| D619,551 | S | 7/2010 | Lin | |
| 7,748,870 | B2 | 7/2010 | Chang | |
| 7,753,107 | B2 | 7/2010 | Zhou | |
| 7,800,119 | B2 | 9/2010 | He | |
| 7,824,075 | B2 | 11/2010 | Maxik | |
| 7,824,077 | B2 | 11/2010 | Chen | |
| 7,889,421 | B2 | 2/2011 | Narendran | |
| 7,972,040 | B2 | 7/2011 | Li | |
| 7,993,025 | B2 | 8/2011 | Chiu | |
| 7,993,031 | B2 | 8/2011 | Grajcar | |
| 7,997,774 | B2 | 8/2011 | Liddle | |
| 8,011,794 | B1 | 9/2011 | Sivertsen | |
| 8,042,969 | B2 | 10/2011 | Paik | |
| 8,049,122 | B2 | 11/2011 | Watford | |
| D652,564 | S | 1/2012 | Maxik | |
| 8,153,475 | B1 | 4/2012 | Shum | |
| 8,157,422 | B2 | 4/2012 | Paik | |
| 8,164,237 | B2 | 4/2012 | Wen | |
| 8,206,015 | B2 | 6/2012 | Cho | |
| D662,899 | S | 7/2012 | Shum | |
| D662,900 | S | 7/2012 | Shum | |
| 8,215,800 | B2 | 7/2012 | Plank | |
| 8,220,970 | B1 | 7/2012 | Khazi | |
| 8,227,962 | B1 | 7/2012 | Su | |
| 8,242,669 | B2 | 8/2012 | Qiu | |
| 8,272,762 | B2 | 9/2012 | Maxik | |
| 8,324,835 | B2 | 12/2012 | Shum | |
| D674,960 | S | 1/2013 | Chen | |
| 8,390,207 | B2 | 3/2013 | Dowling | |
| 8,405,947 | B1 | 3/2013 | Green | |
| 8,414,151 | B2 | 4/2013 | Allen | |
| 8,525,396 | B2 | 9/2013 | Shum | |
| 8,567,999 | B2 | 10/2013 | Paik | |
| 8,579,470 | B1 | 11/2013 | Leahy | |
| D694,722 | S | 12/2013 | Shum | |
| 8,618,742 | B2 | 12/2013 | Shum | |
| 8,643,257 | B2 | 2/2014 | Shum | |
| 8,651,711 | B2 | 2/2014 | Rudisill | |
| 8,680,787 | B2 | 3/2014 | Veskovic | |
| 8,746,918 | B1 | 6/2014 | Rubino | |
| 8,752,975 | B2 | 6/2014 | Rubino | |
| 8,803,452 | B2 | 8/2014 | Shum | |
| 8,829,774 | B1 | 9/2014 | Shum | |
| 8,884,501 | B2 | 11/2014 | Cho | |
| 8,884,517 | B1 | 11/2014 | Shum | |
| 8,888,332 | B2 | 11/2014 | Martis | |
| 10,619,839 | B2 * | 4/2020 | Jiang | F21K 9/233 |
| 2001/0021073 | A1 | 9/2001 | Leggo | |
| 2002/0014535 | A1 | 2/2002 | Okada | |
| 2002/0119702 | A1 | 8/2002 | Chen | |
| 2003/0039122 | A1 | 2/2003 | Cao | |
| 2003/0058650 | A1 | 3/2003 | Shih | |
| 2003/0107885 | A1 | 6/2003 | Galli | |
| 2003/0183835 | A1 | 10/2003 | Moku | |
| 2003/0197807 | A1 | 10/2003 | Wu | |
| 2004/0222427 | A1 | 11/2004 | Hsiung | |
| 2004/0264195 | A1 | 12/2004 | Chang | |
| 2005/0122690 | A1 | 6/2005 | Hood | |
| 2005/0174780 | A1 | 8/2005 | Park | |
| 2005/0214992 | A1 | 9/2005 | Chakraborty | |
| 2006/0028310 | A1 | 2/2006 | Asano | |
| 2006/0175045 | A1 | 8/2006 | Chen | |
| 2006/0202851 | A1 | 9/2006 | Cash | |
| 2006/0208091 | A1 | 9/2006 | Nishizawa | |
| 2006/0262545 | A1 | 11/2006 | Piepgras | |
| 2006/0274529 | A1 | 12/2006 | Cao | |
| 2007/0007898 | A1 | 1/2007 | Bruning | |
| 2007/0158797 | A1 | 7/2007 | Lee | |
| 2007/0228999 | A1 | 10/2007 | Kit | |
| 2007/0284564 | A1 | 12/2007 | Biwa | |
| 2007/0285921 | A1 | 12/2007 | Zulim | |
| 2008/0002444 | A1 | 1/2008 | Shekhawat | |
| 2008/0049399 | A1 | 2/2008 | Lu | |
| 2008/0080137 | A1 | 4/2008 | Otsuki | |
| 2008/0123341 | A1 | 5/2008 | Chiu | |
| 2008/0142781 | A1 | 6/2008 | Lee | |
| 2008/0158887 | A1 | 7/2008 | Zhu | |
| 2008/0164489 | A1 | 7/2008 | Schmidt | |
| 2008/0266866 | A1 | 10/2008 | Tsai | |

(56) References Cited

U.S. PATENT DOCUMENTS

2008/0272714 A1 11/2008 Noble
2008/0315228 A1 12/2008 Krames
2009/0027878 A1 1/2009 Metz
2009/0072252 A1 3/2009 Son
2009/0134421 A1 5/2009 Negley
2009/0154166 A1 6/2009 Zhang
2009/0161356 A1 6/2009 Negley
2009/0175043 A1 7/2009 Frick
2009/0194252 A1 8/2009 Lee
2009/0195186 A1 8/2009 Guest
2009/0231895 A1 9/2009 Hu
2009/0237940 A1 9/2009 Wu
2009/0244899 A1 10/2009 Chyn
2009/0303738 A1 12/2009 Manfred
2009/0303762 A1 12/2009 Jang
2010/0001652 A1 1/2010 Damsleth
2010/0060130 A1 3/2010 Li
2010/0061076 A1 3/2010 Mandy
2010/0066266 A1 3/2010 Huang
2010/0091487 A1 4/2010 Shin
2010/0118148 A1 5/2010 Lee
2010/0148145 A1 6/2010 Ishibashi
2010/0207502 A1 8/2010 Cao
2010/0207534 A1 8/2010 Dowling
2010/0238001 A1 9/2010 Veskovic
2010/0244648 A1 9/2010 Yoo
2010/0259931 A1 10/2010 Chemel
2010/0264799 A1 10/2010 Liu
2010/0277068 A1 11/2010 Broitzman
2010/0290229 A1 11/2010 Meyer, Sr.
2010/0320499 A1 12/2010 Catalano
2011/0018418 A1 1/2011 Yoo
2011/0032708 A1 2/2011 Johnston
2011/0056429 A1 3/2011 Raring
2011/0074270 A1 3/2011 Van De Ven
2011/0095686 A1 4/2011 Falicoff
2011/0098953 A1 4/2011 Jonsson
2011/0140586 A1 6/2011 Wang
2011/0169406 A1 7/2011 Weekamp
2011/0175510 A1 7/2011 Rains, Jr.
2011/0175528 A1 7/2011 Rains, Jr.
2011/0182065 A1 7/2011 Negley
2011/0198979 A1 8/2011 Shum
2011/0204763 A1 8/2011 Shum
2011/0204779 A1 8/2011 Shum
2011/0204780 A1 8/2011 Shum
2011/0215699 A1 9/2011 Le
2011/0242823 A1 10/2011 Tracy
2011/0260945 A1 10/2011 Karasawa
2011/0298371 A1 12/2011 Brandes
2011/0309734 A1 12/2011 Lin
2012/0018754 A1 1/2012 Lowes
2012/0043552 A1 2/2012 David
2012/0043913 A1 2/2012 Melanson
2012/0161626 A1 6/2012 Van De Ven
2012/0187830 A1 7/2012 Shum
2012/0212960 A1 8/2012 Rodriguez
2012/0215325 A1 8/2012 Wu
2012/0293062 A1 11/2012 Pickard
2012/0314403 A1 12/2012 Kennedy
2012/0319148 A1 12/2012 Donofrio
2012/0319597 A1 12/2012 Park
2012/0320579 A1 12/2012 Ferguson
2012/0326882 A1 12/2012 Behm
2013/0058099 A1 3/2013 Shum
2013/0235566 A1* 9/2013 Fan ....................... F21V 7/0008
362/187
2013/0322089 A1 12/2013 Martis
2013/0329411 A1* 12/2013 Windom .................. F21L 4/00
362/208
2013/0343062 A1 12/2013 Shum
2014/0028214 A1 1/2014 Mazumdar
2014/0091697 A1 4/2014 Shum
2014/0146545 A1 5/2014 Shum
2014/0175966 A1 6/2014 Tan
2014/0268750 A1 9/2014 Lui
2014/0313749 A1 10/2014 Shum

FOREIGN PATENT DOCUMENTS

CN 200975612 11/2007
CN 101608746 12/2009
CN 102149960 8/2011
CN 203099372 U 7/2013
JP H02028541 1/1990
JP 2000517465 12/2000
JP 2005302483 10/2005
JP 2011501351 1/2011
KR 100981274 B1 9/2010
TW M425985 4/2012
WO 2009048956 4/2009
WO 2009149263 12/2009
WO 2009156969 A2 12/2009
WO 2011054716 5/2011

OTHER PUBLICATIONS

Center for American Progress (Year: 2011).*
'Thermal Properties of Plastic Materials', Professional Plastics, Aug. 21, 2010, pp. 1-4.
"Candela-Class High-Brightness InGaN/AlGaN Double-Heterostructure Blue-Light-Emitting Diodes," S. Nakamura, Appl. Phys. Lett. vol. 64, No. 13, Mar. 1994, pp. 1687-1689.
Anurag Tyagi et al."Partial strain relaxation via misfit dislocation generation at heterointerfaces in (Al,In)GaN epitaxial layers grown on semipolar (1122) GaN free standing substrate", App. Phys. Lett 95. 251905 (2009) 1 page.
Atmel AT25F512 datasheet, 18 pages.
CFL Ballast IC Drive LED, www.placardshop.com, Blog, May 22, 2012, 3 pgs.
Communication from the Chinese Patent Office re 2011800543977 dated Jan. 7, 2015 (13 pages).
Communication from the Chinese Patent Office re 201210322687.1 dated Mar. 3, 2014, 13 pages.
Communication from the Japanese Patent Office re 2012191931, dated Oct. 11, 2013, 4 pages.
Communication from the Japanese Patent Office re 2013532992 dated May 1, 2014 (6 pages).
Haskell et al., 'Defect Reduction in (1100) m-plane gallium nitride via lateral epitaxial overgrowth by hydride vapor phase epitaxy', Applied Physics Letters 86, 111917 (2005), pp. 1-3.
International Preliminary Report & Written Opinion of PCT Application No. PCT/US2011/060030 dated Mar. 21, 2012, 11 pgs. total.
Rausch, 'Use a CFL ballast to drive LEDs', www.edn.com, Apr. 26, 2007, pp. 1-2.

* cited by examiner

13A00

13B00

1400

1800

1400

1500

1600

1900

2100

MULTI-FUNCTION ACTIVE ACCESSORIES FOR LED LAMPS

This application is a continuation of U.S. application Ser. No. 14/543,164, filed Nov. 17, 2014, which is a continuation-in-part of U.S. application Ser. No. 14/336,276, filed on Jul. 21, 2014, which is incorporated by reference in its entirety. U.S. application Ser. No. 14/336,276 is a continuation-in-part of U.S. application Ser. No. 13/894,203 filed on May 14, 2013, which is a continuation-in-part of U.S. application Ser. No. 13/865,760 filed on Apr. 18, 2013, which claims benefit under 35 U.S.C. § 119(e) to U.S. Provisional Application No. 61/707,757 filed on Sep. 28, 2012, and U.S. application Ser. No. 13/894,203 claims the benefit under 35 U.S.C. § 119(e) to U.S. Provisional Application No. 61/646,766 filed on May 14, 2012; and U.S. application Ser. No. 14/336,276 is a continuation-in-part of U.S. application Ser. No. 13/909,752 filed on Jun. 4, 2013, which claims benefit under 35 U.S.C. § 119(e) to U.S. Provisional Application No. 61/776,173 filed on Mar. 11, 2013, and to U.S. Provisional Application No. 61/655,894 filed on Jun. 5, 2012; and U.S. application Ser. No. 14/336,276 is a continuation-in-part of U.S. application Ser. No. 14/014,112 filed on Aug. 29, 2013, which is a continuation-in-part of U.S. application Ser. No. 13/915,432 filed on Jun. 11, 2013, which claims benefit under 35 U.S.C. § 119(e) to U.S. application Ser. No. 61/659,386 filed on Jun. 13, 2012, each of which is incorporated by reference in its entirety.

FIELD

The disclosure relates to the field of LED illumination and more particularly to techniques for making and using active accessories for LED lamps.

BACKGROUND

Accessories for standard halogen lamps such as MR16 lamps include, for example, diffusers, color filters, polarizers, linear dispersion, and baffles. Such accessories are commercially available from companies such as Abrisa, Rosco, and Lee Filters. These accessories can be used to control the quality of light including elimination of glare, to change the color temperature of the lamp, or to tailor a beam profile for a particular application.

Generally, accessories for halogen lamps are required to withstand high temperature and may be made of glass, and often require special mechanical holders or fixtures to incorporate with the halogen lamp. Often, such halogen lamp accessories require disassembly of the lamp from the fixture to incorporate the accessory into the fixture. This set of disadvantages results in the accessories having high costs and being cumbersome to install.

At the same time, miniaturized electronics have become very small and relatively inexpensive, thus providing an opportunity to deploy miniaturized electronics adapted as active accessories in conjunction with LED lamps.

Therefore, there is a need for improved approaches for configuring selections of one or more active and/or passive accessories to mate with LED lamps.

SUMMARY

This disclosure relates to apparatus allowing for simple and low cost implementation of accessories for LED lamps that can be used to retrofit existing fixtures. In other words, the accessories disclosed herein are compatible with fixtures that may not have been designed to be used with such accessories. In certain embodiments, disassembly of LED lamps is not necessary for installation of the accessories.

Many of the embodiments herein address use of an active electronic component that is integrated into or used with an LED lamp. Some implement electronic circuitry in a base, and some implement electronic circuitry (including connectivity) in a "smart" adapter. Examples of such embodiments are included in the appended figures and in the description.

BRIEF DESCRIPTION OF THE DRAWINGS

Those skilled in the art will understand that the drawings, described herein, are for illustration purposes only.

DETAILED DESCRIPTION

Figure 1A:
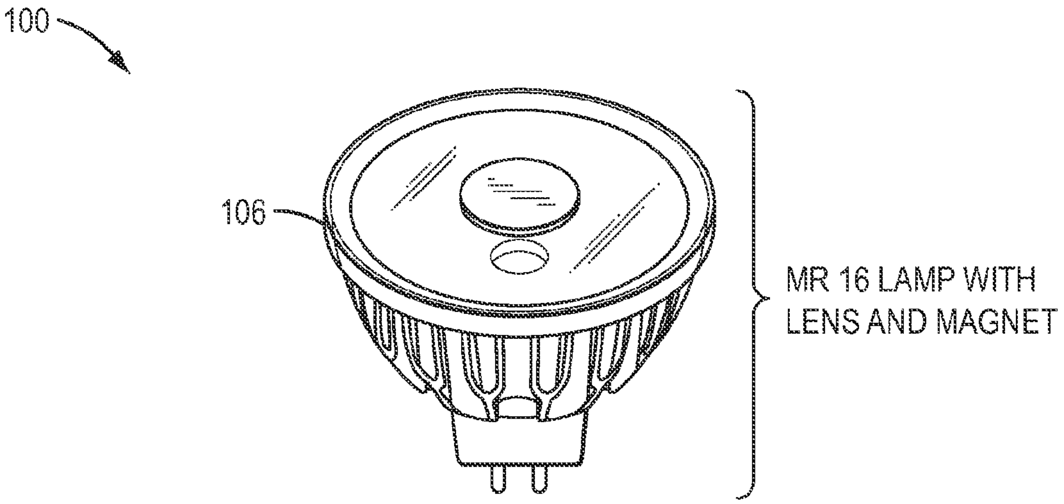
FIG. 1A depicts an assembled LED lamp with an accessory, according to certain embodiments.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. In addition, the articles "a" and "an" as used in this application and the appended claims should generally be construed to mean "one or more" unless specified otherwise or is clear from the context to be directed to a singular form.

"Accessory" or "accessories" includes any mechanical or electro-mechanical component or electrical component or fixture to be mated to a lamp. In certain embodiments, an accessory comprises a thin, optically transparent film, sheet, or plate.

Reference is now made in detail to certain embodiments. The disclosed embodiments are not intended to be limiting of the claims.

Still further, there are many configurations for the base of LED lamps beyond the depicted GU5.3 MR16 lamp (e.g., see FIG. 3A) that may be used with embodiments provided by the present disclosure. For example Table 3 gives standards (see "Designation") and corresponding characteristics of the base of the lamp.

TABLE 1

| LED lamp standards. | | | |
|---|---|---|---|
| Desig-nation | Base Diameter (crest of thread) | Name | IEC 60061-1 Standard Sheet |
| | 5 mm | Lilliput Edison Screw (LES) | 7004-25 |
| E10 | 10 mm | Miniature Edison Screw (MES) | 7004-22 |
| E11 | 11 mm | Mini-Candelabra Edison Screw (mini-can) | (7004-6-1) |
| E12 | 12 mm | Candelabra Edison Screw (CES) | 7004-28 |
| E14 | 14 mm | Small Edison Screw (SES) | 7004-23 |
| E17 | 17 mm | Intermediate Edison Screw (IES) | 7004-26 |
| E26 | 26 mm | [Medium] (one-inch) Edison Screw (ES or MES) | 7004-21A-2 |
| E27 | 27 mm | [Medium] Edison Screw (ES) | 7004-21 |
| E29 | 29 mm | [Admedium] Edison Screw (ES) | |
| E39 | 39 mm | Single-contact (Mogul) Giant Edison Screw (GES) | 7004-24-A1 |
| E40 | 40 mm | (Mogul) Giant Edison Screw (GES) | 7004-24 |

Additionally, there are many G-type lamps as given in the following List 1:

List 1: G4, GU4, GY4, GZ4, G5, G5.3, G5.3-4.8, GU5.3, GX5.3, GY5.3, G6.35, GX6.35, GY6.35, GZ6.35, G8, GY8.6, G9, G9.5, GU10, G12, G13, G23, GU24, G38, GX53.

In certain lamps such as an ER lamp, the lens is referred to as a shield. Thus, in certain embodiments a lens includes shields, which do not substantially serve to divert light.

Accessories and methods of attached accessories disclosed herein may be used with any suitable LED lamp configuration such as, for example, any of those disclosed in Table 1, and/or those configurations disclosed in Table 2, and/or those configurations disclosed in Table 3 and/or those configurations disclosed in List 1.

Figure 1B:
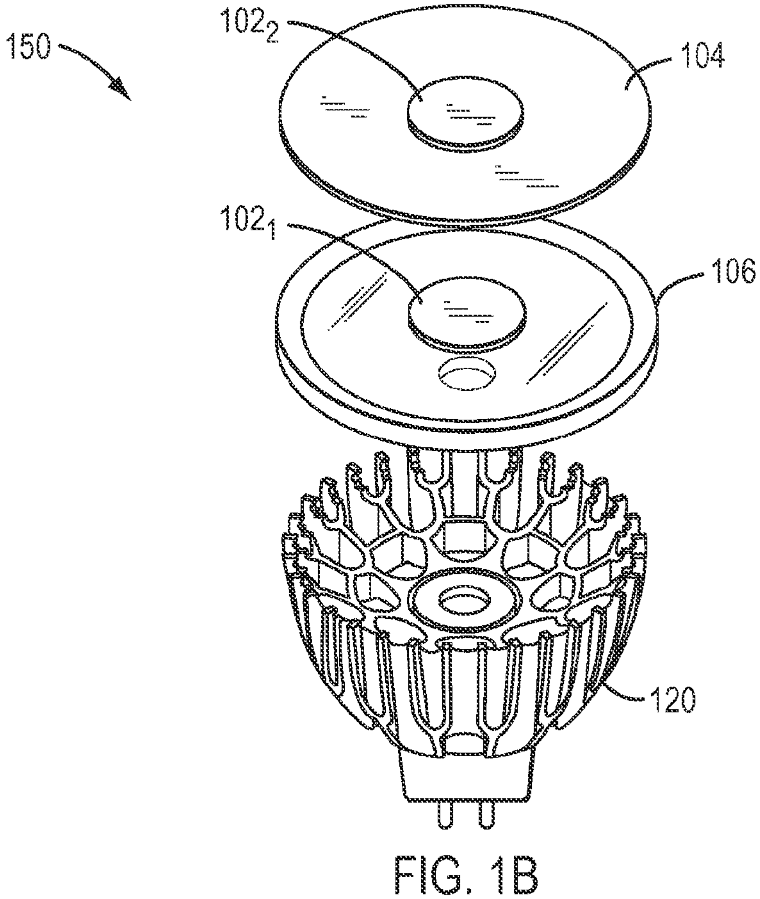
FIG. 1B shows an exploded view of an LED lamp with accessories according to certain embodiments.
Figure 2:
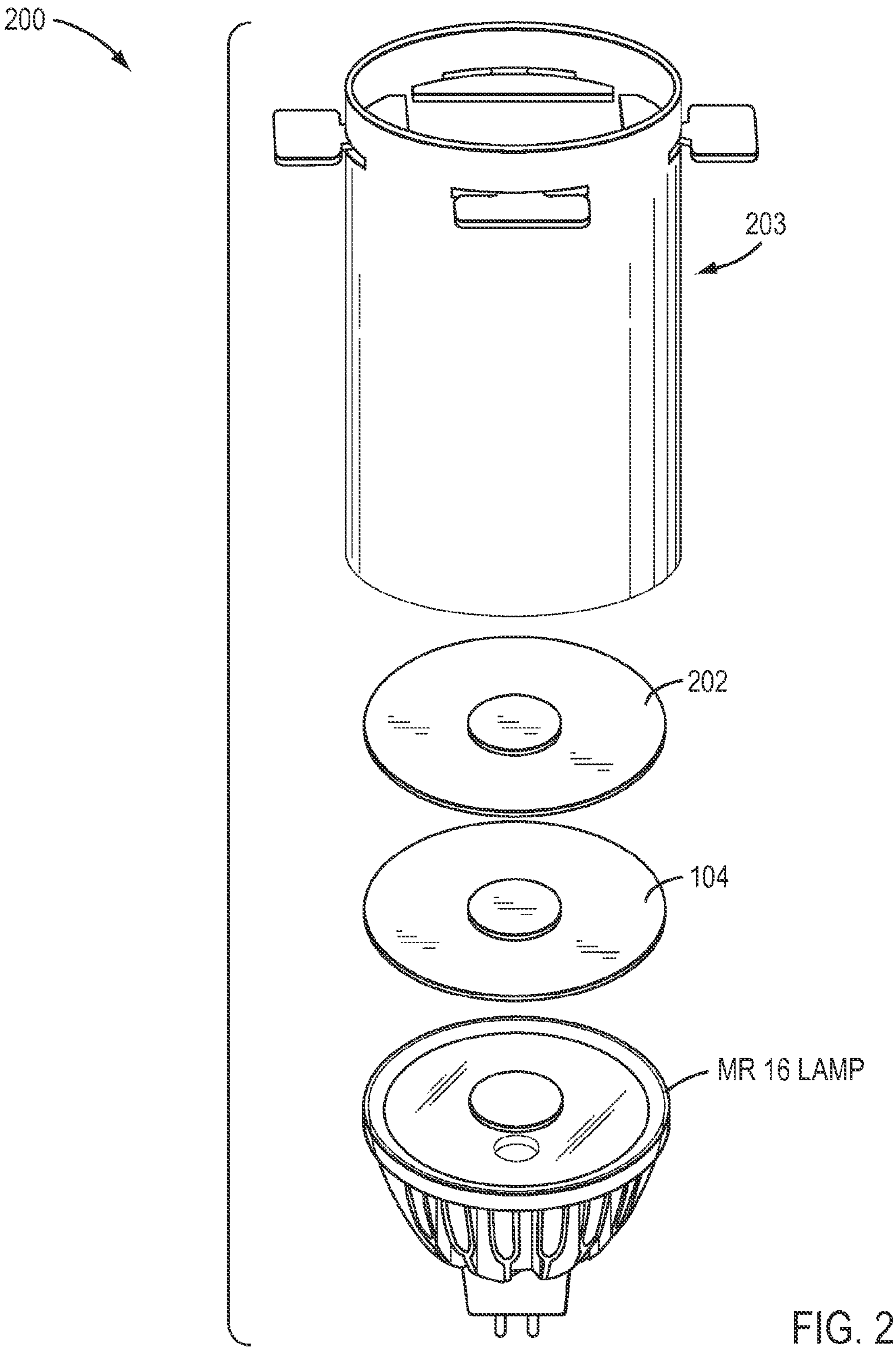
FIG. 2 shows an exploded view of an LED lamp with multiple accessories, according to certain embodiments.

While FIG. 1 and FIG. 2 describe accessories attached at the central axis of the lamp/lens, the accessories can also be attached, mechanically or magnetically, at other locations provided that sufficient light output is still obtained. For example, the attachment point may be made near the perimeter of the lens or at the perimeter of the lamp form factor envelope. Various embodiments wherein the accessories are mechanically or magnetically attached at other locations are disclosed herein.

Figure 3A:
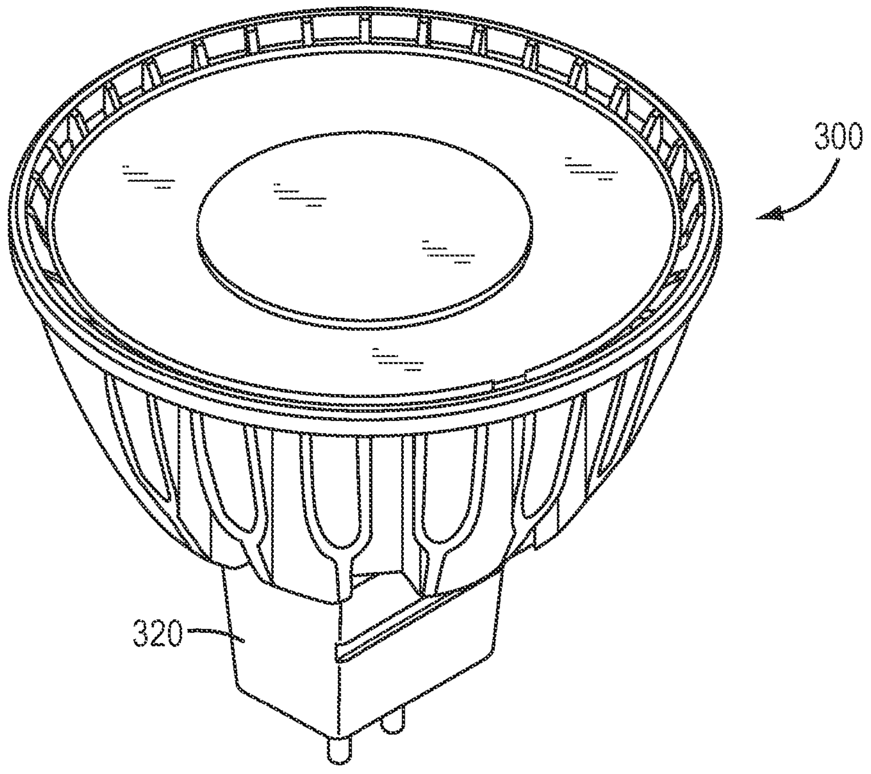
FIG. 3A illustrates an embodiment provided by the present disclosure.

FIG. 3A illustrates an embodiment of the present disclosure. More specifically, FIG. 3A illustrate embodiments of MR16 form factor-compatible LED lighting source 300 having a GU 5.3 form factor-compatible base 320. GU 5.3 MR16 lighting sources typically operate at 12 volts, alternating current (e.g., VAC). In the examples illustrated, LED lighting source 300 is configured to provide a spot beam angle less than 15 degrees. In other embodiments, LED lighting sources may be configured to provide a flood light having a beam angle greater than 15 degrees. In certain embodiments, an LED assembly may be used within LED lighting source 300. Advanced LED assemblies are currently under development by the assignee of the present patent application. In various embodiments, LED lighting source 300 may provide a peak output of greater than about 1,000 candelas (or greater than 100 lumens). For certain high output applications, the center beam candle power may be greater than 10,000 candela or 100,000 candela with associated light levels greater than 1000 lumens or 5000 lumens. Various embodiments of the present disclosure achieve the same or higher brightness than conventional halogen bulb MR16 lights.

Figure 3B:
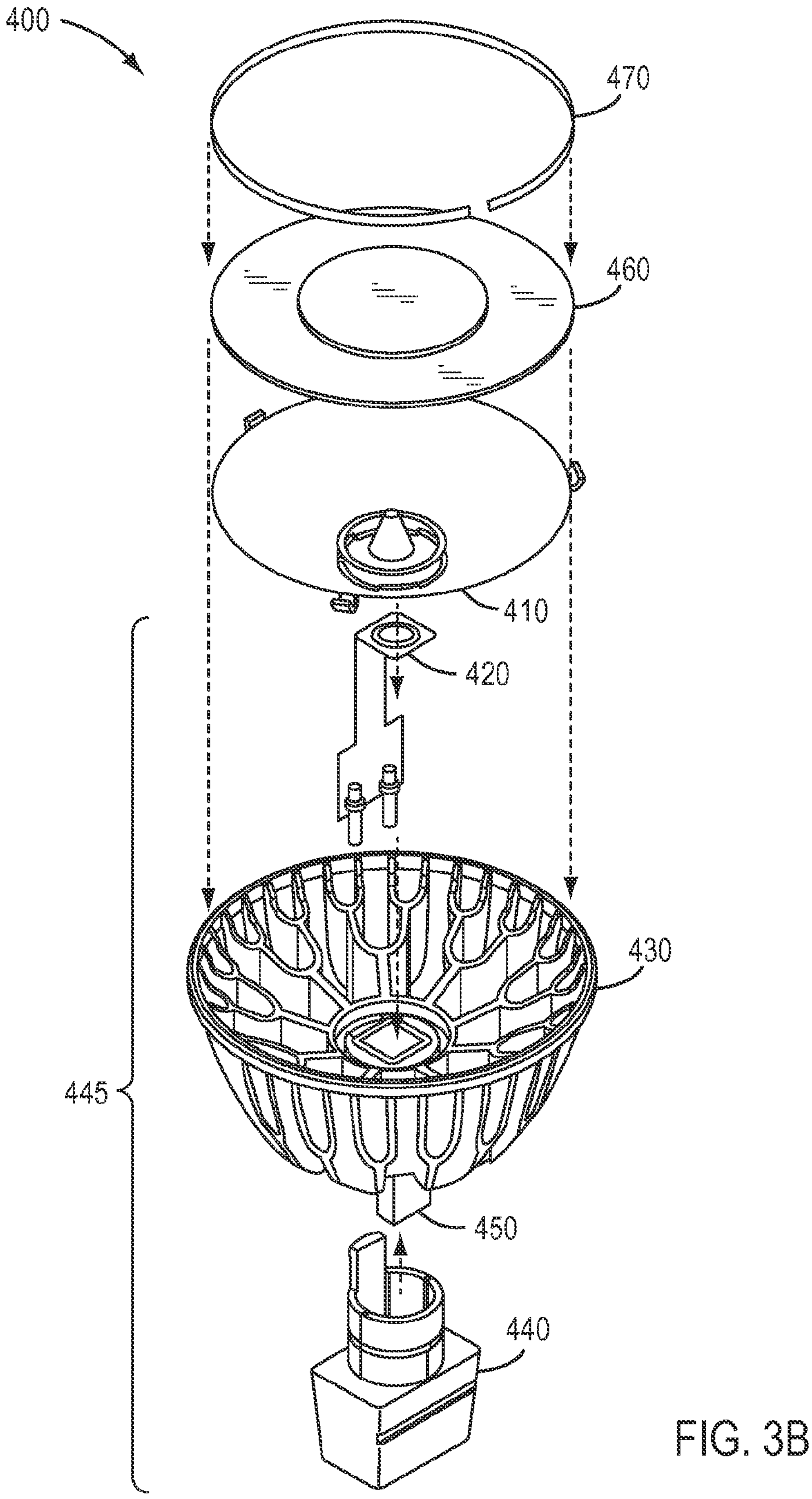

FIG. 3B illustrates a modular diagram according to various embodiments of the present disclosure. As can be seen in FIG. 3B, in various embodiments, LED lighting source 400 includes a lens 410, a light source in the form of an LED module/assembly 420, a heat sink 430, a base module 440, a mechanically-retained accessory 460, and a retainer 470. As will be discussed further below, in various embodiments, the modular approach to assembling a lighting source 400 can reduce the manufacturing complexity, reduce manufacturing costs, and increase the reliability of such lighting sources.

In various embodiments, lens 410 and mechanically-retained accessory 460 may be formed from transparent material, such as glass, polycarbonate, acrylic, COC material, or other material. In certain embodiments, the lens 410, may be configured in a folded path configuration to generate a narrow output beam angle. Such a folded optic lens enables embodiments of lighting source 400 to have a tighter columniation of output light than is normally available from a conventional reflector of equivalent depth. The mechanically-retained accessory 460 may perform any of the function or functions as previously described for accessories.

In FIG. 3B, lens 410 may be secured to heat sink 430 by means of one or more clips integrally formed on the edge of reflecting lens 410. In addition, reflecting lens 410 may also be secured using an adhesive compound disposed proximate to where integrated LED assembly 420 is secured to heat sink 430. In various embodiments, separate clips may be used to restrain reflecting lens 410. These clips may be formed, for example, of heat resistant plastic material that may be white colored to reflect backward scattered light back through the lens.

In other embodiments, lens 410 may be secured to heat sink 430 using the clips described above. Alternatively, lens 410 may be secured to one or more indents of heat sink 430, as will be illustrated below in greater detail. In some embodiments, once lens 410 is secured to heat sink 430, the attachments are not intended to be removed by hand. In some cases, one or more tools are to be used to separate these components without damage.

The embodiments of FIG. 3A and FIG. 3B are merely illustrative embodiments. The particulars of the basic LED lamp components 445 can vary from one LED lamp to another, and the configuration or selection of any one or more particular members of the basic LED lamp components 445 may result in an assembly having certain characteristic, such as efficiency, brightness, color, thermal properties, and/or others.

In certain embodiments, as will be discussed below, integrated LED assemblies and modules may include multiple LEDs such as for example thirty-six (36) LEDs arranged in series, in parallel series (e.g., three parallel strings of twelve (12) LEDs in series), or other configurations. In certain embodiments, any number of LEDs may be used such as, for example, 1, 10, 16, or more. In certain embodiments, the LEDs may be electrically coupled serially or in any other appropriate configuration.

In certain embodiments, the targeted power consumption for LED assemblies is less than 13 watts. This is much less than the typical power consumption of halogen-based MR16 lights (50 watts). Accordingly, embodiments of the present disclosure are capable of matching the brightness or intensity of halogen-based MR 16 lights, but using less than 20% of the energy. In certain embodiments, the LED assemblies may be configured for higher power operation such as greater than 13 W and incorporated into higher-output lamp form factors such as PAR30, PAR38, and other lamp form factors. In certain applications, an LED assembly can be incorporated into a luminaire and the lens assembly can accommodate accessorizing according to the embodiments provided by the present disclosure, which is not limited to retrofit lamps.

In various embodiments of the present disclosure, LED assembly 420 is directly secured to heat sink 430 to dissipate heat from the light output portion and/or the electrical driving circuits. In some embodiments, heat sink 430 may include a protrusion portion 450 to be coupled to electrical driving circuits. As will be discussed below, LED assembly 420 typically includes a flat substrate such as silicon or the like. In various embodiments, it is contemplated that an operating temperature of LED assembly 420 may be on the order of 125° C. to 140° C. The silicon substrate is then secured to the heat sink using a high thermal conductivity epoxy (e.g., thermal conductivity "96 W/mk.). In some embodiments, a thermoplastic/thermoset epoxy may be used such as TS-369, TS-3332-LD, or the like, available from Tanaka Kikinzoku Kogyo K.K. Other epoxies may also be used. In some embodiments, no screws are used to secure the LED assembly to the heat sink, however, screws or other fastening means may be used in other embodiments.

In certain embodiments, heat sink 430 may be formed from a material having a low thermal resistance/high thermal conductivity. In some embodiments, heat sink 430 may be formed from an anodized 6061-T6 aluminum alloy having a thermal conductivity k=167 W/m·k., and a thermal emissivity e=0.7. In other embodiments, other materials may be used such as 6063-T6 or 1050 aluminum alloy having a thermal conductivity k=225 W/mk. and a thermal emissivity e=0.9. In other embodiments, still other alloys such AL 1100, or the like may be used. In still other embodiments, a die cast alloy with thermal conductivity as low as 96 W/mK is used. Additional coatings may also be added to increase thermal emissivity, for example, paint provided by ZYP Coatings, Inc., which incorporate CR2O3 or CeO2 may provide a thermal emissivity e=0.9; coatings provided by Materials Technologies Corporation under the tradename Duracon™ may provide a thermal emissivity e>0.98; and the like. In other embodiments, heat sink 430 may include other metals such as copper, or the like.

In some examples, at an ambient temperature of 50° C., and in free natural convection, the heat sink 430 has been measured to have a thermal resistance of approximately 8.5° C./Watt, and heat sink 430 has been measured to have a thermal resistance of approximately 7.5° C./Watt. With further development and testing, it is believed that a thermal resistance of as little as 6.6° C./Watt may be achieved. In view of the present patent disclosure, one of ordinary skill in the art will be able to envision other materials having different thermal properties consistent embodiments of the present disclosure.

In certain embodiments, base module 440 in FIG. 3B provides a standard GU 5.3 physical and electronic interface to a light socket. As will be described in greater detail below, a cavity within base module 440 includes high temperature resistant electronic circuitry used to drive LED assembly 420. In ° C. embodiments, an input voltage of 12 VAC to the lamps are converted to 120 VAC, 40 VAC, or other voltage by the LED driving circuitry. The driving voltage may be set depending upon specific LED configuration (e.g., series, parallel/series, etc.) desired. In various embodiments, protrusion portion 450 extends within the cavity of base module 440.

The shell of base module 440 may be formed from an aluminum alloy or a zinc alloy, and/or may be formed from an alloy similar to that used for heat sink 430 and/or heat sink 430. In one example, an alloy such as AL 1100 may be used. In other embodiments, high temperature plastic material may be used. In some embodiments, instead of being separate units, base module 440 may be monolithically formed with heat sink 430.

As illustrated in FIG. 3B, a portion of the LED assembly 420 (silicon substrate of the LED device) contacts the heat sink 430 in a recess within the heat sink 430. Additionally, another portion of the LED assembly 420 (containing the LED driving circuitry) is bent downwards and is inserted into an internal cavity of base module 440.

In certain embodiments, to facilitate a transfer of heat from the LED driving circuitry to the shell of the base assemblies, and of heat from the silicon substrate of the LED device, a potting compound may be provided. The potting compound may be applied in a single step to the internal cavity of base module 440 and/or to the recess within heat sink 430. In certain embodiments, a compliant potting compound such as Omegabond® 200 available from Omega Engineering, Inc. or 50-1225 from Epoxies, Etc., may be used. In other embodiments, other types of heat transfer materials may be used.

Figure 4A:
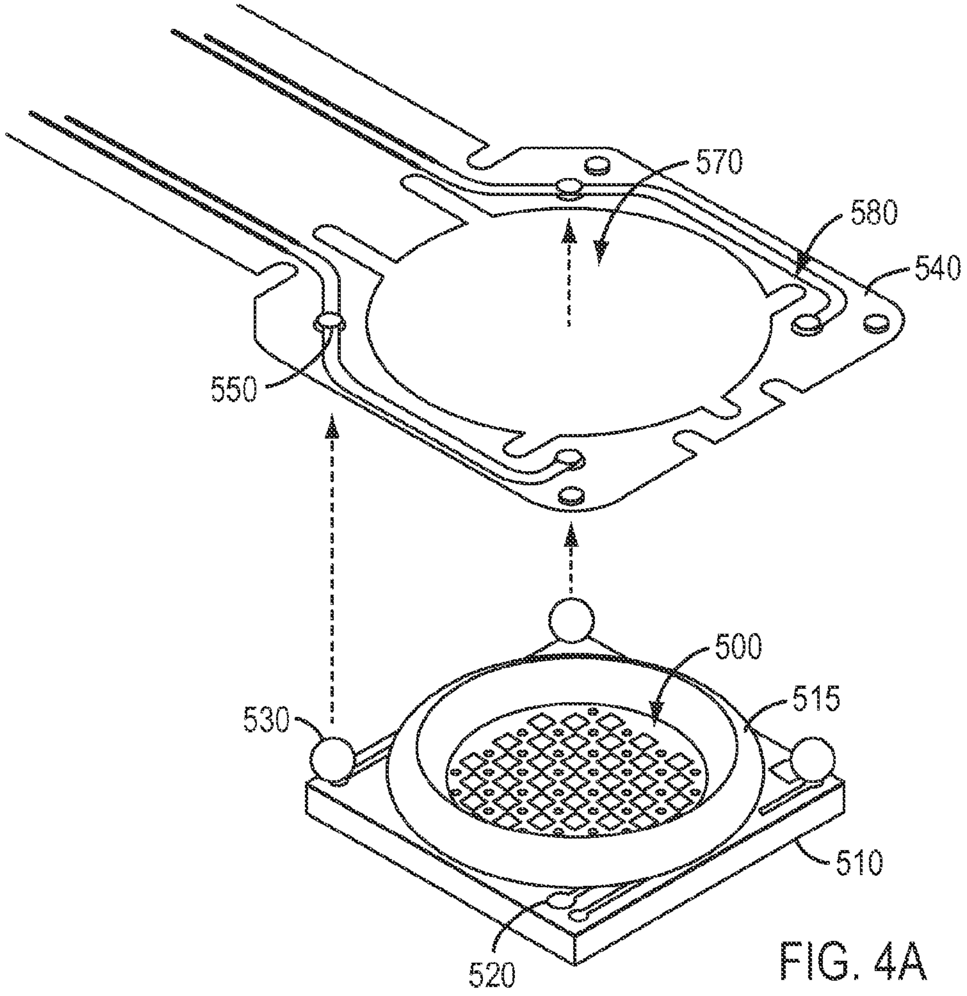
FIG. 4A and FIG. 4B illustrate modular diagrams according to certain embodiments of the present disclosure.
Figure 4B:
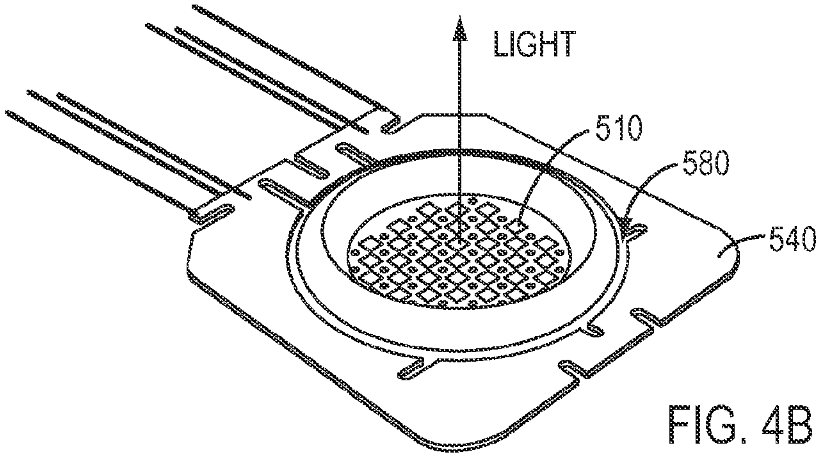

FIG. 4A and FIG. 4B illustrate an embodiment of the present disclosure. More specifically, FIG. 4A illustrates an LED package subassembly (LED module) according to certain embodiments. More specifically, a plurality of LEDs 500 is illustrated as being disposed upon a substrate 510. In some embodiments, the plurality of LEDs 500 may be connected in series and powered by a voltage source of approximately 120 volts AC (VAC). To enable a sufficient voltage drop (e.g., 3 to 4 volts) across each LED 500, in various embodiments 30 to 40 LEDs may be used. In certain embodiments, 27 to 39 LEDs may be coupled in series. In other embodiments, LEDs 500 are connected in parallel series and powered by a voltage source of approximately 40 VAC. For example, the plurality of LEDs 500 include 36 LEDs may be arranged in three groups each having 12 LEDs 500 coupled in series. Each group is thus coupled in parallel to the voltage source (40 VAC) provided by the LED driver circuitry such that a sufficient voltage drop (e.g., 3 to 4 volts) is achieved across each LED 500. In other embodiments, other driving voltages may be used, and other arrangements of LEDs 500 may also be employed.

In certain embodiments, the LEDs 500 are mounted upon a silicon substrate 510, or other thermally conductive substrate. In certain embodiments, a thin electrically insulating layer and/or a reflective layer may separate LEDs 500 and the silicon substrate 510. Heat produced from LEDs 500 may be transferred to silicon substrate 510 and/or to a heat sink by means of a thermally conductive epoxy, as discussed herein.

In certain embodiments, the silicon substrate is approximately 5.7 mm×5.7 mm in size, and approximately 0.6 mm in depth, or the silicon substrate is approximately 8.5 mm×8 mm in size, and approximately 0.6 mm in depth. The dimensions may vary according to specific lighting requirements. For example, for lower brightness intensity, fewer LEDs may be mounted upon the substrate and accordingly the substrate may decrease in size. In other embodiments, other substrate materials may be used and other shapes and sizes may also be used.

As shown in FIG. 4A, a ring of silicone (e.g., silicon dam 515) is disposed around LEDs 500 to define a well-type structure. In certain embodiments, a phosphorus bearing material is disposed within the well structure. In operation, LEDs 500 provide a blue-emitting, a violet-emitting, or a UV-emitting light output. In turn, the phosphorous bearing material is excited by the output light, and emits white light output.

As illustrated in FIG. 4A, a number of bond pads 520 may be provided on substrate 510 (e.g., 2 to 4). Then, a conventional solder layer (e.g., 96.5% tin and 5.5% gold) may be disposed upon silicon substrate 510, such that one or more solder balls 530 are formed thereon. In the embodiments illustrated in FIG. 4A, four bond pads 520 are provided, one at each corner, two for each power supply connection. In other embodiments, only two bond pads may be used, one for each AC power supply connection.

FIG. 4A shows a flexible printed circuit (FPC) 540. In certain embodiments, FPC 540 may include a flexible substrate material such as a polyimide, such as Kapton™ from DuPont, or the like. As illustrated, FPC 540 may have a series of bonding pads 550, for bonding to silicon substrate 510, and bonding pads 550, for coupling to the high supply voltage (e.g., 120 VAC, 40 VAC, etc.). Additionally, in some embodiments, an opening 570 is provided, through which LEDs 500 will shine through.

Various shapes and sizes for FPC 540 may be used in the embodiments of the present disclosure. For example, as illustrated in FIG. 4A, a series of cuts 580 may be made upon FPC 540 to reduce the effects of expansion and contraction of FPC 540 with respect to substrate 510. As another example, a different number of bonding pads 550 may be provided, such as two bonding pads. As another example, FPC 540 may be crescent shaped, and opening 570 may not be a through hole. In other embodiments, other shapes and sizes for FPC 540 may be used consistent with present patent disclosure.

In combining FIG. 4A the elements illustrated in FIG. 4A to provide the assembly illustrated in FIG. 4B, substrate 510 is bonded to FPC 540 via solder balls 530, in a conventional flip-chip type arrangement to the top surface of the silicon. By making the electrical connection at the top surface of the silicon, the FPC is electrically isolated from the heat transfer surface of the silicon. This allows the entire bottom surface of the silicon substrate 510 to transfer heat to the heat sink. Additionally, this allows the LED to be bonded directly to the heat sink to maximize heat transfer instead of a printed circuit board material that typically inhibits heat transfer. As can be seen in this configuration, LEDs 500 are thus positioned to emit light through opening 570. In various embodiments, the potting compound discussed above may also be used as an under fill to seal the space (e.g., see cuts 580) between substrate 510 and FPC 540. After the electronic driving devices and the silicon substrate 510 are bonded to FPC 540, the LED package submodule or assembly 420 is thus constructed.

As an alternative, the LEDs 500 may be positioned to emit light into the cavity of the lamp, and the LEDs are powered by means of discrete conductors. In various embodiments, the LEDs may be tested for proper operation, and such testing can be done after the LED lamp is in a fully-assembled or in a partially-assembled state.

Figure 5A:
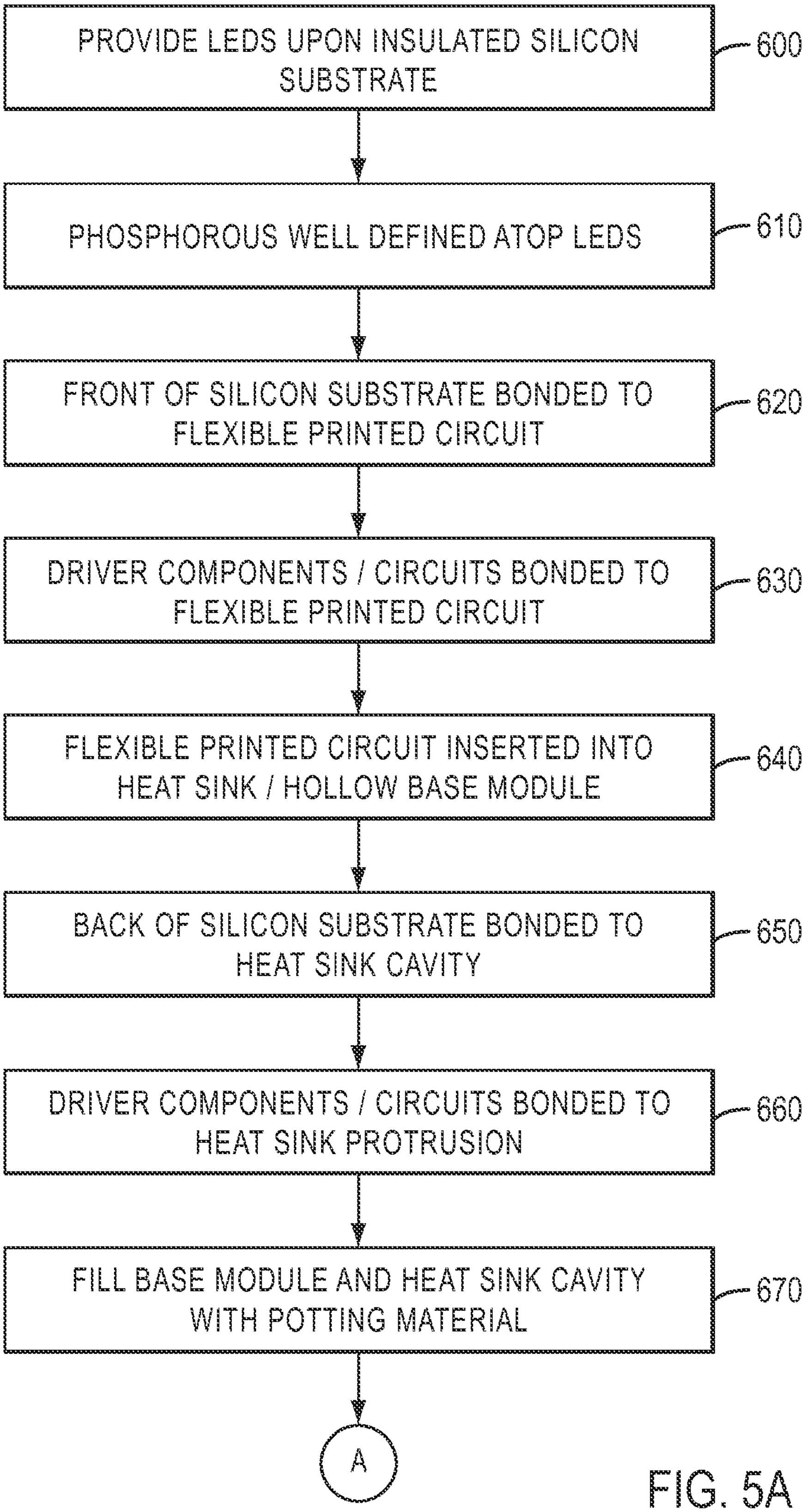
FIG. 5A and FIG. 5B illustrate flow diagrams of an assembly procedures provided by embodiments of the present disclosure.

FIG. 5A and FIG. 5-B illustrate a block diagram of a manufacturing process according to embodiments of the present disclosure. In certain embodiments, some of the manufacturing processes may occur in parallel or in series. For understanding, reference may be given to features in prior figures.

In certain embodiments, the following process may be performed to form an LED assembly/module. Initially, a plurality of LEDs 500 are provided upon an electrically insulated silicon substrate 510 and wired, step 600. As illustrated in FIG. 4A, a silicone dam 515 is placed upon the silicon substrate 510 to define a well, which is then filled with a phosphor-bearing material, step 610. Next, the silicon substrate 510 is bonded to a flexible printed circuit 540, step 620. As disclosed above, a solder ball and flip-chip soldering may be used for the soldering process in various embodiments.

Next, a plurality of electronic driving circuit devices and contacts may be soldered to the flexible printed circuit 540, step 630. The contacts are for receiving a driving voltage of approximately 12 VAC. As discussed above, unlike present state of the art MR16 light bulbs, the electronic circuit devices, in various embodiments, are capable of sustained high-temperature operation, (e.g., 120° C.).

In various embodiments, the second portion of the flexible printed circuit including the electronic driving circuit is inserted into the heat sink and into the inner cavity of the base module, step 640. As illustrated, the first portion of the flexible printed circuit is then bent approximately 90 degrees such that the silicon substrate is adjacent the recess of the heat sink. The back side of the silicon substrate is then bonded to the heat sink within the recess of the heat sink using an epoxy, or the like, step 650.

In various embodiments, one or more of the heat producing the electronic driving components/circuits may be bonded to the protrusion portion of the heat sink, step 660. In some embodiments, electronic driving components/circuits may have heat dissipating contacts (e.g., metal contacts) These metal contacts may be attached to the protrusion portion of the heat sink via screws (e.g., metal, nylon, or the like). In some embodiments, a thermal epoxy may be used to secure one or more electronic driving components to the heat sink. Subsequently a potting material is used to fill the air space within the base module and to serve as an under fill compound for the silicon substrate, step 670.

Subsequently, a reflective lens may be secured to the heat sink, step 680, and the LED light source may then be tested for proper operation, step 690.

In certain embodiments, the base sub-assembly/modules that operate properly may be packaged along with one or more optically transmissive member offerings and/or a retaining ring (described above), step 700, and shipped to one or more distributors, resellers, retailers, or customers, step 710. In certain embodiments, the modules and separate optically transmissive member offerings may be stocked, stored, or the like. A one or more optically transmissive member offerings may be one or more lenses.

Subsequently, in various embodiments, an end user desires a particular lighting solution, step 720. In certain examples, the lighting solution may require different beam angles, different cut-off angles or roll-offs, different coloring, different field angles, and the like. In various embodiments, the beam angles, the field angles, and the full cutoff angles may vary from the above, based upon engineering and/or marketing requirements. Additionally, the maximum intensities may also vary based upon engineering and/or marketing requirements.

Based upon the end-user's application, a secondary optically transmissive members may be selected, step 730. In various embodiments, the selected lens may or may not be part of a kit for the lighting module. In other words, in some examples, various optically transmissive members are provided with each lighting module; and in other examples, lighting modules are provided separately from the optically transmissive members.

In various embodiments, an assembly process may include attaching the retaining ring to one or more optically transmissive member, and snapping the retaining ring into a groove of the heat sink, step 740. In other embodiments, a retaining ring is already installed for each optically transmissive members that is provided.

In some embodiments, once the retaining ring is snapped into the heat sink, clips, or the like, the retaining ring (and secondary optic lens) cannot be removed by hand. In such cases, a tool, such as a thin screwdriver, pick, or the like, must be used to remove a secondary optic lens (optically transmissive members) from the assembled unit. In other embodiments, the restraint mechanism may be removed by hand.

Figure 5B:
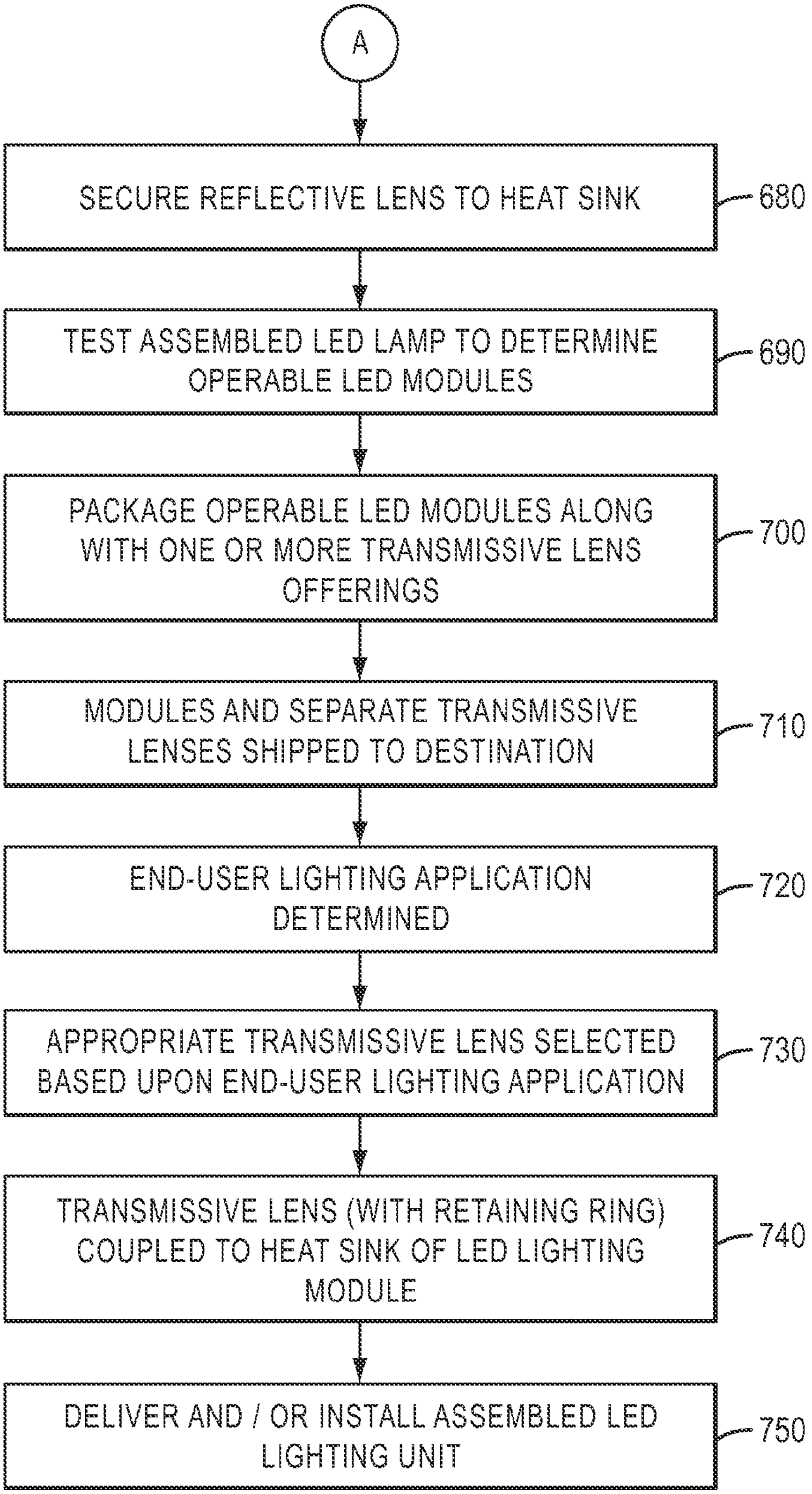

In FIG. 5B, the assembled lighting unit may be delivered to the end-user and installed, step 750.

Figure 6A:
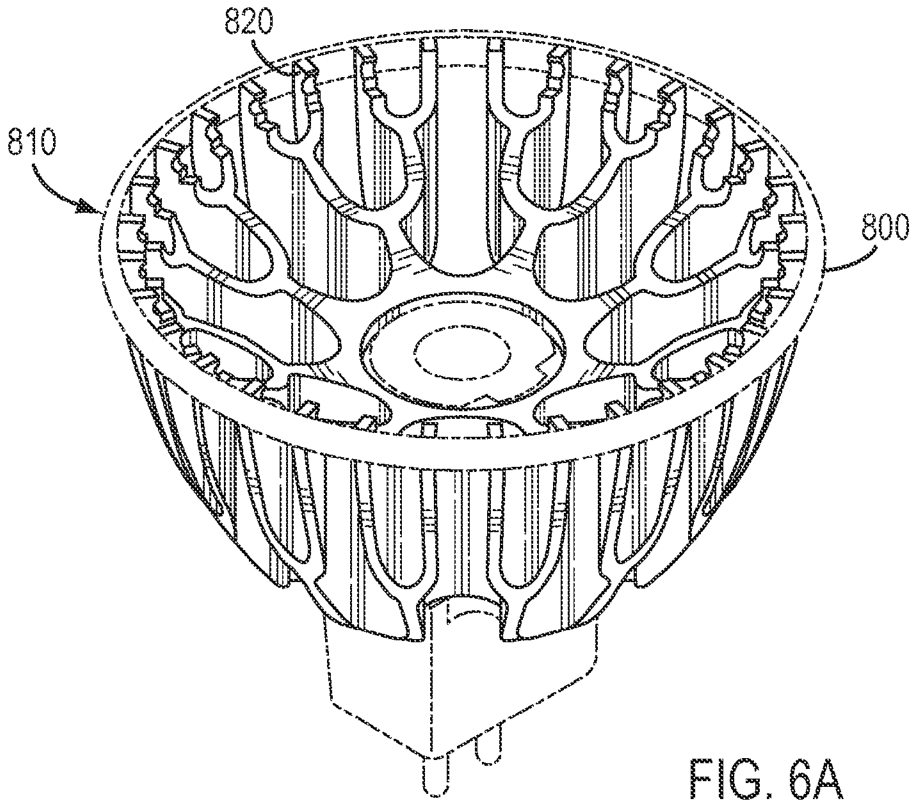
FIG. 6A and FIG. 6B illustrate various embodiments of the present disclosure.
Figure 6B:
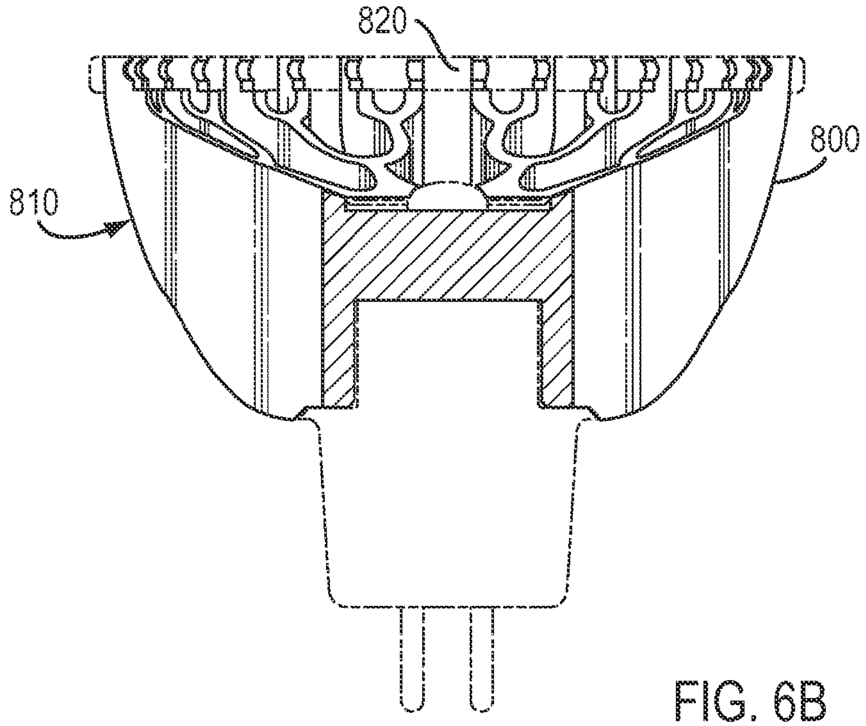

FIG. 6A and FIG. 6B illustrate embodiments of a heat sink according to certain embodiments of the present disclosure. More specifically, FIG. 6A illustrates a perspective view of a heat sink, and FIG. 6B illustrates a cross-section view of the heat sink.

In FIG. 6A and FIG. 6B, a heat sink 800 is illustrated including a number of heat dissipating fins 810. Additionally, fins 810 may include a mechanism for mating onto the retaining ring/optically transmissive members. As illustrated in the example in FIG. 6A and FIG. 6B, the mating mechanism includes indentations 820 on fins 810. In some embodiments, each of fins 810 may include an indentation 820, whereas in other embodiments, less than all of fins 810 may include an indentation. In other embodiments, the mating mechanism may include the use of an additional clip, a clip on the reflective optics, or the like.

In certain embodiments, the optically transmissive members may be coupled to an intermediate grille, or the like that is coupled to the heat sink and/or reflective lens. Accordingly, embodiments of the present disclosure are applicable for use in wide-beam light sources or in narrow-beam light sources.

Figure 8A:
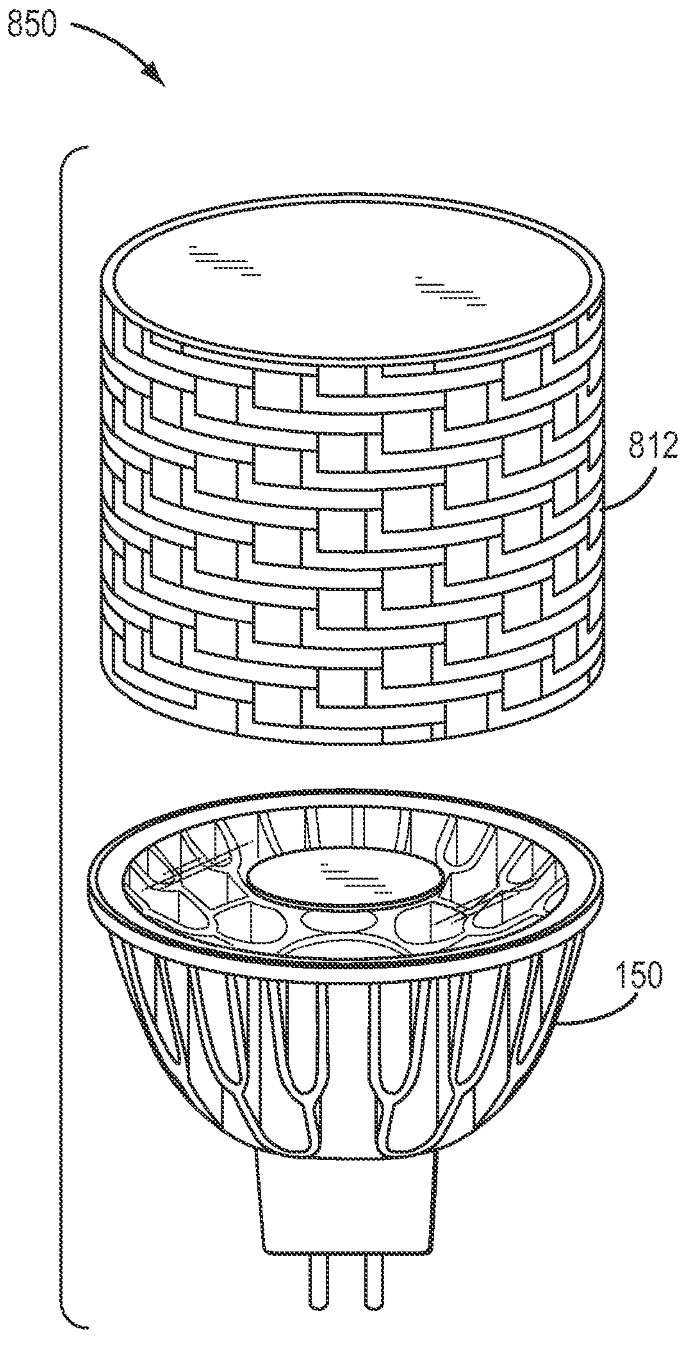
FIG. 8A depicts an arrangement of a collimator for an LED lamp according to certain embodiments of the present disclosure.

FIG. 8A depicts an arrangements of a collimator 812 for LED lamps. The arrangement 850 shows an LED lamp 150 comprising a lens having a center and a diameter to which is attached a first magnet so as to accommodate a collimator accessory where the collimator accessory is disposed on the lens and held in place by a second magnet 102 2 attached to the center of the collimator accessory (see FIG. 8B).

Figure 8B:
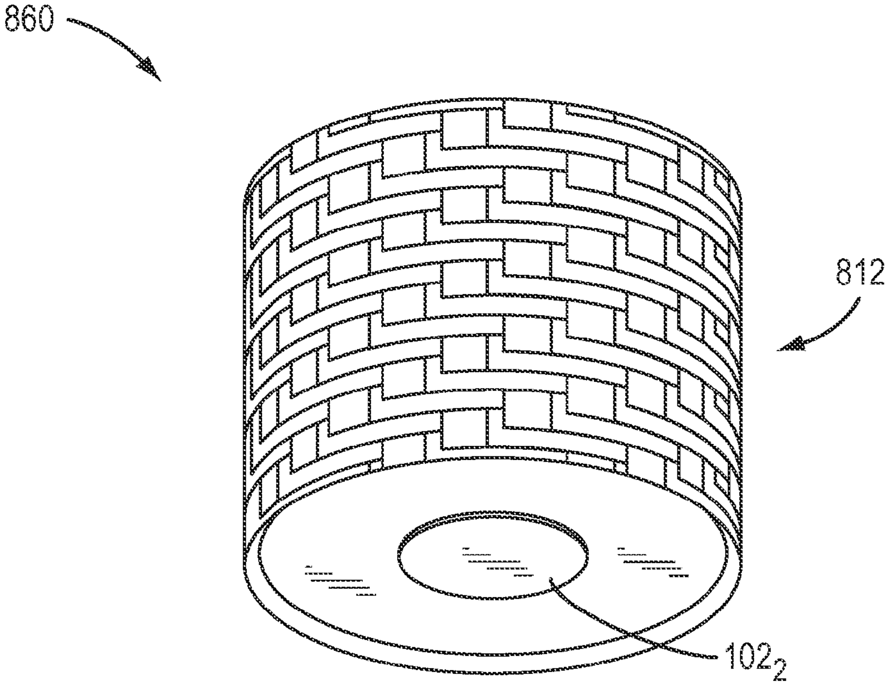
FIG. 8B is a perspective view of a collimator for an LED lamp, according to certain embodiments of the present disclosure.

FIG. 8B is a rear-view 860 of a collimator design for LED lamps. In the configuration shown, the collimator is operable for blocking side-emanating light. The surfaces of the collimator may be textured or polished, or anodized, or painted for ornamental or other purposes.

Figure 8C:
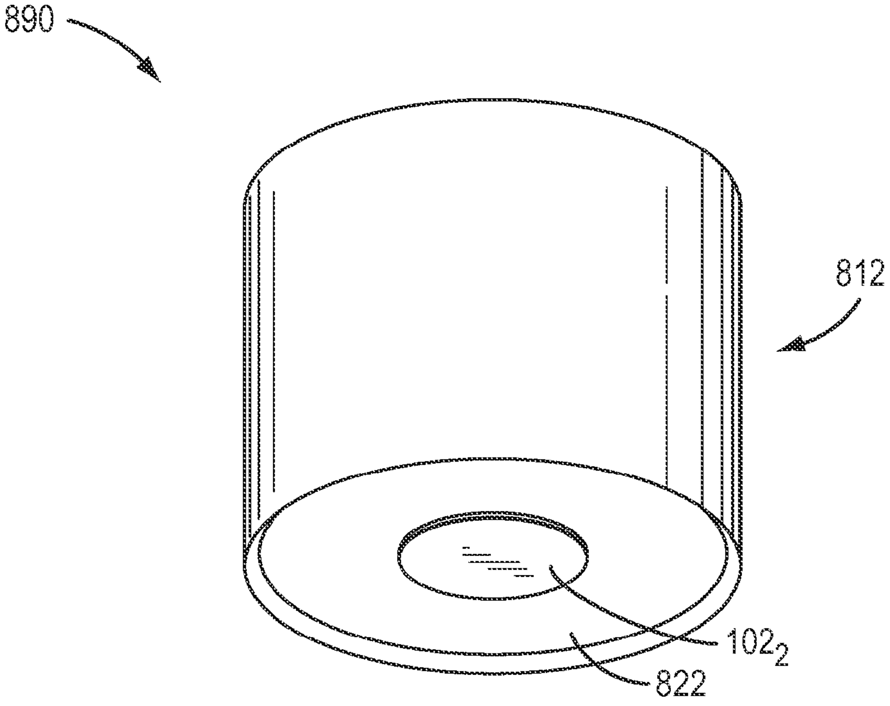
FIG. 8C is a perspective view of a collimator for an LED lamp according to certain embodiments of the present disclosure.

FIG. 8C is a rear-view 890 of a collimator design for LED lamps. In the configuration shown, the collimator is operable for blocking side-emanating light, and includes a magnet 102 2 affixed to a diffuser 822, which is integrated into the collimator 812.

Figure 9A:
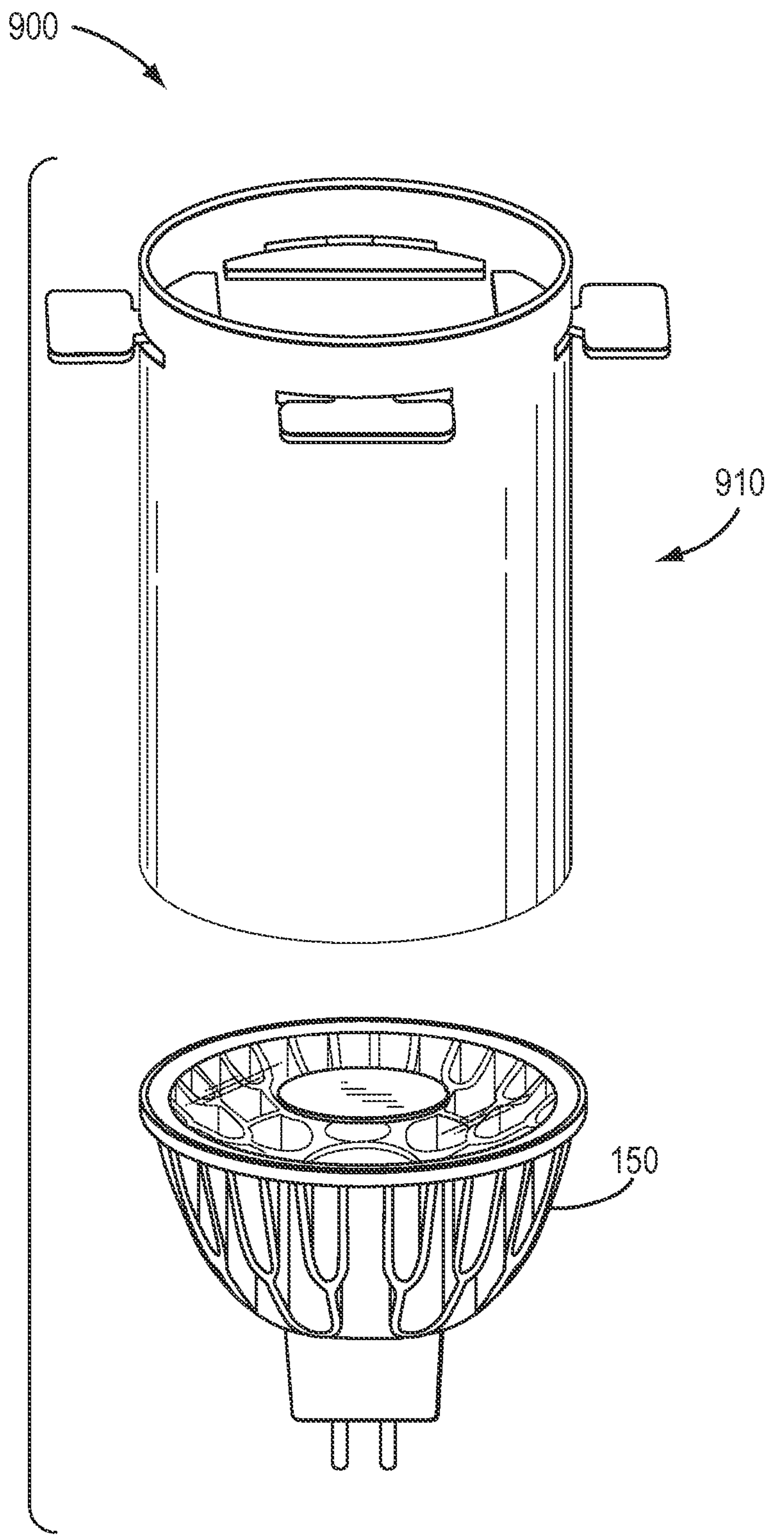
FIG. 9A depicts a projector accessory for an LED lamp according to certain embodiments of the present disclosure.

FIG. 9A depicts an arrangement 900 of a projector accessory 910 for LED lamps. The term "projector accessory" as used herein refers to an accessory attached to an LED lamp or other LED light source. As shown the projector accessory 910 is attached to an LED lamp by means of magnetic attraction (also see the collimator 812 of FIG. 8A and FIG. 8B). The projector accessory 910 comprises secondary optics and adjustable baffles 903. As shown in FIG. 9A, the arrangement 900 shows an LED lamp 150 comprising a lens having a center and a diameter to which is attached a first magnet so as to accommodate a projector accessory where the projector accessory is disposed on the lens and held in place by a second magnet 102 2 attached to the center of the projector accessory (see FIG. 9B). The projector accessory 910 has an adjustable aperture and focal lens(s) that allows manipulation of the projected light beam. In some cases, the LED lamp comprises a lamp output mechanical aperture. In some cases, the LED lamp comprises a first or second lens that is configured to cover more than 90% of the lamp output mechanical aperture.

Figure 9B:
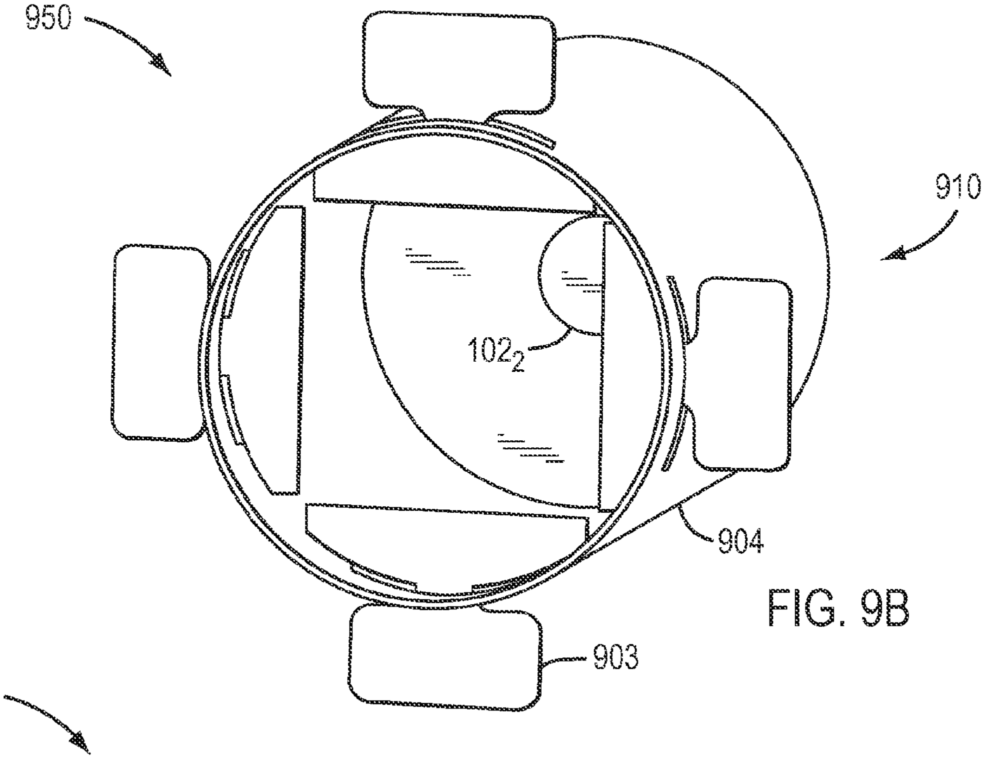
FIG. 9B is a front view of a projector accessory for an LED lamps according to certain embodiments of the present disclosure.

FIG. 9B is a front view 950 of a projector accessory 910 for LED lamps, according to various embodiments of the present disclosure. As shown in FIG. 9B, the projector accessory 910 comprises a housing 904, into which are mated a plurality of adjustable baffles 903. The baffles shown are substantially rectilinear; however baffles may be formed into a non-rectangular or irregular shape. Furthermore, some embodiments of projector accessory 910 have one or more focal lens(s) that provide for manipulation of the projected light beam so as to focus a pattern on a surface (e.g., a wall, a painting, a door) that is positioned at a pre-determined length from the focal lens.

Figure 9C:
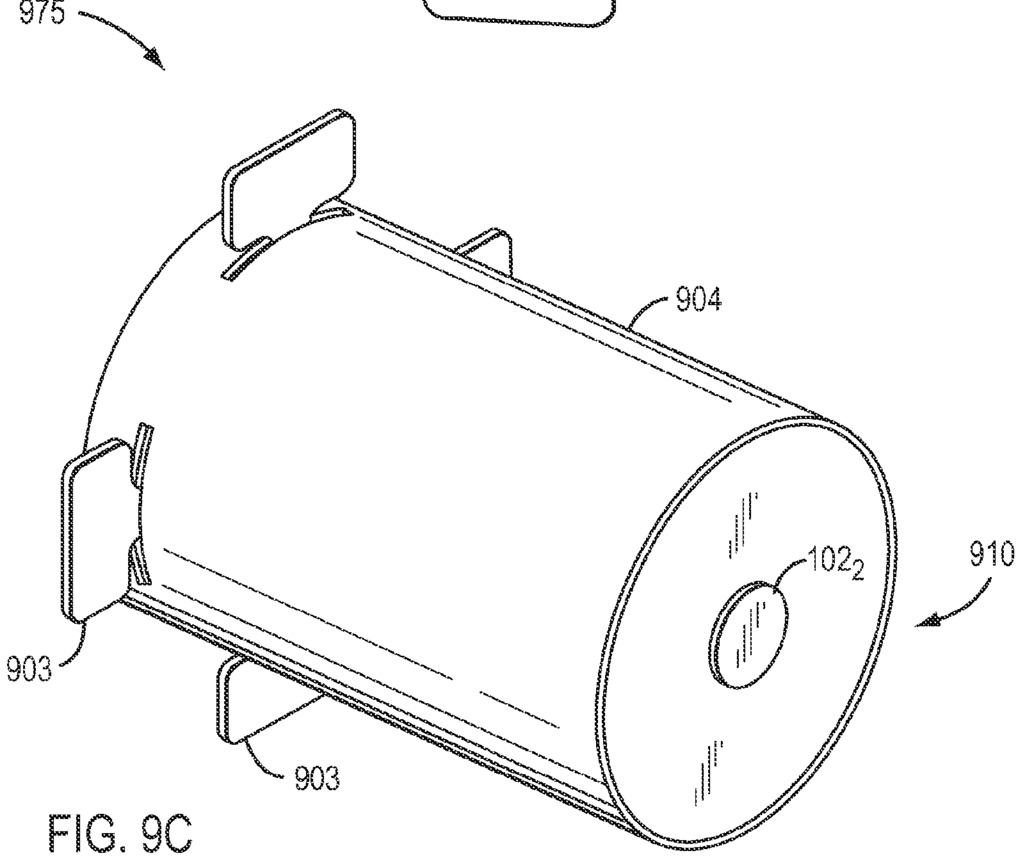
FIG. 9C is a side view of a projector accessory for an LED lamps according to certain embodiments of the present disclosure.

FIG. 9C is a side view 975 of a projector accessory for LED lamps. The rear view shows magnet 102 2.

Figure 10A:
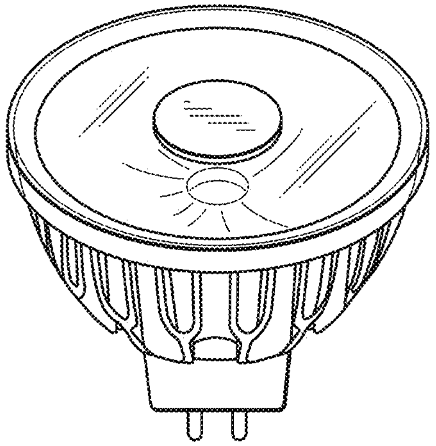
FIG. 10 is an exploded view of an LED lamp having magnet accessories according to certain embodiments of the present disclosure.
Figure 10B:
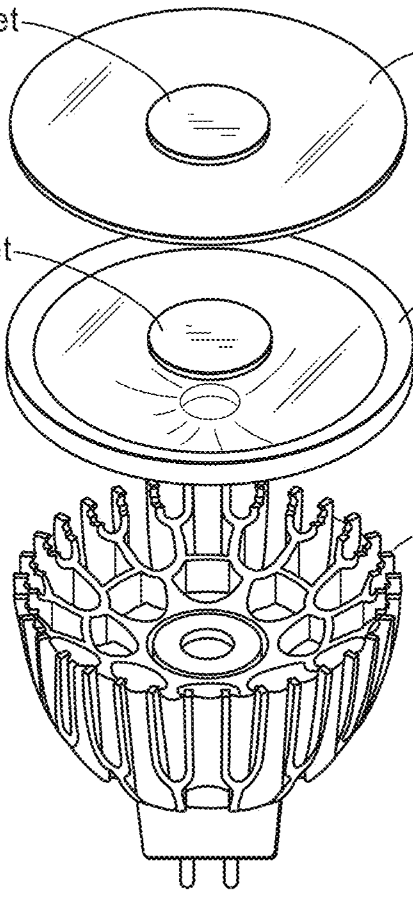

FIG. 10 is an exploded view 1000 of an embodiment of the present disclosure. As shown, an LED lamp is affixed to a lens 106 having a center and a diameter for mating to a first magnet 102 1 attached to the center of the lens 106. A first accessory 104 is disposed over the lens 106; using a second magnet 102 2 mechanically attached to the center of the first accessory 104. The first magnet 102 1 and the second magnet 102 2 are configured to retain the first accessory 104 against the lens 106. A second accessory 202 is disposed over the first accessory 104; using a third magnet 102 3 mechanically attached to the center of the second accessory 202.

Figure 11A:
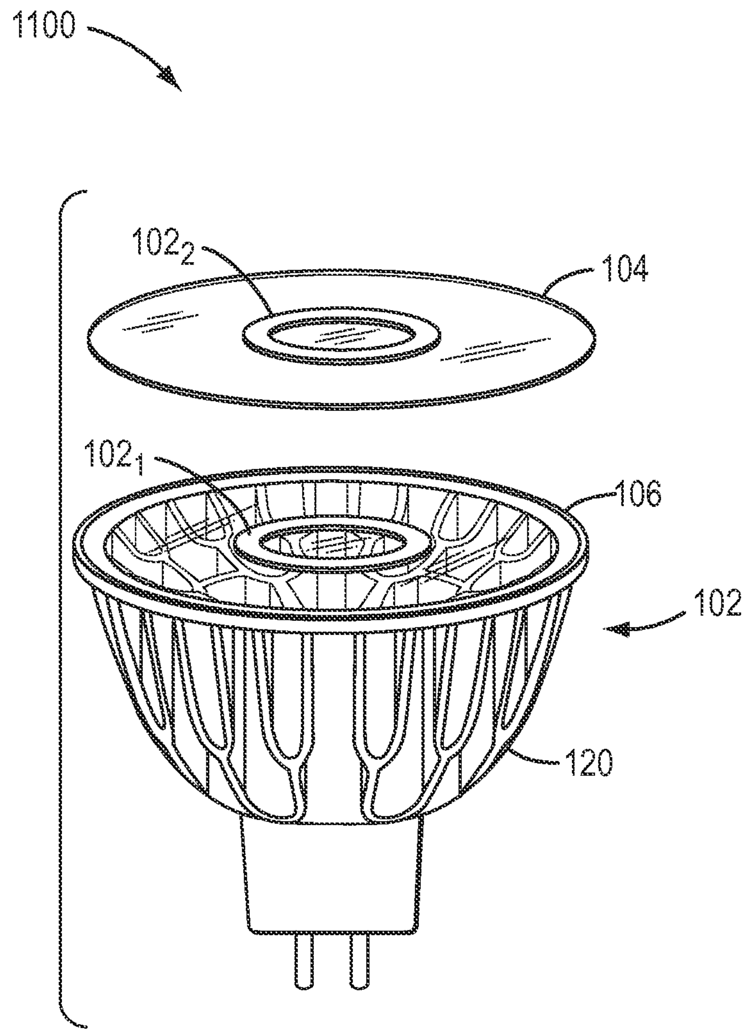
FIG. 11A is a top elevation view of an LED lamp assembly having magnet accessories according to certain embodiments of the present disclosure.

FIG. 11A is a top elevation view 1100 of an LED lamp assembly. As shown in FIG. 11A, a lens 106 is attached to a heat sink 120. The design of lens 106 includes a magnet (e.g., a ring-shaped or doughnut magnet 102 3), which can hold accessory 104 to the lens 106. The first magnet (doughnut magnet 102 1) and second magnet (e.g., 102 2) are opposing magnets that can be configured to retain the accessory 104 against the lens 106. For example, the opposing magnets 102 1 and 102 2 may have the opposite polarity. Moreover the shape and position of the opposing magnets is such that an attachment is self-centering with respect to the lens 106 upon installation.

Figure 11B:
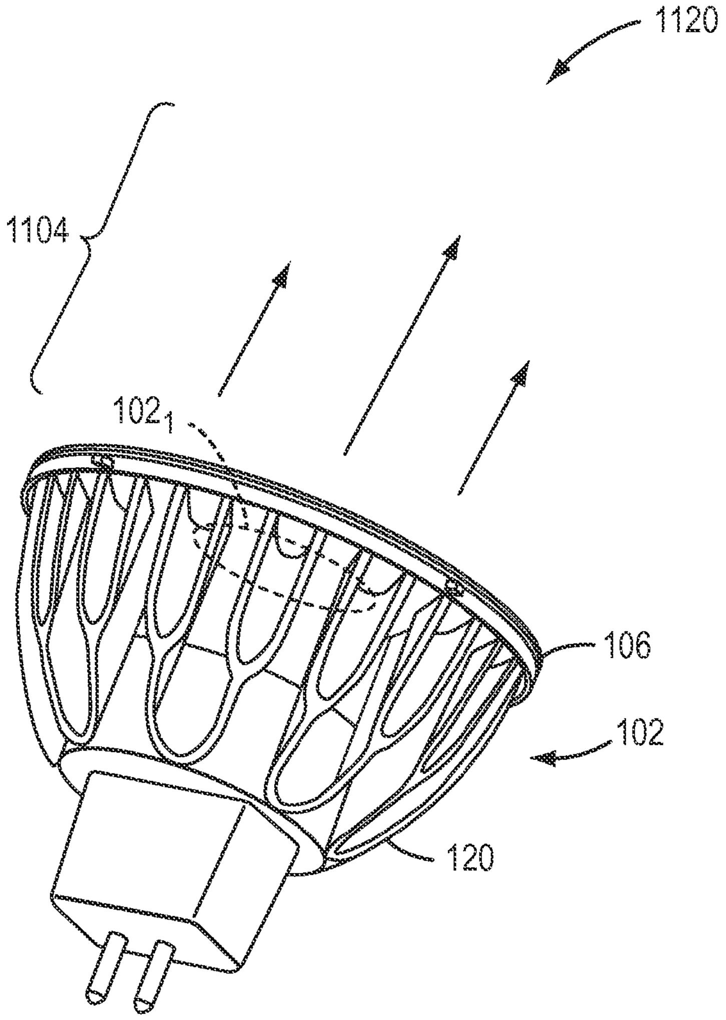
FIG. 11B is a rear elevation view of an LED lamp assembly having magnet accessories according to certain embodiments of the present disclosure.

FIG. 11B is a rear elevation view 1120 of an LED lamp assembly. As shown, the doughnut magnet 102 1 is shaped and affixed to lens 106 in a particular position so as to occlude only a portion of the light emanating from the LED light source. In certain embodiments, the shape and position of the doughnut magnet serves to attenuate glare (see emanated light pattern 1104).

Figure 11C:
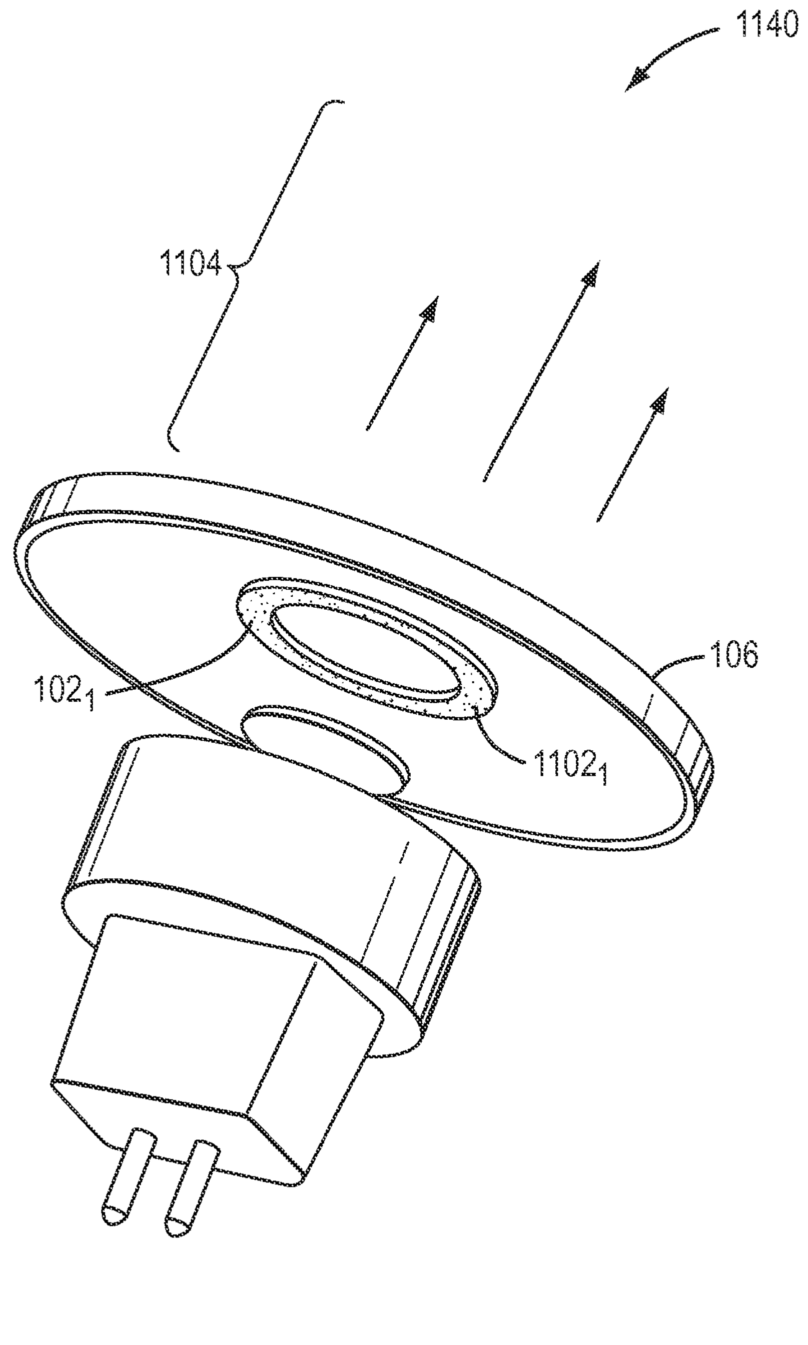
FIG. 11C is a rear cutaway view of an LED lamp assembly having magnet accessories according to certain embodiments of the present disclosure.

FIG. 11C is an LED lamp assembly. As shown, the doughnut magnet 102 1 is shaped and affixed to lens 106 in a particular position so as to reflect a portion of the light emanating from the LED light source back toward to general direction of the LED light source. In some embodiments, the treated surface 1102 1 of the doughnut magnet 102 1 is treated so as reflect light in a particular pattern and direction. A particular pattern and direction can be pre-determined, and the selection of the shape, position, and surface treatment can be tuned so as to modulate the (see emanated light pattern 1104) using the pre-determined particular pattern and direction.

Figure 12:
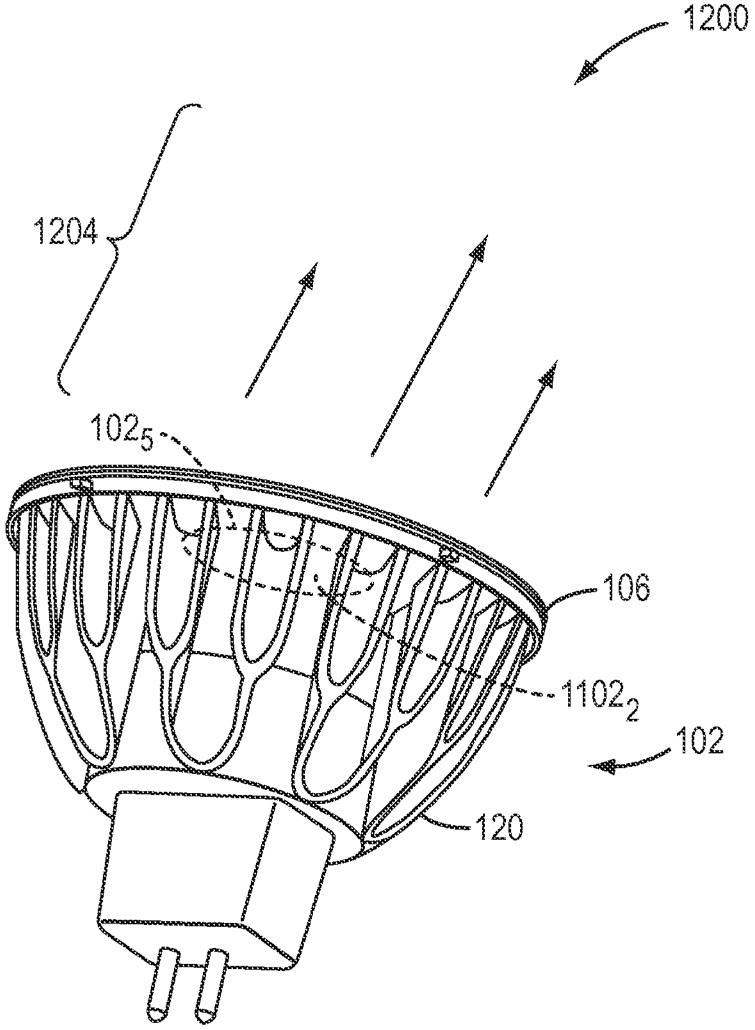
FIG. 12 is a rear elevation view of an LED lamp assembly having magnet accessories according to certain embodiments of the present disclosure.

FIG. 12 is a rear elevation view 1200 of an LED lamp assembly. As shown, the disk magnet 102 5 is shaped and affixed to lens 106 in a particular position so as to occlude only a portion of the light emanating from the LED light source. In some embodiments, the shape and position of the disk magnet serves to attenuate glare (see emanated light pattern 1104). A particular pattern and direction can be pre-determined, and the selection of the shape, position and surface treatment of the disk magnet 102 5 and its treated surface 1102 2 can be tuned so as to modulate the (see emanated light pattern 1204) using the pre-determined particular pattern and direction.

Figure 13A:
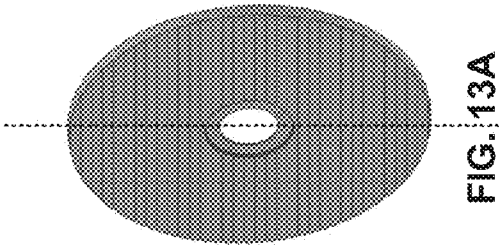
FIG. 13A is a perspective view of a beam shaping accessory and example attaching features for an LED lamp, according to some embodiments.

FIG. 13A is a perspective view of a beam shaping accessory 13A00 and example attaching features for an LED lamp. The attaching features of FIG. 13A are further described infra.

Figure 13B:
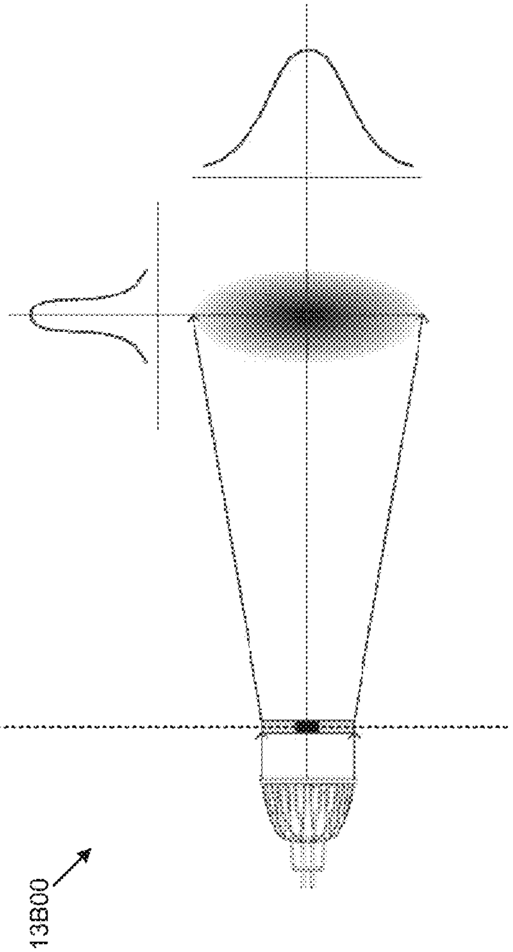
FIG. 13B is a schematic showing relative intensities of light after passing through an oval pattern beam shaping accessory as used with an LED lamp, according to some embodiments.

FIG. 13B is a schematic 13B00 showing relative intensities of light after passing through an oval pattern beam shaping accessory that has been treated to modulate an emanated light pattern as used with an LED lamp.

Figure 14:
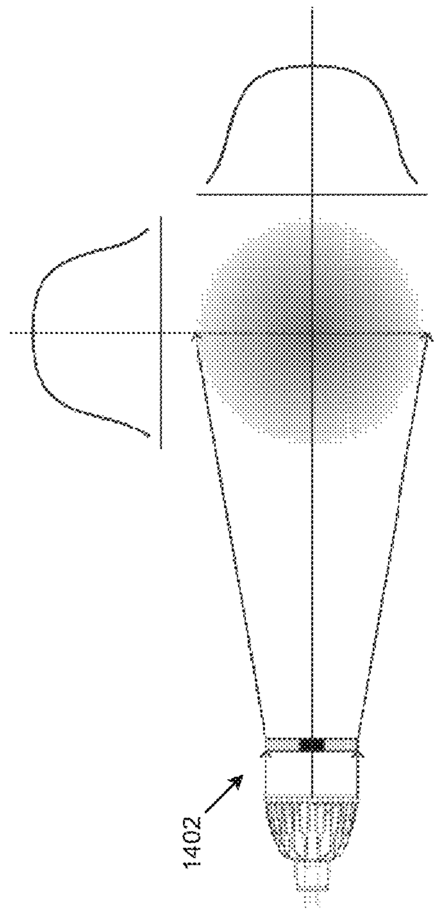
FIG. 14 is a schematic showing relative intensities of light after passing through a uniform circular beam shaping accessory as used with an LED lamp, according to some embodiments.

FIG. 14 is a schematic 1400 showing relative intensities of light after passing through a uniform circular beam shaping accessory 1402 as used with an LED lamp.

Figure 15:
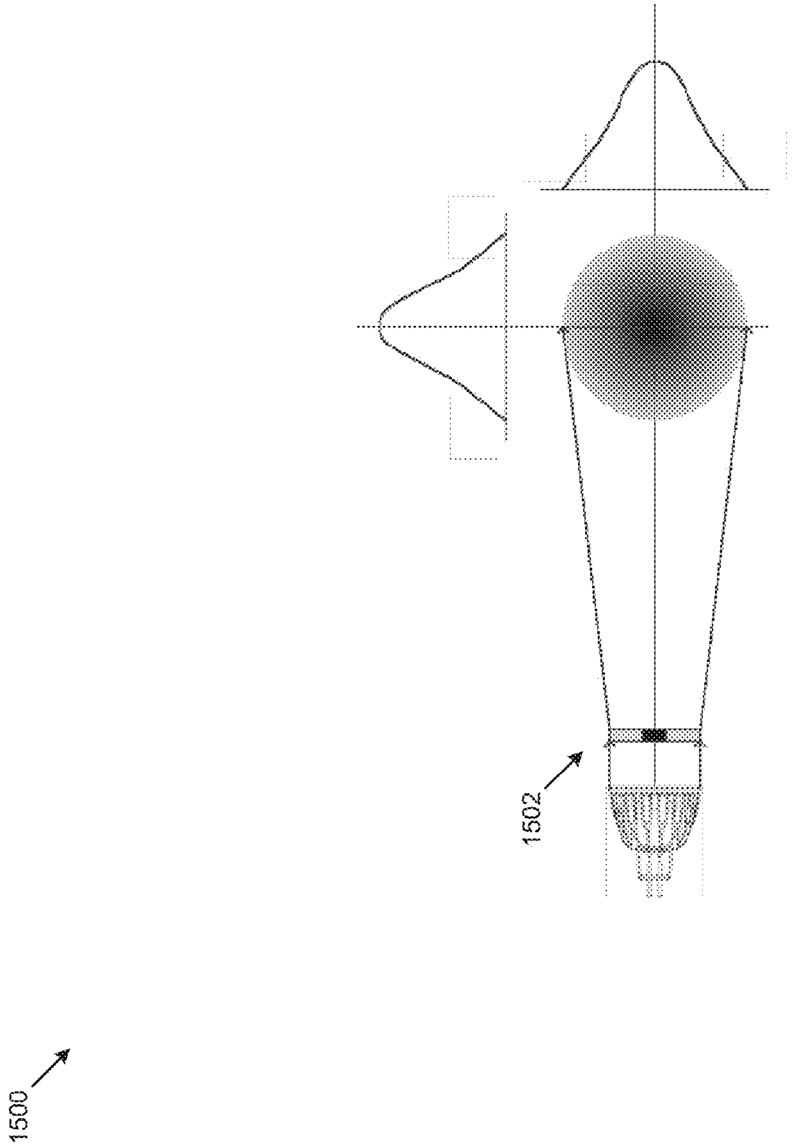
FIG. 15 is a schematic showing relative intensities of light after passing through a center-weighted circular beam shaping accessory as used with an LED lamp, according to some embodiments.

FIG. 15 is a schematic 1500 showing relative intensities of light after passing through a center-weighted circular beam shaping accessory 1502 as used with an LED lamp.

Figure 16:
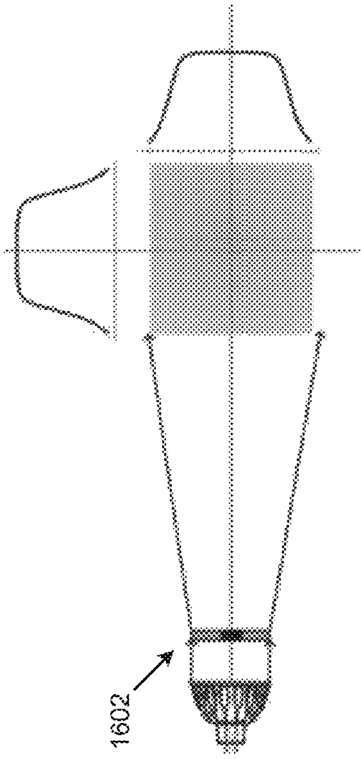
FIG. 16 is a schematic showing relative intensities of light after passing through a rectangular pattern beam shaping accessory as used with an LED lamp, according to some embodiments.

FIG. 16 is a schematic 1600 showing relative intensities of light after passing through a rectangular pattern beam shaping accessory 1602 as used with an LED lamp.

Figure 17:
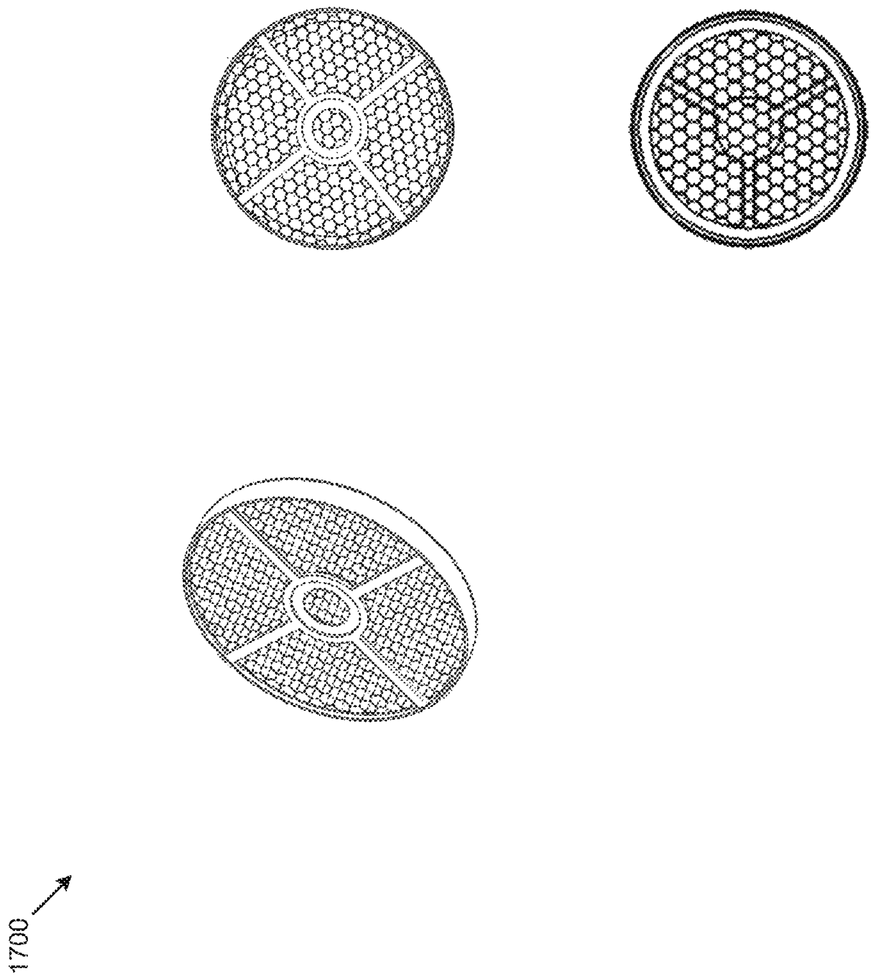
FIG. 17 presents views of a honeycomb louver accessory and attach features as used with an LED lamp, according to some embodiments.

FIG. 17 presents views of a honeycomb louver accessory 1700 and attach features as used with an LED lamp. The honeycomb shape of the accessory is used to cancel the incident glare from the light source and to direct the light to a specific area of interest.

Figure 18:
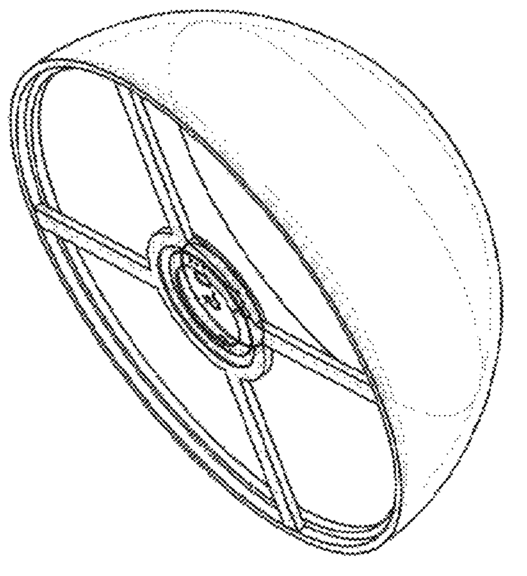
FIG. 18 presents a perspective view of a half dome diffuser accessory and attach features as used with an LED lamp, according to some embodiments.

FIG. 18 presents a perspective view of a half dome diffuser accessory 1800 that can serve to block the glare from the light source 1800. Also shown are attach features as used with an LED lamp.

Figure 19:
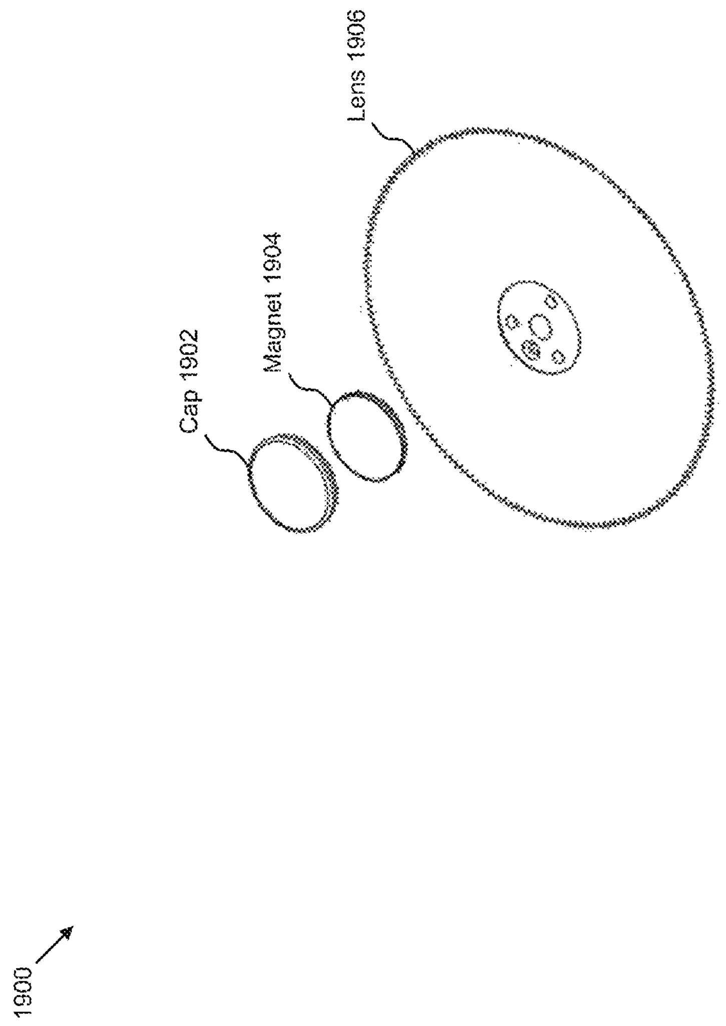
FIG. 19 is an exploded view of components in an assembly of a prism lens configured for use with an LED lamp, according to some embodiments.

FIG. 19 is an exploded view of components in an assembly of a prism lens 1900 configured for use with an LED lamp.

Various techniques could be utilized to secure the magnet to a lens or to the aforementioned accessories. Such techniques are not limited to one or another of the various methods. Non-limiting examples are:

Mold in place: This technique relies in part on geometry that is suitable for molding process. In some embodiments, the magnet is captured into place during an injection process.

Press-On: This technique relies at least in part on the friction and/or cohesion and/or adhesion between the magnet and the lens (or the magnet and the accessory) to hold the magnet in place. In certain applications, snap tabs can be utilized to flex open and snap-hold the magnet in place.

Glue: Various types of glue techniques are often capable of holding the magnet in place. An adhesive holds the magnet in place on the lens or the accessories. Depending on the material finish and temperature, various types of adhesive can be used to secure the magnet to other parts.

Ultra-sonic Weld: Ultra-Sonic welding (US) is a process used to attach the magnet to the lens or to the accessories. The US process utilizes a thin plastic cap 1920 to encapsulate a magnet (e.g., magnet 1904, as shown) onto the lens or the accessory (e.g., lens 1906). In the shown embodiment, the internal geometry of the accessory is designed so as to allow the same cap to enshroud magnets of different thickness. In some cases such an arrangement is employed in order to affix a magnet to either a lens or to an accessory.

One aspect of affixing a magnet to a lens is the lens light efficiency. Therefore the pocket on the lens should be only as deep as necessary. A thin magnet is used for the specific application of affixing the magnet on the face of the lens. As shown, the cap geometry is designed to encapsulate the thin magnet on the lens (which assembly is shown in FIG. 20).

Figure 20:
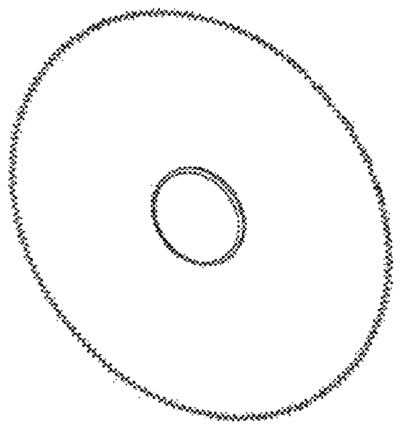
FIG. 20 shows an assembly of components to form a prism lens configured for use with an LED lamp, according to some embodiments.

FIG. 20 shows an assembly of components to form a prism lens 2000 configured for use with an LED lamp.

Figure 21:
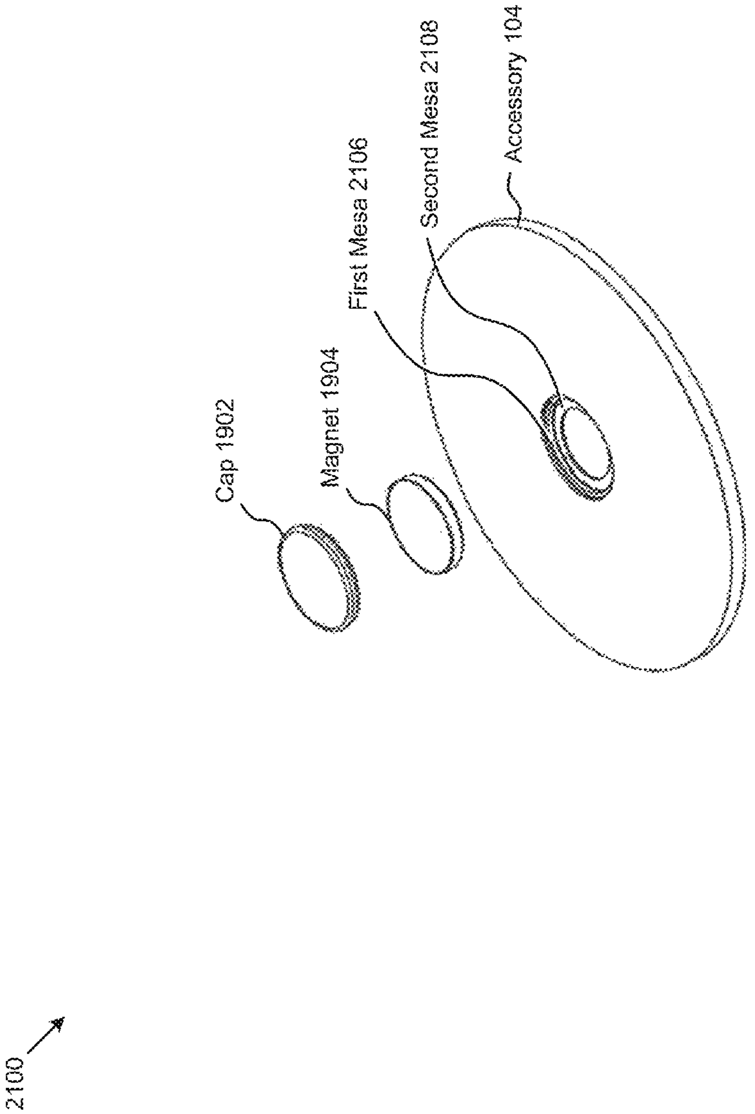
FIG. 21 is an exploded view of components in an assembly of a filter configured for use with an LED lamp, according to some embodiments.

FIG. 21 is an exploded view of components in an assembly of an accessory or a filter 2100 configured for use with an LED lamp.

The accessory shown has progressive pockets (e.g., having a first mesa 2106 and a second mesa 2108) for receiving the magnet, and for receiving the cap. For example, the magnet is placed in the pocket, then the cap is placed on top on top of the magnet, where the edges of the cap makes contact with a pocket. This assembly is then placed in an ultra-sonic welding machine that joins the cap to the accessory. Different thickness of magnets can be used. In some cases a different thickness is used for the accessory as compared with the thickness used for the lens.

In some cases the pockets are designed such that the same cap can be used to encapsulate the magnet on either the lens or the accessory.

Figure 22:
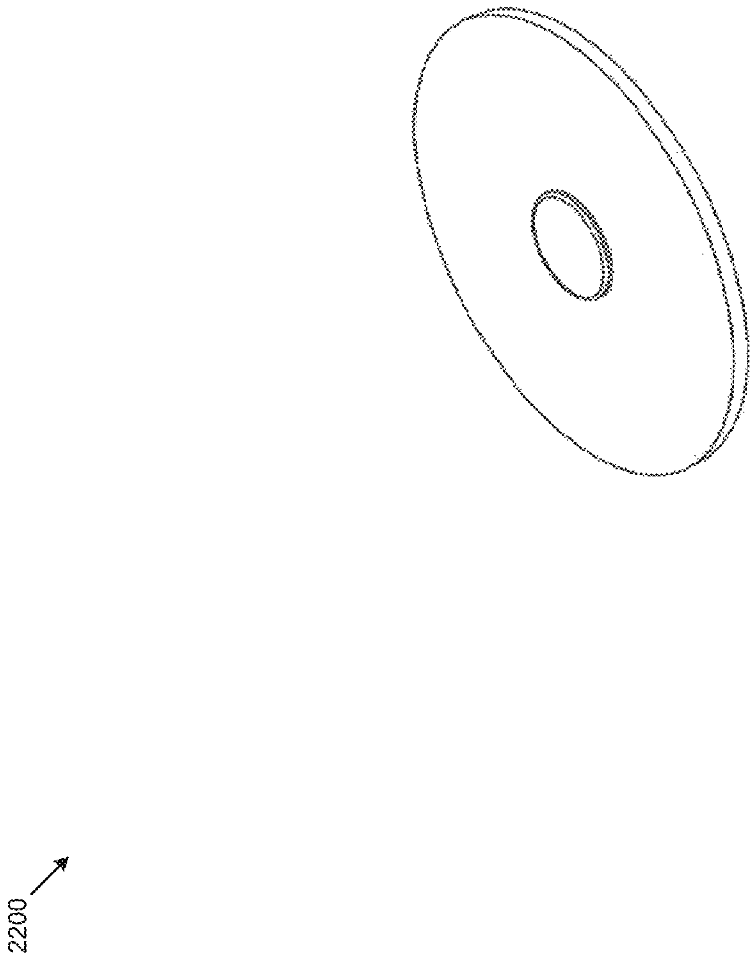
FIG. 22 shows an assembly of components to form a filter configured for use with an LED lamp, according to some embodiments shows a housing for implementing active accessories in an LED lamp, according to some embodiments.

FIG. 22 shows an assembly of components to form a filter 2200 such as, for example, a color filter or a polarizer, configured for use with an LED lamp.

In certain embodiments, an illumination source is configured to output light having a user-modifiable beam characteristic. Such an illumination source comprises an LED light unit configured to provide a light output in response to an output driving voltage; a driving module coupled to the LED light unit, wherein the driving module is configured to receive an input driving voltage and is configured to provide the output driving voltage; a heat sink coupled to the LED light unit, wherein the heat sink is configured to dissipate heat produced by the LED light unit and by the driving module; a reflector coupled to the heat sink, wherein the reflector is configured to receive the light output, and wherein the reflector is configured to output a first light beam having a first beam characteristic; and a lens coupled to the heat sink, wherein the lens is configured to receive the first light beam having the first beam characteristic, and wherein the lens is configured to output a second light beam having a second beam characteristic; wherein the lens is selected by the user to achieve the second beam characteristic; and wherein the lens is coupled to the heat sink by the user.

In certain embodiments, such as the immediately preceding embodiment, an illumination source is provided comprising a transmissive optical lens; and a retaining ring coupled to the transmissive optical lens, wherein the retaining ring is configured to couple the transmissive optical lens to the heat sink.

In certain embodiments, a retaining ring comprises an incomplete circle.

In certain embodiments of an illumination source, a lens that is coupled to a heat sink is configured to require use of a tool to decouple the lens from the heat sink.

In certain embodiments of an illumination source, the intensity for the light output from the illumination source is greater than approximately 1500 candela.

In certain embodiments of an illumination source, the first beam characteristic is selected from a beam angle, a cut-off angle, a roll-off characteristic, a field angle, and a combination of any of the foregoing.

In certain embodiments of an illumination source, a heat sink comprises a plurality of heat dissipation fins; wherein at least one of the plurality of heat dissipation fins includes a retaining mechanism; and a lens is configured to be coupled to at least one of the plurality of heat dissipation fins by means of a retaining mechanism.

In certain embodiments of an illumination source, a retaining mechanism is selected from an indentation on the heat dissipation fin, a clip coupled to the heat dissipation fin, and a combination thereof.

In certain embodiments of an illumination source, a heat sink comprises an MR16 form factor heat sink.

In certain embodiments of an illumination source, a driving module comprises a GU5.3 compatible base.

Certain embodiments provided by the present disclosure include methods of providing accessories and components for assembling the accessories to a user. Certain embodiments further provide for methods of assembling accessories provided by the present disclosure.

In certain embodiments of methods for configuring a light source to provide a light beam having a user-selected beam characteristic comprise: receiving a light source, wherein the light source comprises: a LED light unit configured to provide a light output in response to an output driving voltage; a driving module coupled to the LED light unit, wherein the driving module is configured to receive an input driving voltage and is configured to provide the output driving voltage; a heat sink coupled to the LED light unit, wherein the heat sink is configured to dissipate heat produced by the LED light unit and by the driving module; and a reflector coupled to the heat sink, wherein the reflector is configured to receive the light output, and wherein the reflector is configured to output a light beam having a first beam characteristic; receiving a user selection of a lens to achieve a second beam characteristic, wherein the lens is configured to receive the light beam having the first beam characteristic and wherein the lens is configured to output a light beam having the second beam characteristic; receiving the lens in response to the user selection of the lens, separate from the light source; and coupling the lens to the light source.

In certain methods such as the immediately preceding method the lens comprises an optical lens; and a retaining ring coupled to the optical lens, wherein the retaining ring is configured to couple the optical lens to the heat sink; and wherein coupling the lens to the heat sink comprises compressing the retaining ring about the optical lens; disposing the retaining ring that is compressed within a portion of the heat sink; and releasing the retaining ring such that the retaining ring is coupled to the portion of the heat sink.

In certain embodiments of methods, the retaining ring comprises a circular shaped metal.

In certain embodiments, methods further comprise decoupling the lens from the heat sink using a tool; wherein the decoupling step requires use of a tool to decouple the lens from the heat sink.

In certain embodiments, the intensity for the light output is greater than approximately 1500 candela.

In certain embodiments of methods, the first beam characteristic is selected from a group consisting of: beam angle, cut-off angles, roll-offs characteristic, and field angle.

In certain embodiments of methods, the heat sink comprises a plurality of heat dissipation fins; wherein at least one of the plurality of heat dissipation fin includes a retaining mechanism, and wherein coupling the lens to heat sink comprises coupling the lens to the at least one heat dissipation fin via the retaining mechanism.

In certain embodiments of methods, the retaining mechanism is selected from a group consisting of: an indentation on the heat dissipation fin, and a clip coupled to the heat dissipation fin.

In certain embodiments of methods, the heat sink comprises an MR16 form factor heat sink.

In certain embodiments of methods, the driving module comprises a GU5.3 compatible base.

Further embodiments can be envisioned to one of ordinary skill in the art after reading this disclosure. In other embodiments, combinations or sub-combinations of the above disclosed disclosure can be advantageously made. The block diagrams of the architecture and flow charts are grouped for ease of understanding. However it should be understood that combinations of blocks, additions of new blocks, re-arrangement of blocks, and the like are contemplated in alternative embodiments of the present disclosure.

The specification and drawings are, accordingly, to be regarded in an illustrative rather than a restrictive sense. It will, however, be evident that various modifications and changes may be made thereunto without departing from the broader spirit and scope.

Figure 23:
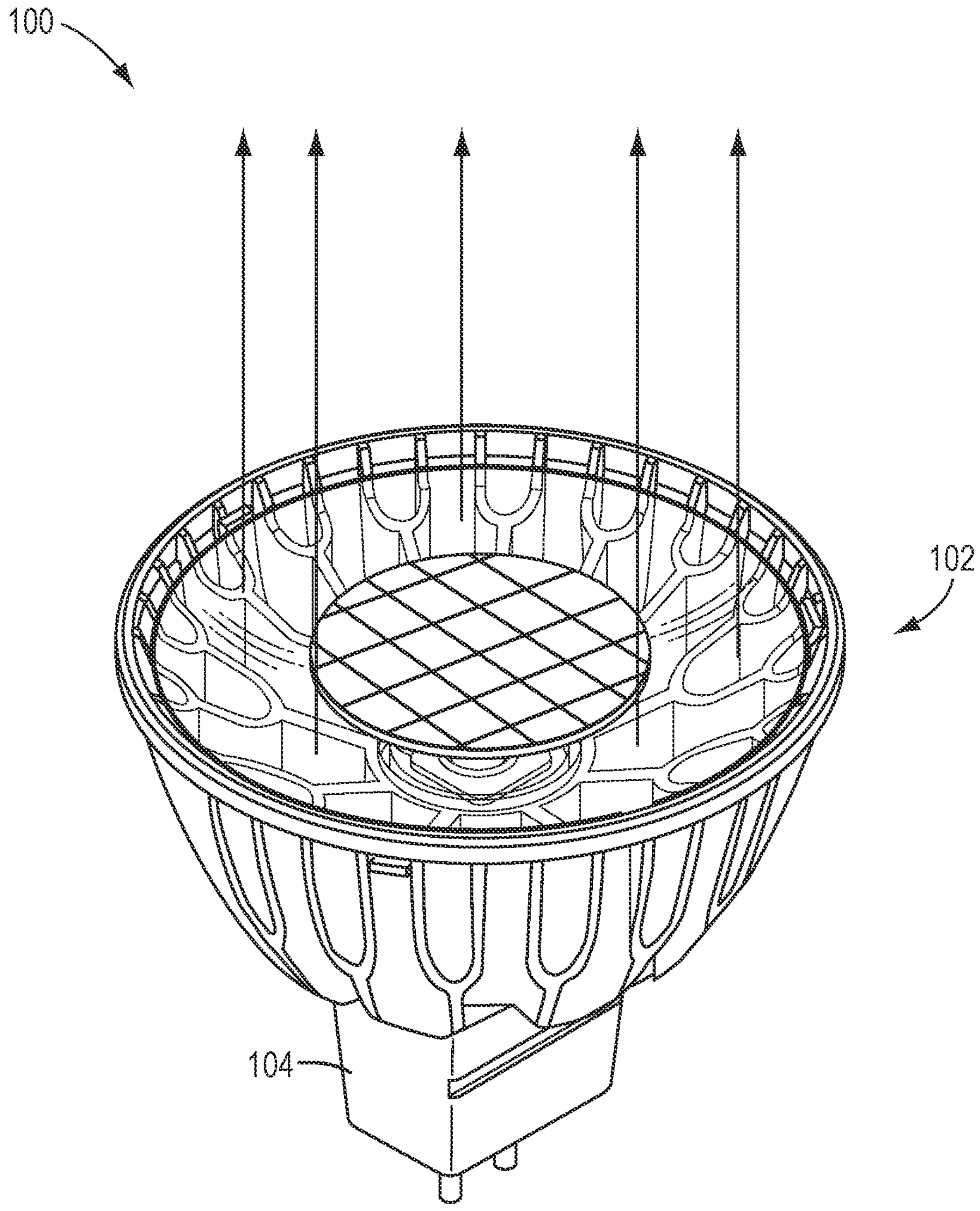

FIG. 23 shows a housing 100 for implementing active accessories in an LED lamp. The LED lamp includes a heat sink 102 and a base 104 and light (arrows) emanating from the optic.

In some embodiments, the housing has an inner volume (center cross-hatched area) suited for situating electronic components such as power conditioning circuitry and/or microprocessors and sensors.

Figure 24:
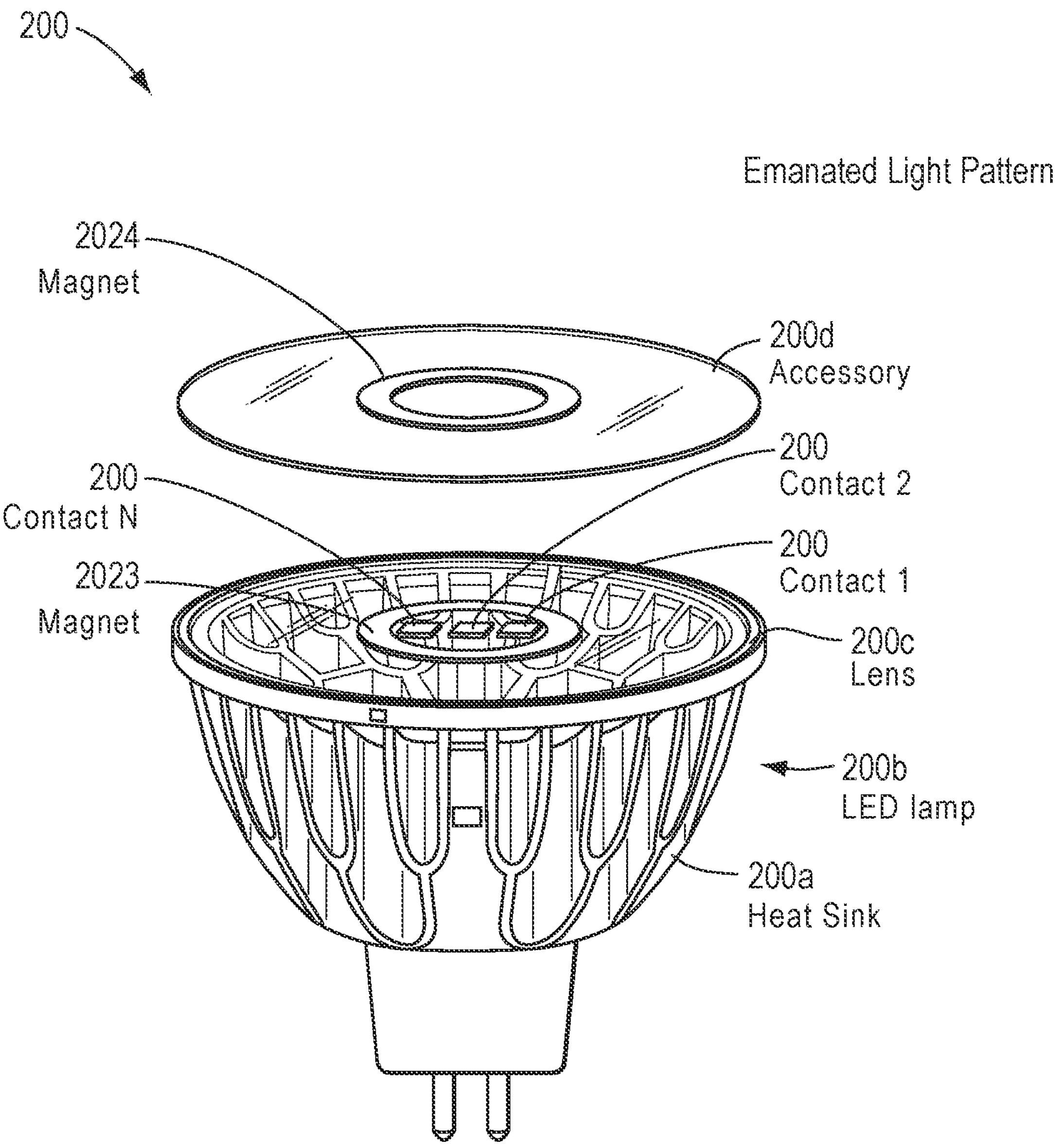
FIG. 24 shows an adapter used to provide active accessories in an LED lamp, according to some embodiments.

FIG. 24 shows an adapter 200 used to provide active accessories in an LED lamp. The LED lamp 200*b* includes a heat sink 200*a*, lens 200*c*, magnet 2023, magnet 2024, an accessory 200*d*, and electrical contacts N 200 (contact N, contact 1 and contact 2).

A plurality of contacts can be positioned atop the lens, and the contacts can be configured to provide an electrical connection to electronic components such as power conditioning circuitry and/or microprocessors and sensors. In some embodiments, an adapter uses magnetic forces to hold an accessory in place.

Figure 25:
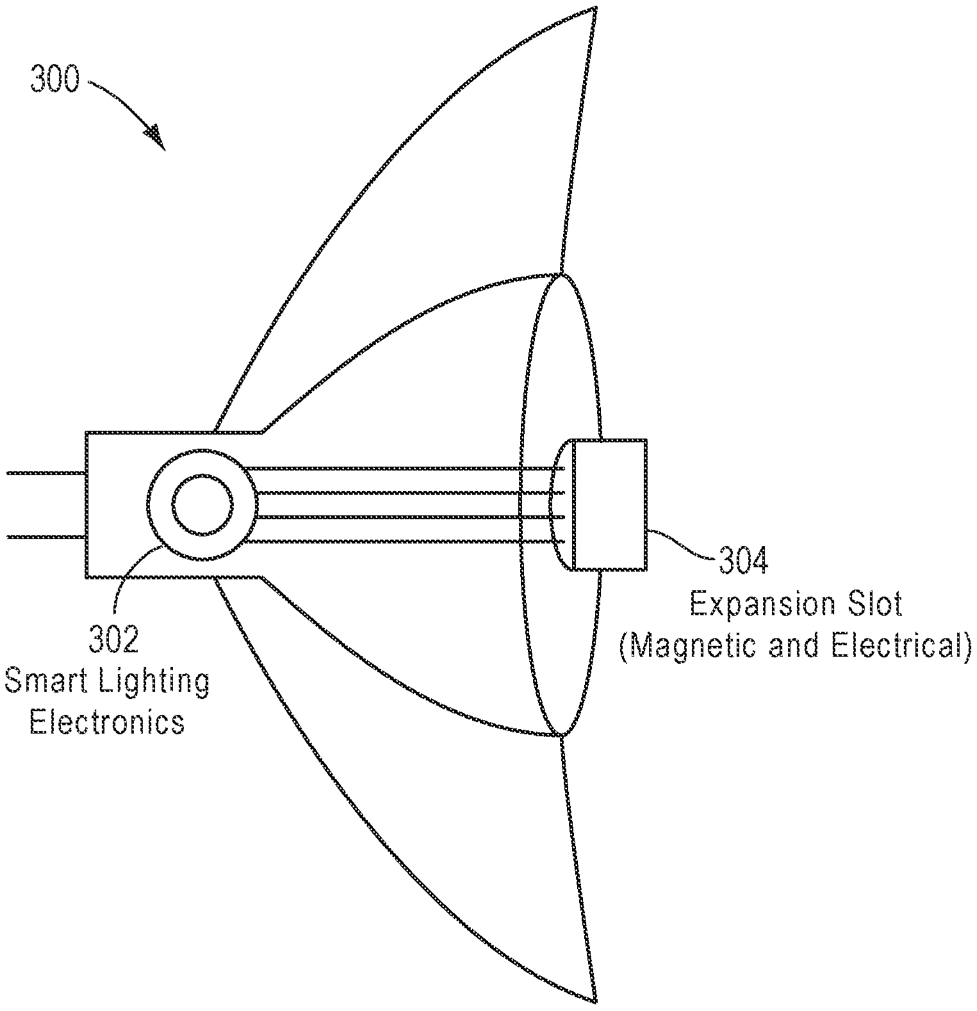
FIG. 25 shows superimposed profile shapes found in a range of lamp standards adapted to be used for providing active accessories in an LED lamp, according to some embodiments.
Figure 26:
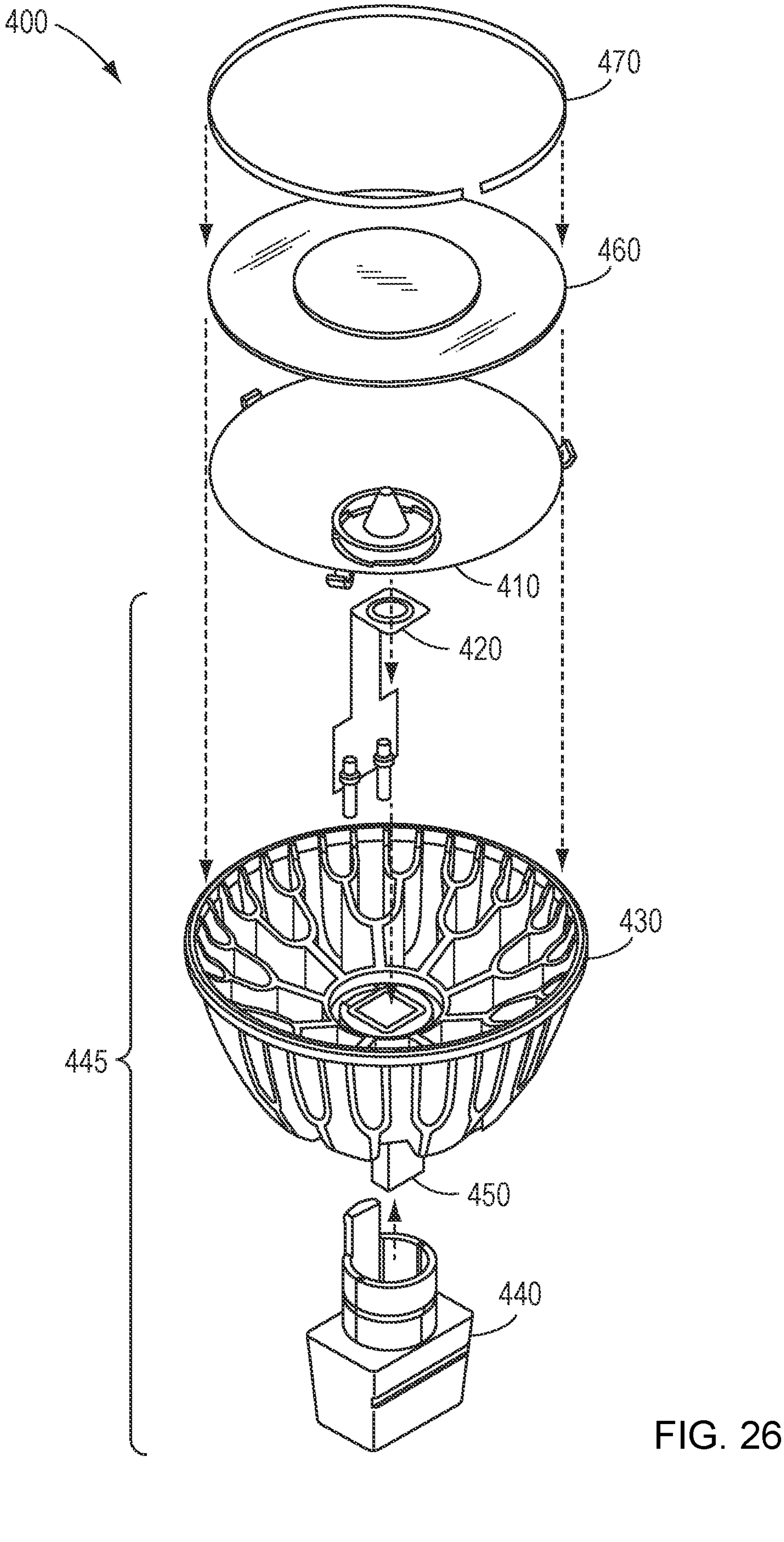

FIG. 25 shows superimposed profile shapes 300 found in a range of lamp standards adapted to be used for providing active accessories in an LED lamp. FIG. 25 also shows smart light electronics 302 electrically connected to an adapter within expansion slot 304.

A home or business may have several lamp types installed. Creating a set of smart accessories that fit any/all of these lamp types, and communicate with each other and with a central computer, in a consistent manner enables the consumer or business owner to monitor and control their environment efficiently and effectively. The accessories can have unique identifications and communicate with each other and a central computer using standard protocols such as uPnP, DLNA, or other interoperable or interoperability protocols. By using an expandable approach (e.g., using smart buttons versus a pre-integrated one that has the smarts built into each lamp) allows the lamps to be integrated into any operational environment of building management systems or smart lighting systems using a choice of smart buttons, and without having to replace the lamps.

Figure 7:
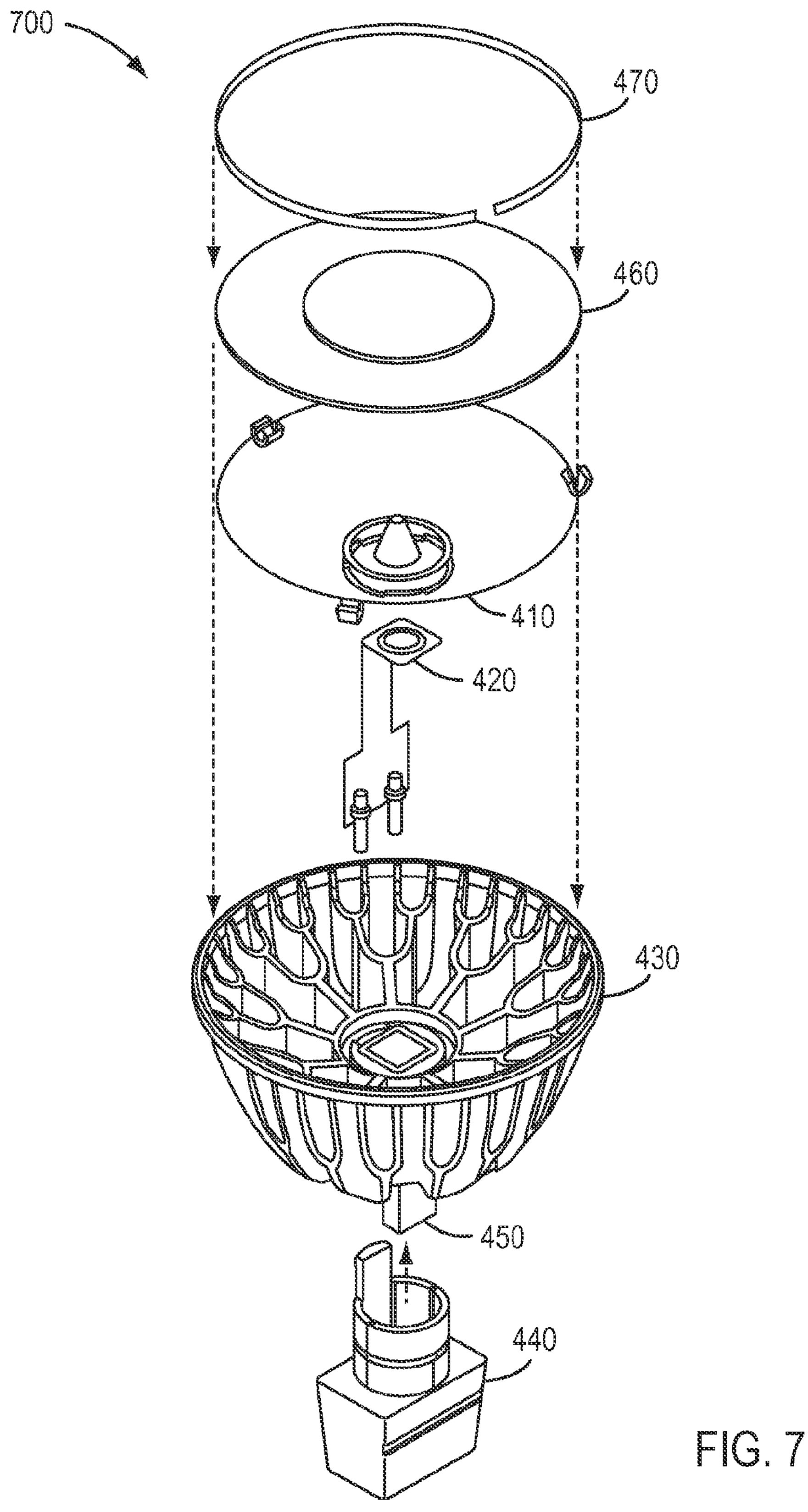
FIG. 7 depicts an exploded view of an LED lamp with multiple accessories according to certain embodiments of the present disclosure.

FIG. 7 show an exploded view of an assembly 400 found in a range of lamp standards adapted to be used for providing active accessories in an LED lamp. The LED lamp includes a base 440, a plug 450, a heat sink 430, a circuit including the LED 420, retaining ring 410, optic 460, and retaining ring 470.

Figure 27:
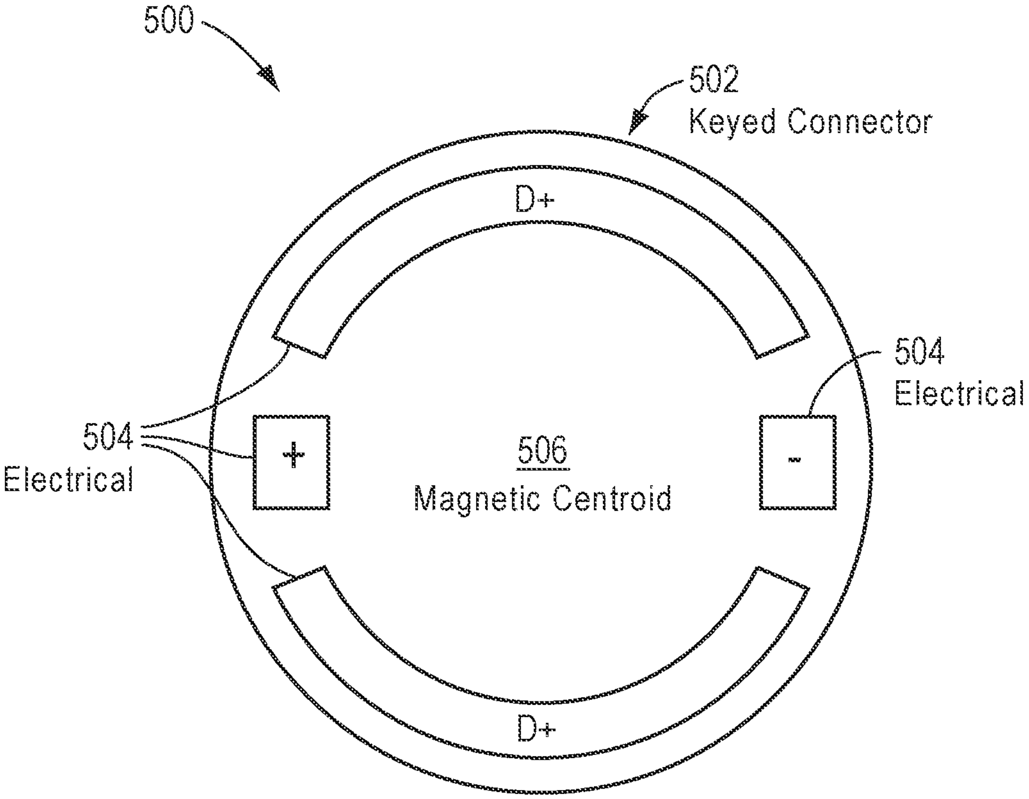
FIG. 27 shows a top view of a hybrid connector adapted to be used for providing active accessories in an LED lamp, according to some embodiments.

FIG. 27 shows a top view of a hybrid connector 500 adapted to be used for providing active accessories in an LED lamp. The adaptor includes electrical contacts 504, a keyed connector 502, and a magnetic centroid 506.

A standard interface like USB can be implemented using a simple connector with 4 or 5 terminals that carry power and data. USB provides the opportunity to leverage the vast ecosystem of systems and devices that have been built for the past few decades for PCs, CE devices, smartphones, etc., as well as the continuous evolution of the interface to accommodate new usages for consumers and businesses.

Figure 28:
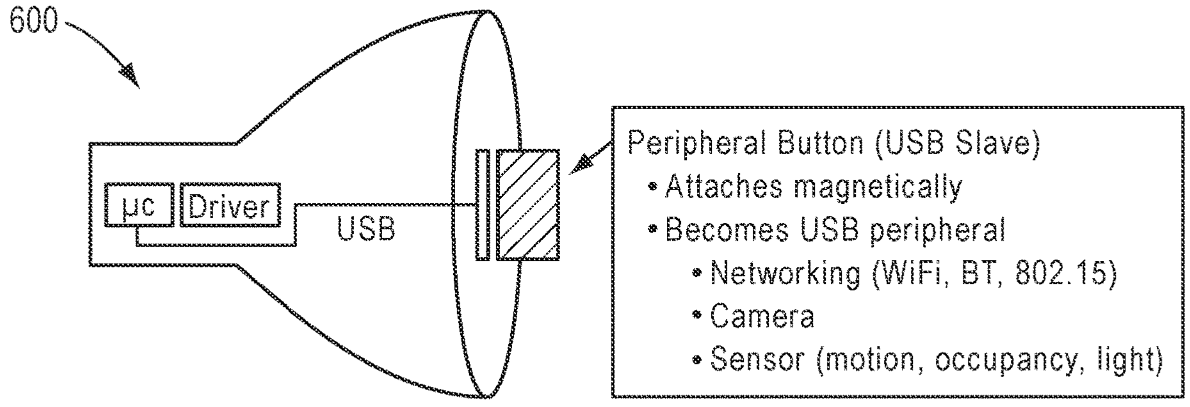
FIG. 28 shows a side view of a hybrid connector adapted to be used as a USB slave device for providing active accessories in an LED lamp, according to some embodiments.

FIG. 28 shows a side view of a hybrid connector 600 adapted to be used as a USB slave device for providing active accessories in an LED lamp.

A lamp can be built with a standard microcontroller or microprocessor with associated software, and with or without persistent connectivity to other devices or a central computer. The microcontroller or microprocessor can be used for internal lamp functions like controlling the LED driver, storing operational data like hours of usage, current and temperature data, etc. By attaching a smart USB Slave button, the functionality of the lamp can be extended to include wireless communication to other lamps and a central computer for lamp monitoring and control, connection to peripheral devices like a camera and sensors.

Figure 29:
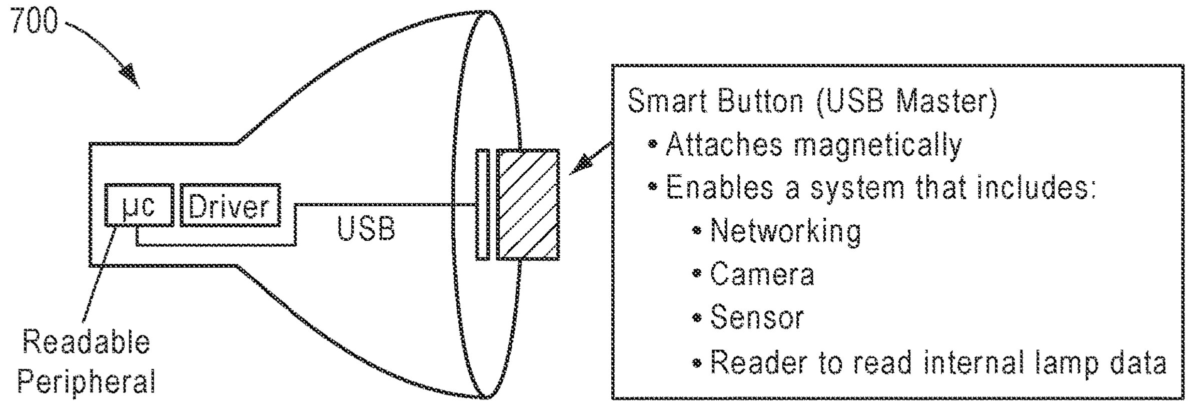
FIG. 29 shows a side view of a hybrid connector adapted to be used as a USB master device for providing active accessories in an LED lamp, according to some embodiments.

FIG. 29 shows a side view of a hybrid connector 700 adapted to be used as a USB master device for providing active accessories in an LED lamp.

A lamp can be built with even without a microcontroller or microprocessor, yet supporting a simple USB-based readable storage that stores operational data of the lamp like hours of usage, current and temperature data, etc. Once a smart USB Master button that has a microcontroller or microprocessor is connected to the lamp, that USB device can be read by the microcontroller or microprocessor on the smart button. The smart button can also integrate wireless networking to implement lamp monitoring and control, and can communicate with other lamps and/or can communicate with a central computer. It may also contain a camera and/or other sensors.

Figure 30:
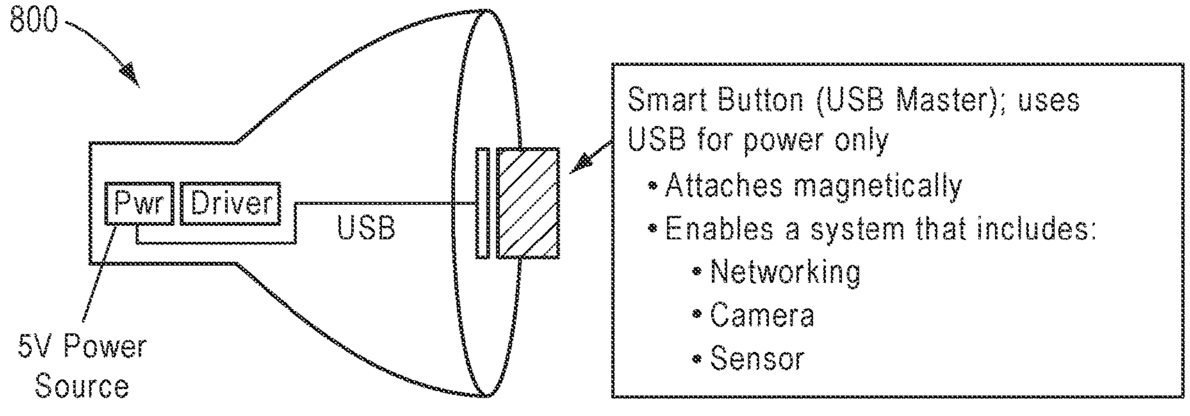
FIG. 30 shows a side view of a hybrid connector adapted to be used as power-delivery device for providing active accessories in an LED lamp, according to some embodiments.
Figure 31:
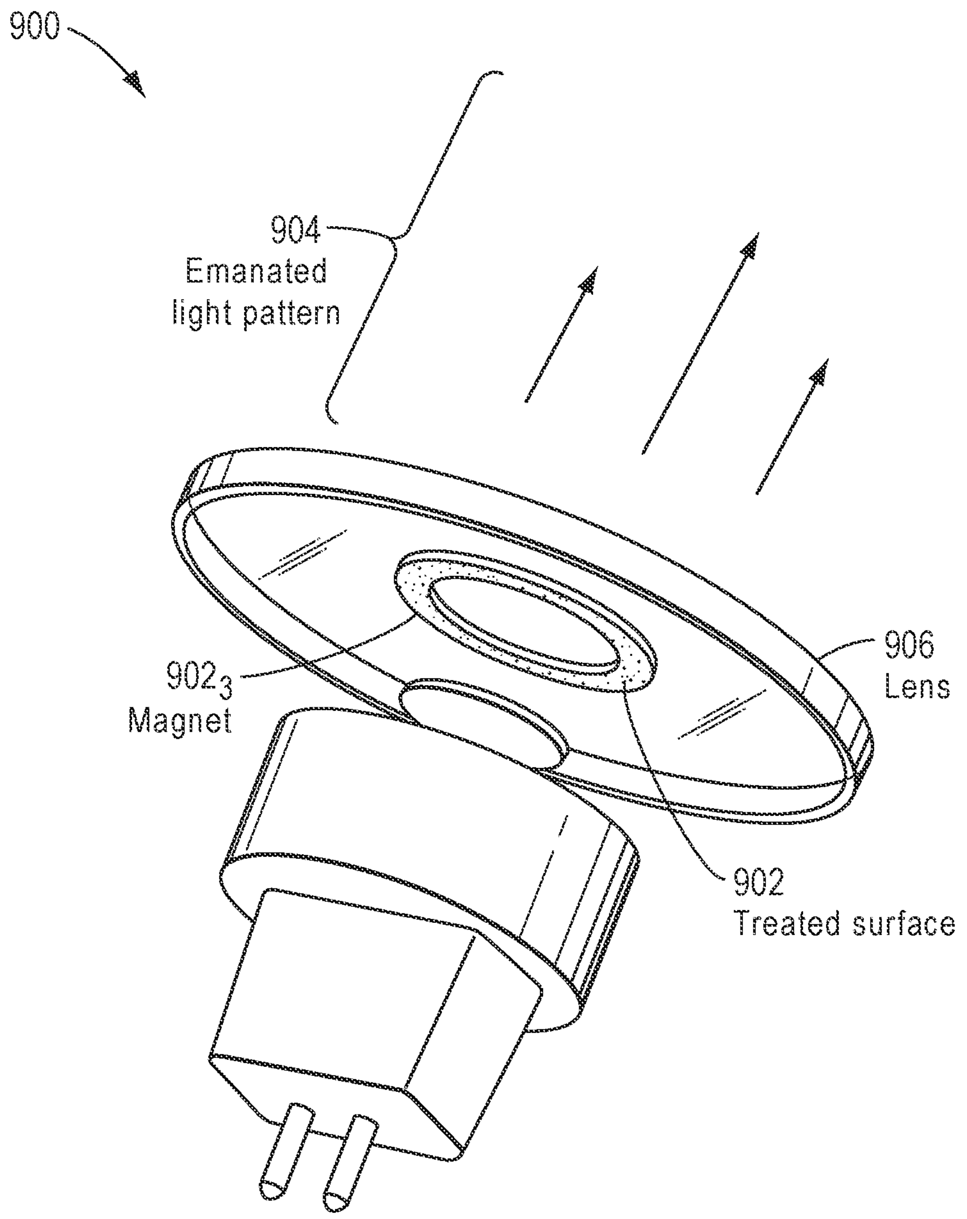
Figure 32A:
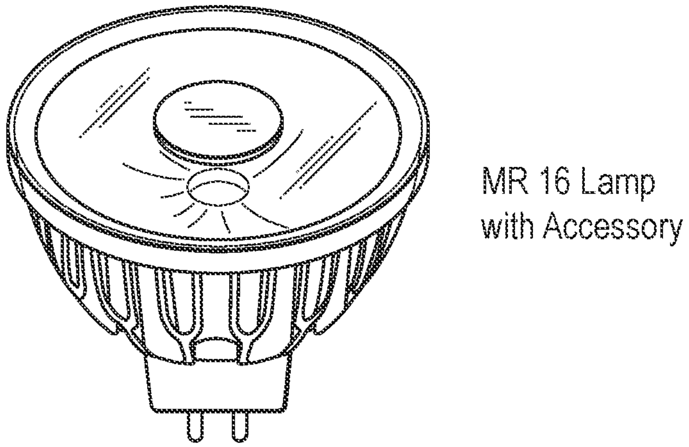
Figure 32B:
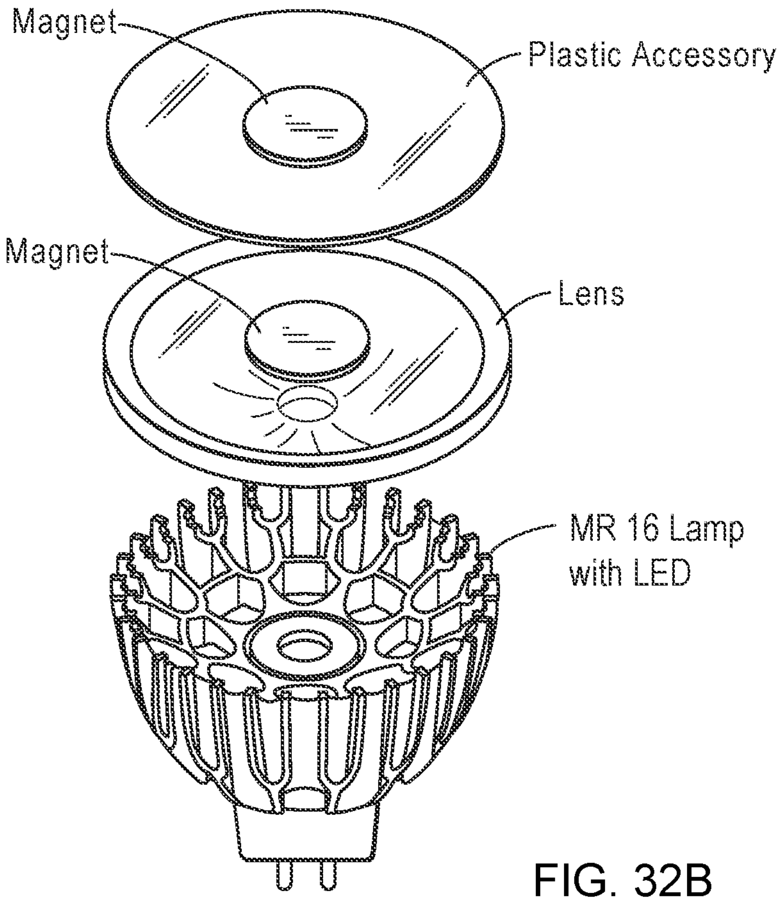
Figure 33:
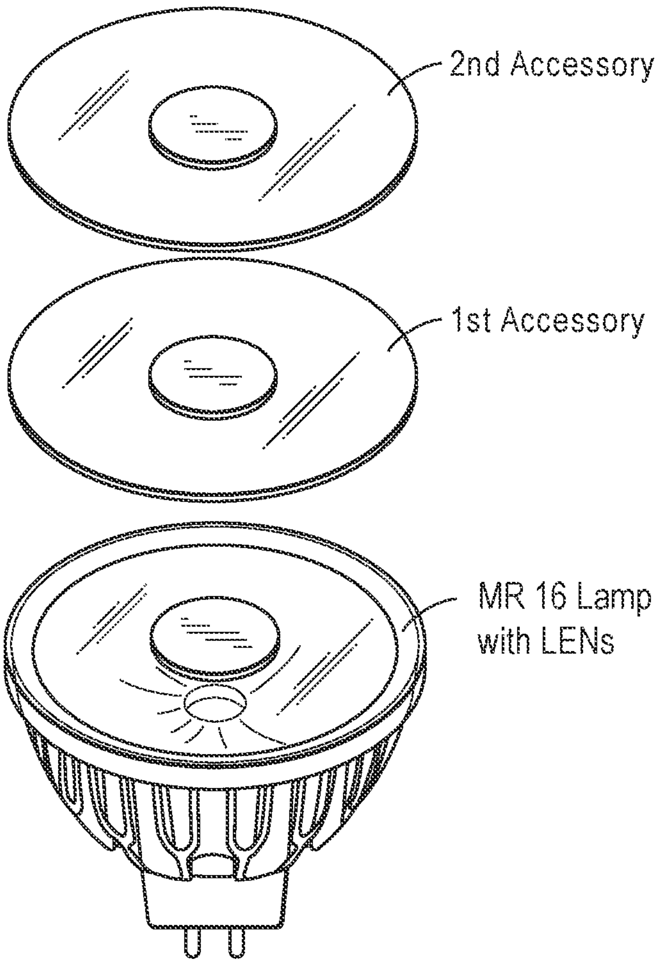

FIG. 30 shows a side view of a hybrid connector 800 adapted to be used as power-delivery device for providing active accessories in an LED lamp.

A lamp can be built with a device that provides power to the smart button connector. When a smart USB Master button that has a microcontroller or microprocessor is connected to the lamp, the lamp can be turned into a smart lamp. The smart button can integrate wireless networking to implement lamp monitoring and control, and communication with other lamps and a central computer. It may also contain a camera and sensors. It may also contain readable storage that stores operational data of the lamp such as hours of usage, current and temperature data, etc.

One embodiment disposes accessories on the face of the lamp, in a proximity that is thermally isolated from the heat source and high temperatures of the LED. In certain embodiments, the face of the lamp is open to the environment so as to facilitate heat dissipation of any electronics. Such a face-mounting further facilitates antenna placement (e.g., for wireless operation), and for camera and sensor operation. It also makes it easy to connect and disconnect accessories.

In certain embodiments, an LED lamp comprises a lens having a center and a diameter; a first magnet attached to the center of the lens; a first accessory disposed on the lens; and a second magnet attached to the center of the first accessory; wherein the first magnet and the second magnet are configured to retain the first accessory against the lens.

There are many configurations of LED lamps beyond the depicted MR-16 lamp. For example, Table 4 gives standards (see "Designation") and corresponding characteristics.

TABLE 4

LED lamp standards.

| Designation | Base Diameter (crest of thread) | Name | IEC 60061-1 Standard Sheet |
|---|---|---|---|
| | 5 mm | Lilliput Edison Screw (LES) | 7004-25 |
| E10 | 10 mm | Miniature Edison Screw (MES) | 7004-22 |
| E11 | 11 mm | Mini-Candelabra Edison Screw (mini-can) | (7004-6-1) |
| E12 | 12 mm | Candelabra Edison Screw (CES) | 7004-28 |
| E14 | 14 mm | Small Edison Screw (SES) | 7004-23 |
| E17 | 17 mm | Intermediate Edison Screw (IES) | 7004-26 |
| E26 | 26 mm | [Medium] (one-inch) Edison Screw (ES or MES) | 7004-21A-2 |
| E27 | 27 mm | [Medium] Edison Screw (ES) | 7004-21 |
| E29 | 29 mm | [Admedium] Edison Screw (ES) | |
| E39 | 39 mm | Single-contact (Mogul) Giant Edison Screw (GES) | 7004-24-A1 |
| E40 | 40 mm | (Mogul) Giant Edison Screw (GES) | 7004-24 |

Additionally, a base member (e.g., shell, casing, etc.) can be of any form factor configured to support electrical connections, which electrical connections can conform to any of a set of types or standards. For example, Table 5 gives standards (see "Type") and corresponding characteristics, including mechanical spacings.

TABLE 2 lamp electrical connection standards.

| Type | Standard | Pin (center to center) | Pin Diameter | Usage |
|---|---|---|---|---|
| G4 | IEC 60061-1 (7004-72) | 4.0 mm | 0.65-0.75 mm | MR11 and other small halogens of 5/10/20 watt and 6/12 volt |
| GU4 | IEC 60061-1 (7004-108) | 4.0 mm | 0.95-1.05 mm | |
| GY4 | IEC 60061-1 (7004-72A) | 4.0 mm | 0.65-0.75 mm | |
| GZ4 | IEC 60061-1 (7004-64) | 4.0 mm | 0.95-1.05 mm | |
| G5 | IEC 60061-1 (7004-52-5) | 5 mm | | T4 and T5 fluorescent tubes |
| G5.3 | IEC 60061-1 (7004-73) | 5.33 mm | 1.47-1.65 mm | |
| G5.3-4.8 | IEC 60061-1 (7004-126-1) | | | |
| GU5.3 | IEC 60061-1 (7004-109) | 5.33 mm | 1.45-1.6 mm | |
| GX5.3 | IEC 60061-1 (7004-73A) | 5.33 mm | 1.45-1.6 mm | MR16 and other small halogens of 20/35/50 watt and 12/24 volt |
| GY5.3 | IEC 60061-1 (7004-73B) | 5.33 mm | | |
| G6.35 | IEC 60061-1 (7004-59) | 6.35 mm | 0.95-1.05 mm | |
| GX6.35 | IEC 60061-1 (7004-59) | 6.35 mm | 0.95-1.05 mm | |
| GY6.35 | IEC 60061-1 (7004-59) | 6.35 mm | 1.2-1.3 mm | Halogen 100 W 120 V |
| GZ6.35 | IEC 60061-1 (7004-59A) | 6.35 mm | 0.95-1.05 mm | |
| G8 | | 8.0 mm | | Halogen 100 W 120 V |
| GY8.6 | | 8.6 mm | | Halogen 100 W 120 V |
| G9 | IEC 60061-1 (7004-129) | 9.0 mm | | Halogen 120 V (US)/230 V (EU) |
| G9.5 | | 9.5 mm | 3.10-3.25 mm | Common for theatre use, several variants |
| GU10 | | 10 mm | | Twist-lock 120/230-volt MR16 halogen lighting of 35/50 watt, since mid-2000s |

TABLE 2-continued

| lamp electrical connection standards. | | | | |
|---|---|---|---|---|
| Type | Standard | Pin (center to center) | Pin Diameter | Usage |
| G12 | | 12.0 mm | 2.35 mm | Used in theatre and single-end metal halide lamps |
| G13 | | 12.7 mm | | T8 and T12 fluorescent tubes |
| G23 | | 23 mm | 2 mm | |
| GU24 | | 24 mm | | Twist-lock for self-ballasted compact fluorescents, since 2000s |
| G38 | | 38 mm | | Mostly used for high-wattage theatre lamps |
| GX53 | | 53 mm | | Twist-lock for puck-shaped under-cabinet compact fluorescents, since 2000s |

Additionally, a lens may comprise a bulb or remote member used in forming the LED lamp. The aspect of a center can mean a center from the perspective of any center, or even a centroid (from any view) as in the case of an irregularly shaped lens.

Accessories and methods of attached accessories disclosed herein may be used with any suitable LED lamp configuration including without limitation any of those disclosed in Table 4 and/or in combination with any form factors disclosed in Table 5.

Figure 34:
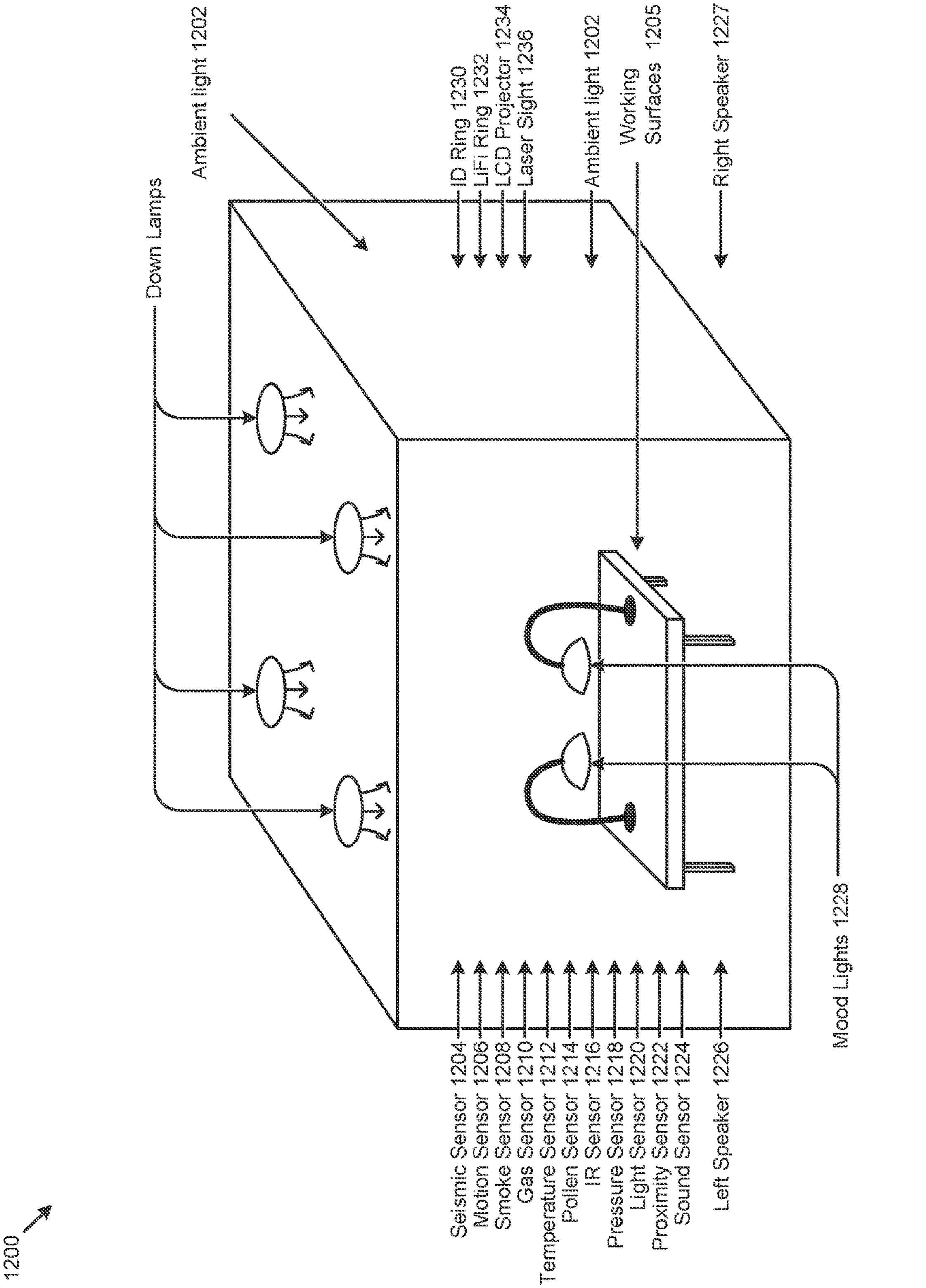
FIG. 34 depicts an environment within which LED lamps with multiple active accessories can be deployed.

FIG. 34 depicts an environment 1200 within which LED lamps with multiple active accessories can be deployed. In particular, FIG. 34 depicts an arrangement of various lights (e.g., lamps and or fixtures) positioned in a way as to provide useful illumination both for general illumination lamps (e.g., down lamps) as well as lamps for task lighting at working surfaces 1205. There may be incidental sources of light (e.g., ambient light 1202), for example, natural light or other illumination entering the environment through a window or door.

The various lights may be grouped together in a way that is commonly known as a zone. In a lighting zone, the lamps within a group act together in their potentially variable light output. One or more of the lights may have active electronic accessories attached ("SNAPs") which provide one or more various functionalities. In some situations, one or more or all of the lamps may be in communication with one or more of other lamps, and/or in communication with a controlling and/or monitoring device and/or the Internet (e.g., via a cloud-based control/monitor). One or more or all of the lamps may also have sensors to assess ambient light, motion, occupancy, temperature, IR data, proximity, gasses (e.g., CO, $CO_2$, methane, etc.), products of combustion (e.g., from fire or smoldering), smoke (e.g., cigarette smoke, compound-laden vapors, etc.), humidity, human body temperature, remote object temperature (e.g., by IR sensing) etc.

Any number of these sensors may be constructed into a SNAP form factor, and any number can be attached in any combination to one or more lamps. There may be one or more sensors (with or without wireless communication functionality) on a SNAP accessory, and there may be one or more SNAPs attached to a single lamp.

In one embodiment, a particular lamp (perhaps near a door) has a motion sensor SNAP attached. Another lamp (perhaps near a window) has an ambient light sensor. Certain lamps and/or attached SNAP accessories may have a wireless or IR communication function, and individual ones or groups of lamps can be individually or in groups as pertaining to one or more zones. Zone marking SNAPs are further discussed infra. Zone marking SNAPs may or may not be permanently affixed. In some cases a remembered zone designation may be "imparted" from an accessory to a lamp and henceforth remembered by the lamp. The impartation can occur merely through momentarily attaching a zone marking SNAP to the lamp. In such scenarios, similarly-zoned lamp can operate and/or cooperate in a group. For example, a light having a motion sensor can cause all lamps sharing the same zone designation to become activated when motion is detected. Concurrently, perhaps in the same zone or part of the zone, or in a different zone, a communication unit and/or ambient light sensor will cause certain lamps near a window to dim when incoming ambient light is sensed.

Manual control over each lamp or group of lamps can be managed under wireless control and/or under IR control, with or without intervention by an occupant of the room, or with or without intervention by an automated controller, or with or without intervention or by a remote controller located remotely from the subject lamp or group of lamps. The SNAP accessories may be freely re-deployed (e.g., to a different lamp or to a different location) and the re-deployment enables new functions corresponding to the new arrangement.

Programmed functionality may be offered by the combination of an automated controller and additional SNAPs or by the SNAPs themselves. A "Fire Egress" SNAP could designate a lamp to be always on even if dimmed 24 hours a day. An event trigger such as a detected open flame, smoke or an external signal of a fire alarm (e.g., perhaps coming through the programmed controller) being tripped can cause the lights to come to a preset maximum intensity, and/or with egress indications (e.g., illuminated arrows and/or blinking to attract attention).

Some combinations include various forms of an "Enterprise Outlook" SNAP so that an email address can become the address of a lighting system (e.g., group of lamps, similarly-zoned lamps, etc.) can become the address of a specific lamp. Strictly as one example, sending an email to lamp-on.name@domain.com might control the task light at Name's desk. Further active elements and sample functions are given in the following tables.

TABLE 3

| Sample active elements and functions. | |
|---|---|
| Active Element | Exemplary Function |
| "ID Ring": | Ring fitted to lap has a "zone ID" |
| Motion detector (e.g., motion sensor 1206) | Sense and report |
| Fire Egress | Always illuminated to show the egress. Flashing or blinking during periods of alert |
| Smoke detector (e.g., smoke sensor 1208) | Sense and report |
| Carbon-monoxide detector (e.g., gas sensor 1210) | Sense and report |
| Ambient temperature sensors (e.g., temperature sensor 1212) | Sense and report |
| Ambient sound microphone Hi-Fi speakers | Sense and report |
| Pollution detector (e.g., pollen sensor 1214) | Sense and report |
| Infrared sensor (e.g., IR sensor 1216) | Sense code and report |
| Weather detector (e.g., using pressure sensor 1218) | Sense using barometer, temperature, thunder storms, etc. |
| Ambient light detector | Vary the color gamut while keeping the chromaticity fixed. |

TABLE 3-continued

Sample active elements and functions.

| Active Element | Exemplary Function |
|---|---|
| Diagnostic attachment | Perform lumen readings and color readings for lifetime maintenance |
| Proximity detector (e.g. proximity sensor 1222) | Sense and report |
| Maintenance sensor LLF = 1 | (constant illumination characteristics over degradation due to time or environment) |
| Combination: Zone ring, plus motion sensor | Sense and report by zone |
| Directional sound detector (e.g., sound sensor 1224) | Use 2 radios (e.g., Bluetooth Low-energy) |
| Passive light guides of various types | To shape beams and/or to direct illumination |
| SNAP location or ID accessory | To aid in indoor positioning |
| Adjust light (auto-ON/Off) | On, Off, Dimming |
| LCD accessory | Direct beam through it to change color or focus |
| Multiple rings fit together | To and pass power and control signals |
| Laser (e.g., laser sight 1236) | Sight, other detection from laser |
| LiFi (e.g., LiFi ring 1232) | Re-broadcasting |
| Auto-commissioning ring | (e.g., based on ID) |
| Work/Rest Period sensor | Adjust for circadian |
| Ambient light sensor or timer (e.g., light sensor 1220) | Night light |
| Decorative lighting | On, Off, Dimming |
| Idiot lights | For sense or reading reporting |
| Beacon | Proximity of mobile device |
| Buzzer | Alarm(s) |
| Semi-Passive accessory | Beam shaping by turning ring |
| Motor | To aim or change beam profile |
| Add a fan | For a “cooler” |
| Rotating polarizer | To aim or change beam polarization |
| LCD imager (e.g., LCD projector 1234) | Local projection |
| Gobo | (see below) |
| Ambient/whitepoint correction sensor | For wall or object or painting-maintain chromaticity |
| Active-to-Active combinations | (see below) |
| Acoustic Transducer (e.g., left speaker 1226, right speaker 1227) | Music reproduction: Left and right can be set or sensed by the zone ring |
| Zone ring, zone controller (e.g., ID ring 1230, etc.) | Zone ring controls color temperature, time (e.g., for circadian cycle) |
| Mood lights that are responsive to microphone and mood detector processor | Use in a mood-setting mode (e.g., using one or more mood lights 1228). The lamp adjusts colors dependent on music played, etc. |
| SNAP elements that go onto a magnet disposed at ring (not over glare blocker) | For multi-function flexibility |
| Seismic activity sensor (e.g. seismic sensor 1204) and warning | Detect seismic activity, filter to reduce false alarms, and signal warning (e.g., at one lamp or at a group of lamps) |

Any of the active accessories, singly or in combination can be deployed onto or with a compatible lamp.

Figure 35:
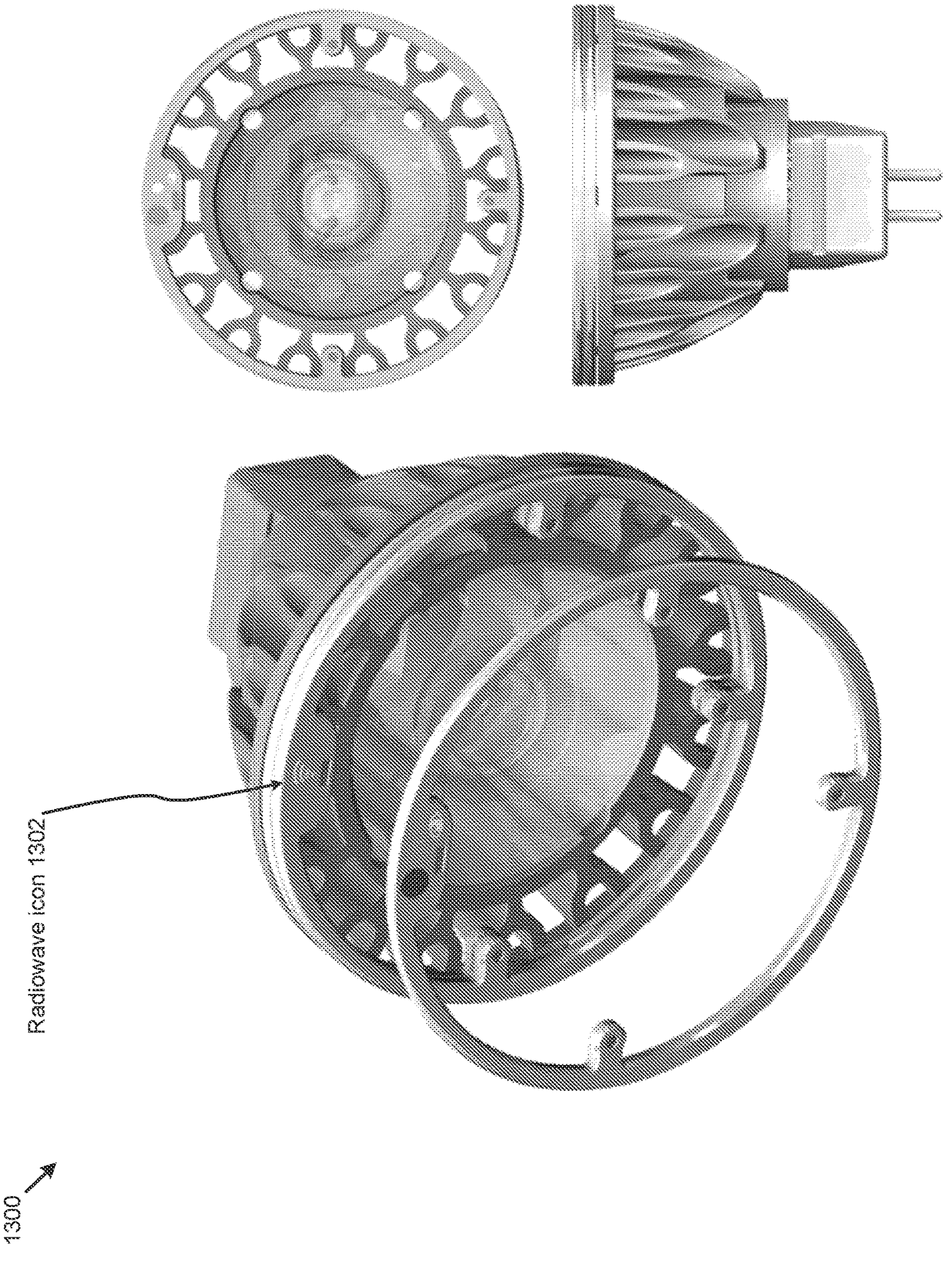
FIG. 35 depicts a selection of views of a lamp having an attachment about the periphery of the lamp face as used for hosting active accessories, according to one embodiment.

FIG. 35 depicts a selection of views 1300 of a lamp having an attachment about the periphery of the lamp face as used for hosting active accessories.

Figure 44:
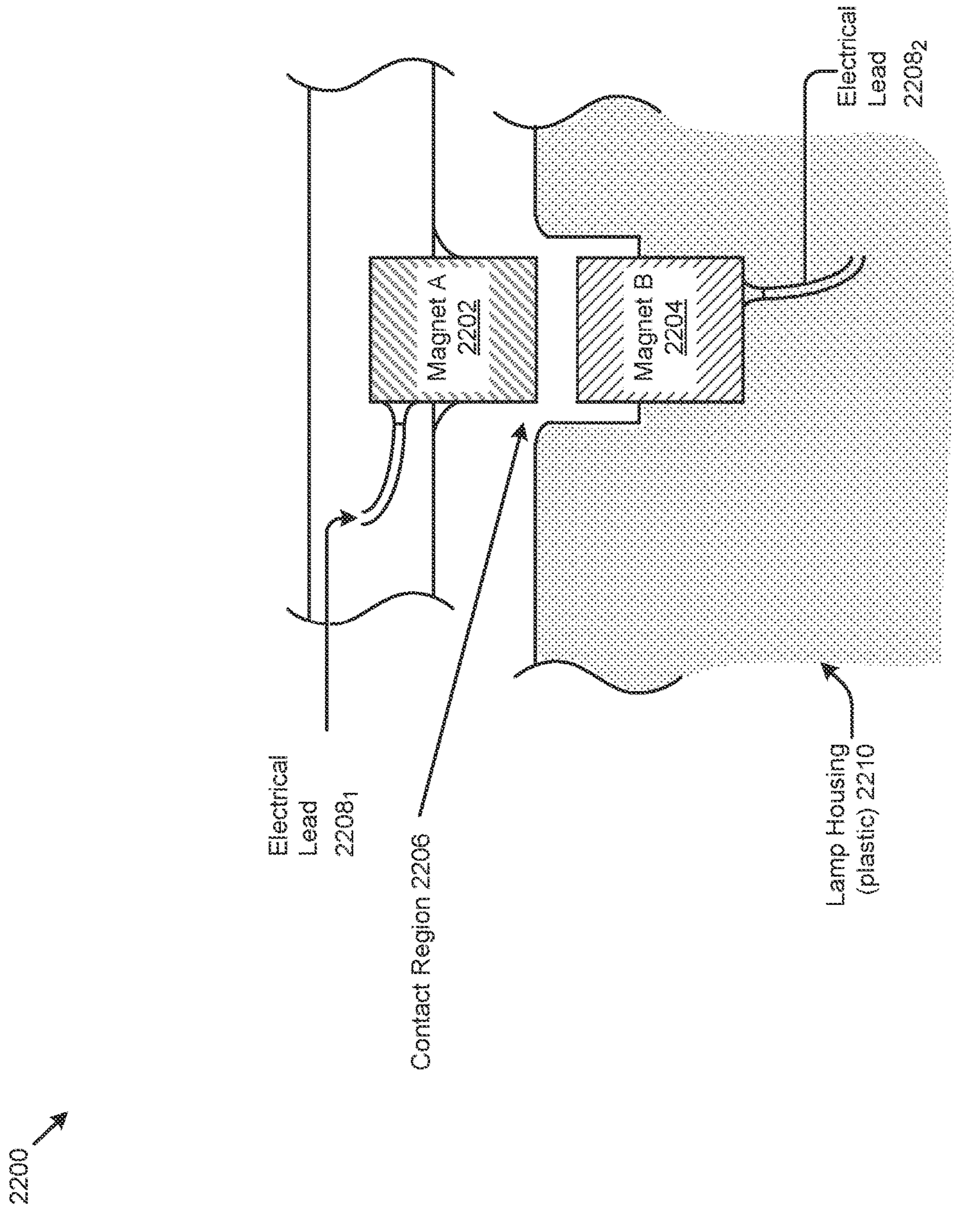
FIG. 44 depicts a side side-view cutaway to show use of two or more magnets to form an electrical contact, according to one embodiment.

As shown in FIG. 35, the views depict an MR-16 lamp comprising a lens having a periphery with border magnets embedded about a periphery of the lens. A particular periphery can be the outermost periphery of the lamp, or can be an inner periphery, and can be placed (as shown) abutting a border. The shown border about an inner core. A first set of border magnets with a particular polarity can be embedded about a periphery of the lens, for example within the recess of a contact region. A second set of border magnets with a particular polarity can be embedded about a periphery of an accessory. The contact region is large enough such that a first border magnet positioned at the inner core can be in contact with a second border magnet positioned in a periphery of an accessory, and the contact between the two magnets can form an electrical connection. As shown, there are four contact regions, any or all of which can carry driving voltages, and/or signals, or both (e.g., a DC driving voltage and a voltage variation superimposed on the DC driving voltage). FIG. 44 shows a side-view cutaway to show a technique to use the magnets to form an electrical contact while simultaneously providing an attractive force to position the accessory over the lamp base or heat sink, or inner core.

As shown, an accessory is in contact with the lens periphery using border magnets. As shown, the first accessory hosts active functions, one of which is a wireless device (e.g., WiFi, Bluetooth, etc.). The accessory may include an icon (e.g., the wireless icon 1302, as shown).

Figure 36:
FIG. 36 depicts a selection of views of a PAR lamp having an attachment about the periphery of a PAR lamp face as used for hosting active accessories, according to one embodiment.

FIG. 36 depicts a selection of views 1400 of a PAR lamp having an attachment about the periphery of a PAR lamp face as used for hosting active accessories.

The views of FIG. 36 depict a PAR lamp comprising a lens having a periphery with a first magnet attached to the periphery of the lens. An accessory is in contact with the lens periphery using the magnet. As shown, the first accessory hosts active functions, one of which is a zone ID indicator.

Figure 37:
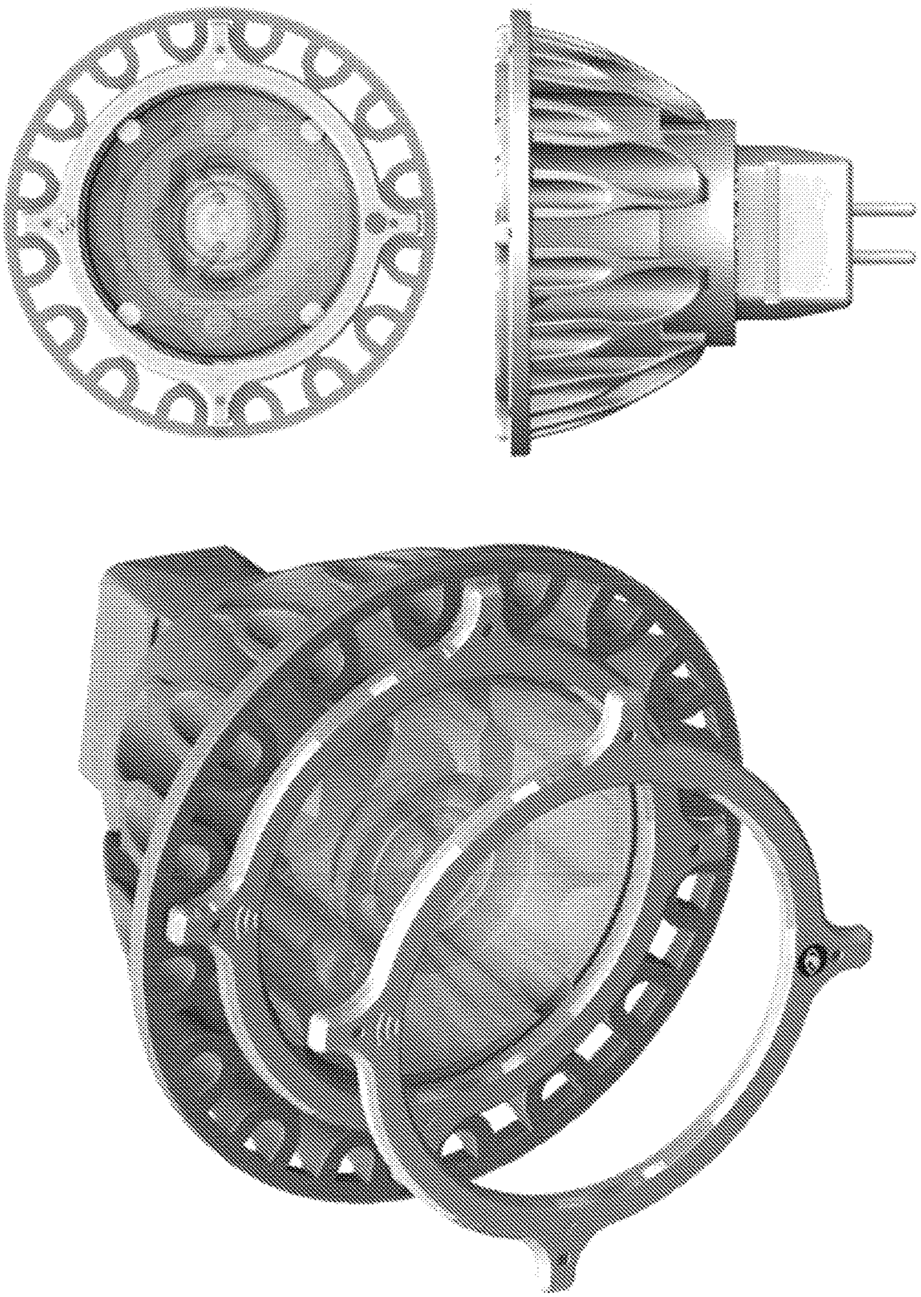
FIG. 37 depicts a selection of views of an MR-16 lamp having an auto-centering attachment positioned about the periphery of an MR-16 lamp face as used for hosting active accessories, according to one embodiment.

FIG. 37 depicts a selection of views 1500 of an MR-16 lamp having an auto-centering attachment positioned about the periphery of an MR-16 lamp face as used for hosting active accessories.

The views depict an MR-16 lamp comprising a lens having an inner periphery with a first magnet attached to the inner periphery of the lens. A first accessory is disposed to be in contact with the lens periphery using the magnet. As shown, the first accessory hosts active functions, one of which is a wireless device (e.g., WiFi, Bluetooth, etc.). The second accessory is disposed in contact with the first accessory. As shown, the second accessory hosts active functions, one of which is a wireless device (e.g., WiFi, Bluetooth, etc.).

Figure 38:
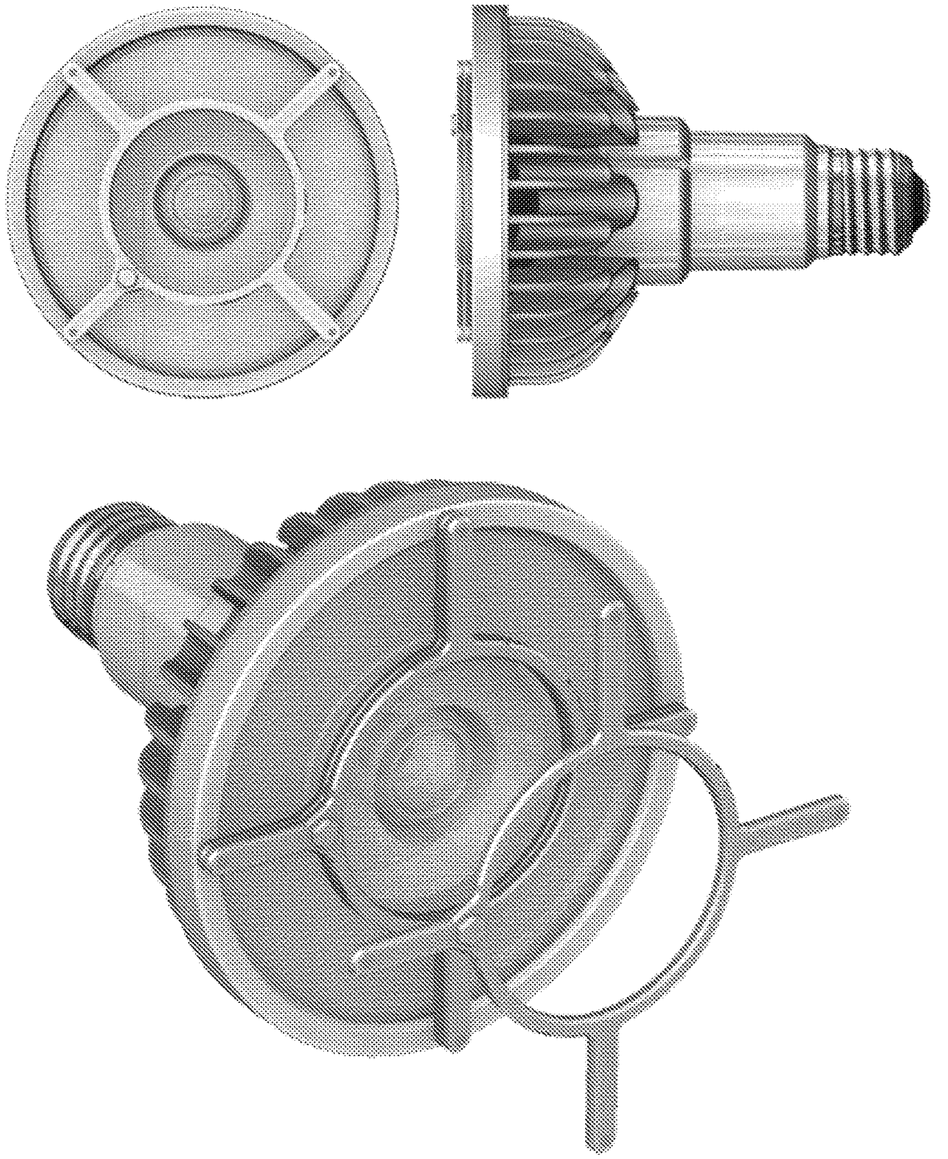
FIG. 38 depicts a selection of views of an PAR lamp having periphery attachment points positioned about the periphery of a PAR lamp face as used for hosting active accessories, according to one embodiment.

FIG. 38 depicts a selection of views 1600 of a PAR lamp having periphery attachment points positioned about the periphery of a PAR lamp face as used for hosting active accessories.

The views depict a PAR lamp comprising a lens having an inner periphery with a first magnet attached to the inner periphery of the lens. A first accessory is disposed to be in contact with the lens periphery using the magnet. As shown, the first accessory hosts active functions, one of which is a zone ID. The second accessory is disposed in contact with the first accessory. As shown, the second accessory hosts active functions, one of which is a pressure sensor.

Figure 39:
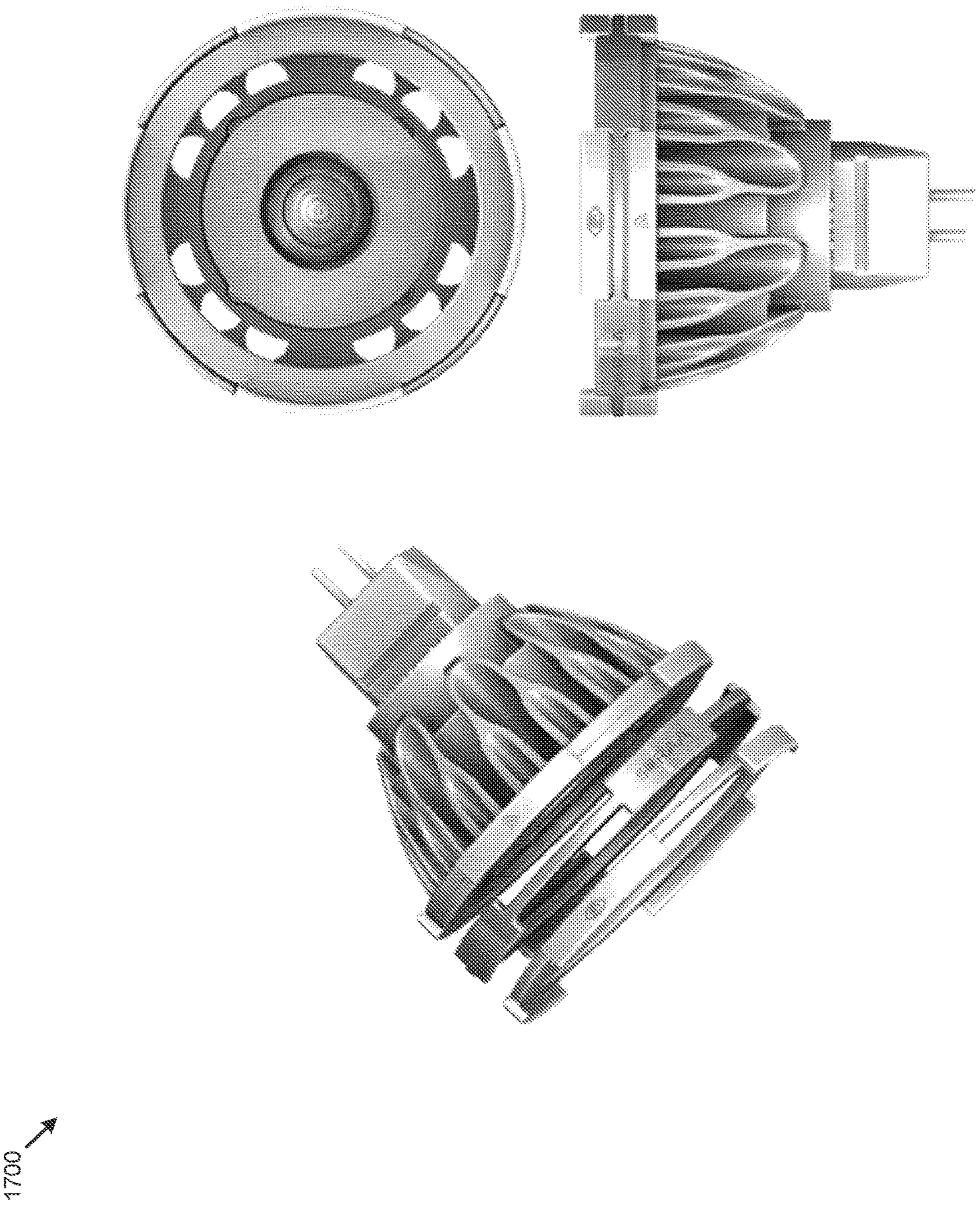
FIG. 39 depicts a selection of views of an MR-16 lamp having keyed attachment points positioned about the periphery of an MR-16 lamp face as used for hosting active accessories, according to one embodiment.

FIG. 39 depicts a selection of views 1700 of an MR-16 lamp having keyed attachment points positioned about the periphery of an MR-16 lamp face as used for hosting active accessories.

As shown, a second accessory is keyed to mate into a first accessory in pre-determined juxtaposition, and the first accessory is keyed to mate into an MR-16 lens or housing in pre-determined juxtaposition.

Figure 40:
FIG. 40 depicts a selection of views of a PAR lamp having keyed attachment points positioned about the periphery of a PAR lamp face as used for hosting active accessories, according to one embodiment.

FIG. 40 depicts a selection of views 1800 of a PAR lamp having keyed attachment points positioned about the periphery of a PAR lamp face as used for hosting active accessories.

As shown, a second accessory is keyed to mate into a first accessory in pre-determined juxtaposition, and the first accessory is keyed to mate into a PAR lens or housing in pre-determined juxtaposition.

Figure 41:
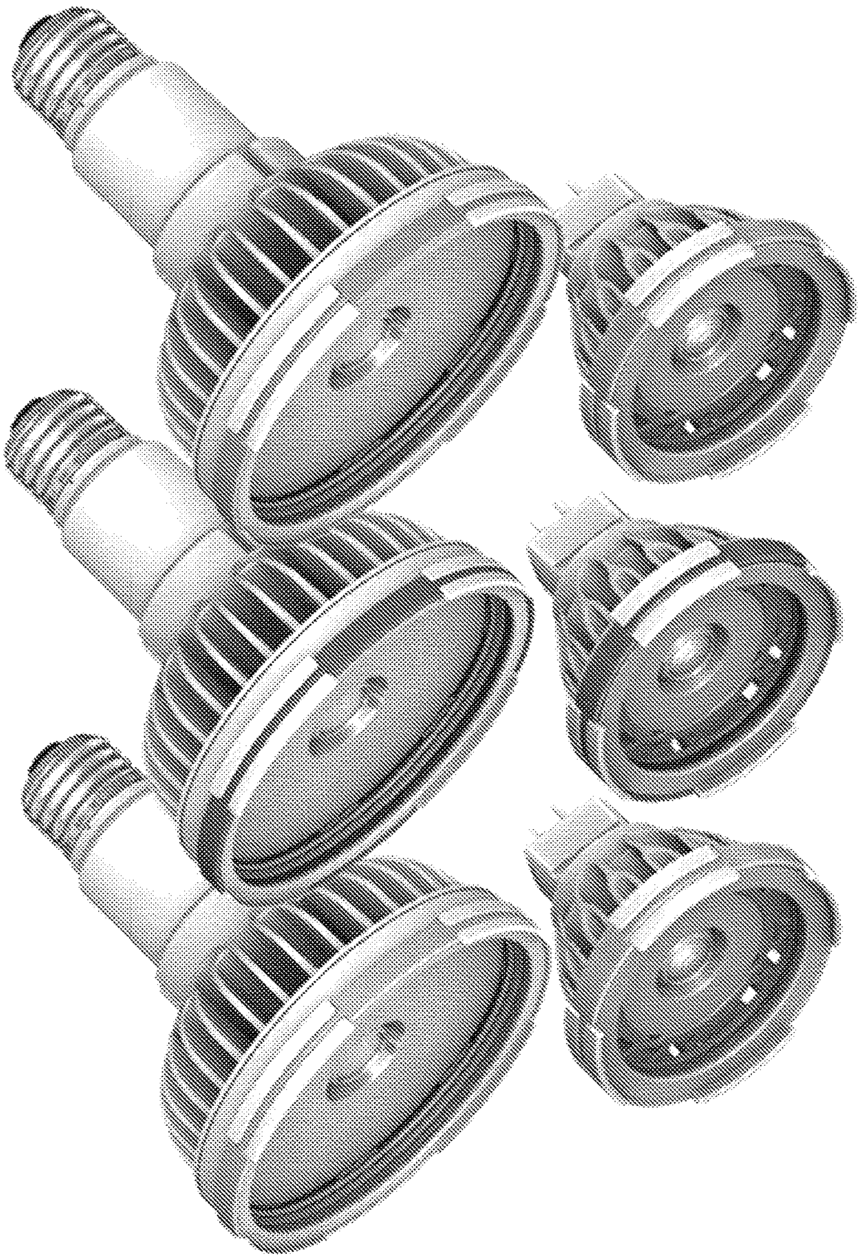
FIG. 41 depicts a selection of views of a PAR lamp having color-coded keyed attachment points positioned about the periphery of a PAR lamp face as used for hosting active accessories, according to one embodiment.

FIG. 41 depicts a selection of views 1900 of a PAR lamp having color-coded keyed attachment points positioned about the periphery of a PAR lamp face as used for hosting active accessories.

As shown, a second accessory is color-coded and is keyed to mate into a first accessory in pre-determined juxtaposition, and the first accessory is also color-coded and keyed to mate into a PAR lens or housing in pre-determined juxtaposition.

Figure 42:
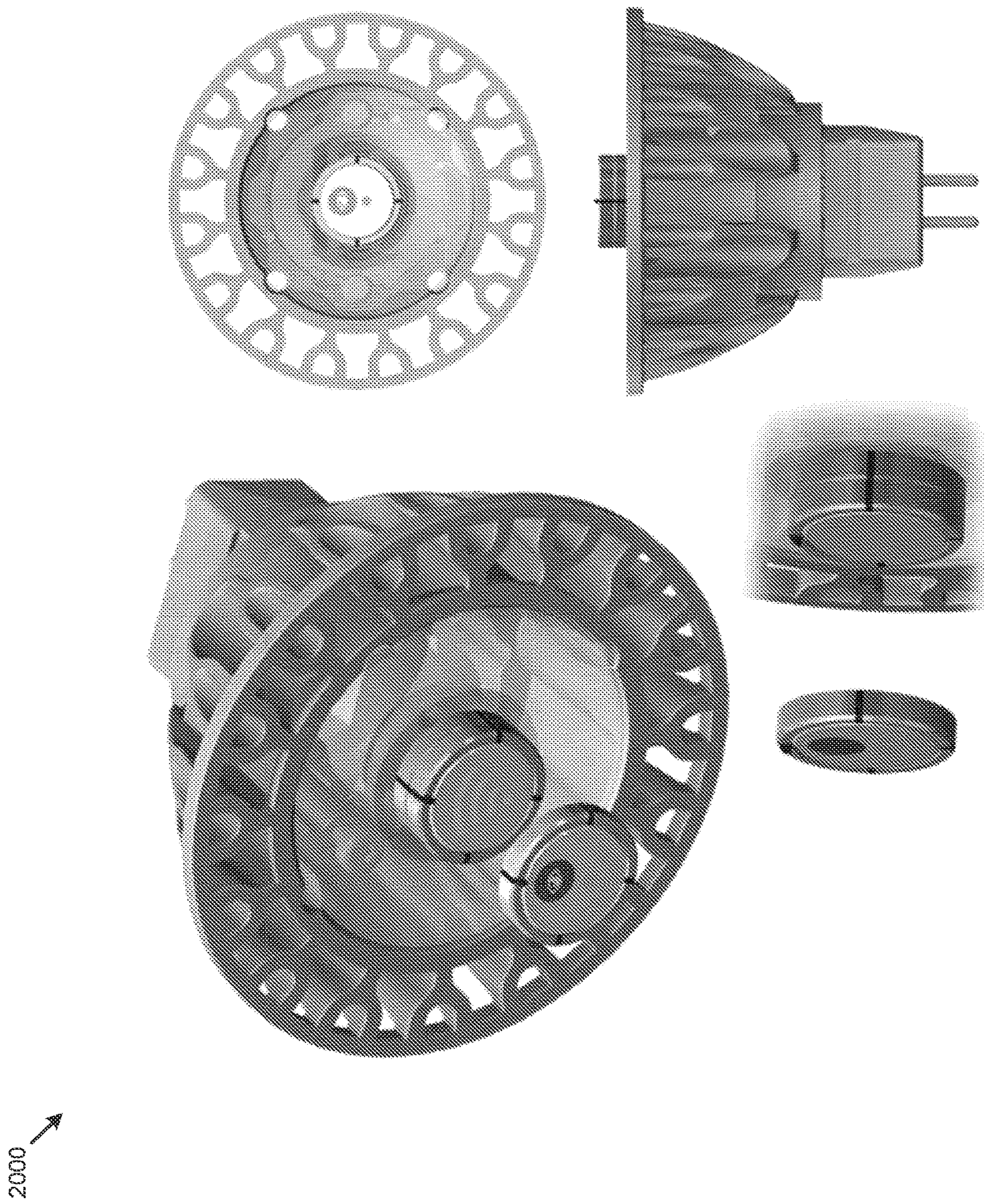
FIG. 42 depicts a selection of views of an MR-16 lamp having zone ID glare blocker for use on a lamp face as used with active accessories, according to one embodiment.

FIG. 42 depicts a selection of views 2000 of an MR-16 lamp having zone ID glare blocker for use on a lamp face as used with active accessories.

Figure 43:
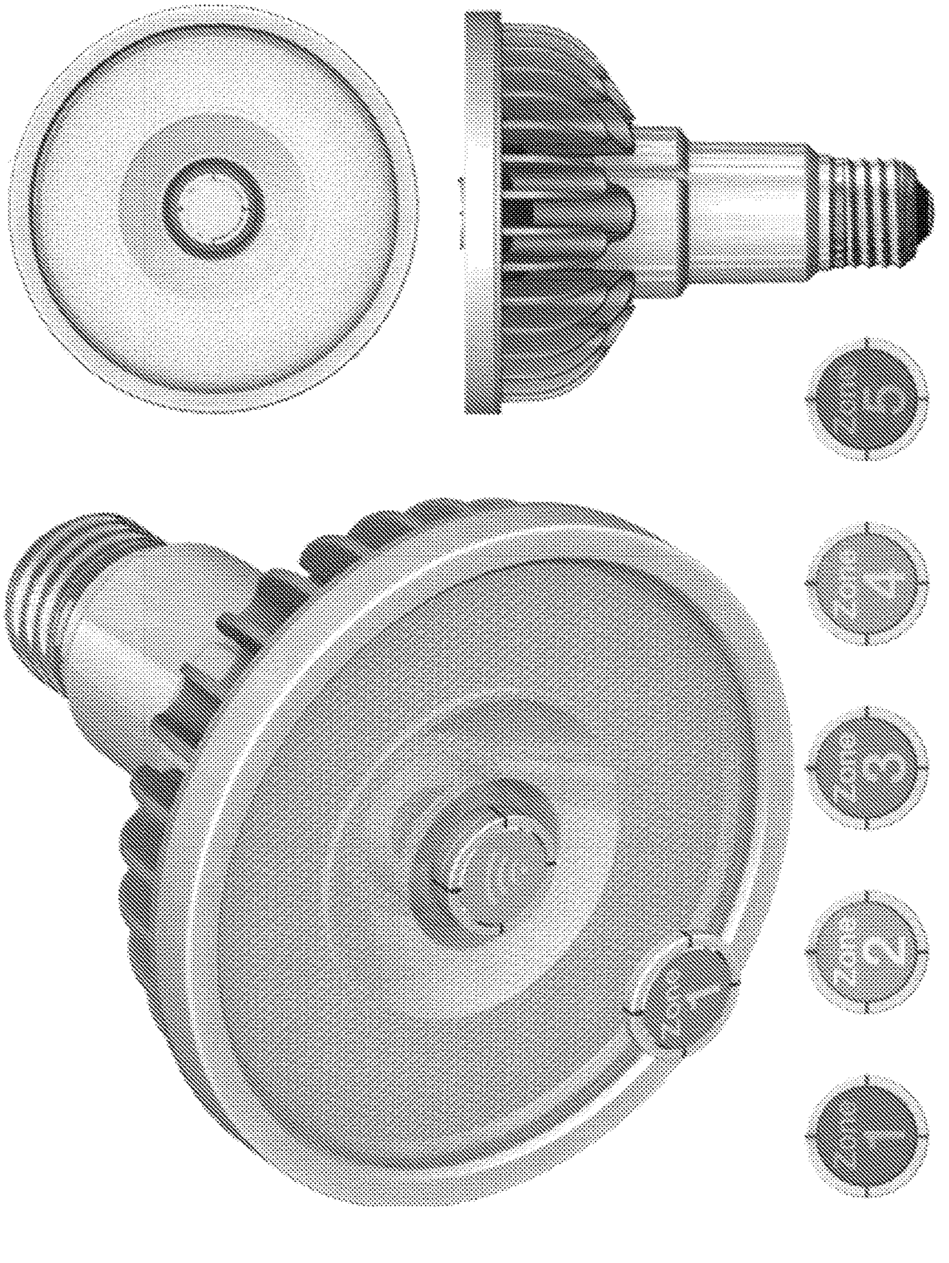
FIG. 43 depicts a selection of views of a PAR lamp having zone ID glare blockers for positioning on a lamp face as used with active accessories, according to one embodiment.

FIG. 43 depicts a selection of views 2100 of a PAR lamp having zone ID glare blockers for positioning on a lamp face as used with active accessories.

The views of FIG. 43 depict color-coded zone ID glare blockers.

Combinations of a plurality of magnets and glare blockers can be found in various embodiments. The following embodiments are presented, strictly as examples:

In certain embodiments, a light emitting diode (LED) lamp comprises: a lens having a periphery; a first magnet attached to the periphery of the lens; and a first accessory wherein the first accessory is in contact with a periphery of the lens using the magnet; and wherein the first accessory comprises at least one active function.

In certain embodiments of an LED lamp, the active function comprises a motion sensor.

In certain embodiments of an LED lamp, the active function comprises a smoke sensor.

In certain embodiments of an LED lamp, the active function comprises a gas presence sensor.

In certain embodiments of an LED lamp, the active function comprises a temperature sensor.

In certain embodiments of an LED lamp, the active function comprises a pressure sensor.

In certain embodiments of an LED lamp, the active function comprises an ambient light sensor.

In certain embodiments of an LED lamp, the active function comprises a sound sensor.

In certain embodiments of an LED lamp, the active function comprises a left speaker.

In certain embodiments of an LED lamp, the active function comprises a right speaker.

In certain embodiments of an LED lamp, the active function comprises a mood light.

In certain embodiments of an LED lamp, the lamp further comprises a second accessory having a second magnet wherein the first magnet and the second magnet are configured to retain the first accessory against the second accessory.

In certain embodiments of an LED lamp, the first magnet and the second magnet are configured to mate with the perimeter of the lens.

In certain embodiments of an LED lamp, the first accessory has a diameter that is substantially equal to a diameter of the lens.

E In certain embodiments of an LED lamp, the first accessory has a diameter that is equal to a diameter of the lens.

In certain embodiments of an LED lamp, the first accessory has a diameter that substantially covers an optical region of the lens.

In certain embodiments of an LED lamp, the lens is configured to attach to an MR16 lamp.

In certain embodiments of an LED lamp, the second accessory is selected from a diffuser, a color filter, a polarizer, a linear dispersion element, a baffle, and a combination of any of the foregoing In certain embodiments of an LED lamp, the first magnet and the first accessory have a combined thickness less than 1 mm.

In certain embodiments of an LED lamp, the lens comprises a folded total internal reflection lens.

In certain embodiments of an LED lamp, the lamp is characterized by a lamp output mechanical aperture; and the lens is configured to cover more than 90% of the lamp output mechanical aperture.

In certain embodiments of an LED lamp, the LED lamp of embodiment 1, further comprising a second accessory having a magnet disposed about a center of the second accessory.

In certain embodiments of an LED lamp, second accessory comprises a third magnet, wherein the third magnet is attached to the center of the second accessory.

In certain embodiments, an apparatus for providing active accessories in a light emitting diode (LED) lamp, comprises: an LED illumination product having a lens and a housing; at least one electronic component disposed within the housing; at least two electrical conductors electrically-connected to the at least one electrical component, the at least two electrical conductors disposed within a rigid member affixed to the lens; and a first accessory wherein the first accessory is in contact with the lens using a magnet and wherein the first accessory comprises at least one active function.

In certain embodiments of an apparatus, the rigid member accepts a USB connector.

In certain embodiments of an apparatus, the rigid member is made of a magnetic material.

In certain embodiments of an apparatus, the rigid member is affixed to the lens with an adhesive.

In certain embodiments of an apparatus, the rigid member is affixed to a periphery of the lens using a mechanical connector.

In certain embodiments of an apparatus, the rigid member is affixed to a center of the lens using a mechanical connector.

In certain embodiments, a light emitting diode (LED) lamp comprises: a lens having a periphery; a first magnet attached to the periphery of the lens; a first accessory wherein the first accessory is in contact with a periphery of the lens using the magnet; and wherein the first accessory comprises at least one first active function; and a second accessory wherein the second accessory is in contact with the first accessory and wherein the second accessory comprises at least one second active function.

In certain embodiments of an LED lamp, the first active function comprises a zone ID and the second active function comprises a wireless device.

In certain embodiments of an apparatus, the first active function comprises a color-coded zone ID and the second active function comprises a wireless device.

In certain embodiments of an apparatus, the first active function comprises a zone ID and the second active function comprises a Bluetooth wireless device.

In certain embodiments of an apparatus, the first active function comprises a zone ID and the second active function comprises a WiFi wireless device.

In certain embodiments of an apparatus, the first active function comprises a zone ID and the second active function comprises a smoke sensor.

In certain embodiments of an apparatus, the first active function comprises a zone ID and the second active function comprises an ambient light sensor.

In certain embodiments of an apparatus, the first active function comprises a zone ID and the second active function comprises a seismic sensor.

In certain embodiments of an apparatus, the first active function comprises a zone ID and the second active function comprises a gas presence sensor.

In certain embodiments of an apparatus, the first active function comprises a zone ID and the second active function comprises a wireless device.

In certain embodiments of an apparatus, the first active function comprises a zone ID and the second active function comprises a pressure sensor.

FIG. 44 depicts a side side-view cutaway to show use of two or more magnets to form an electrical contact. As shown, a first border magnet (e.g., magnet B 2204) is embedded in a lamp housing 2210. A second border magnet (e.g., magnet A 2202) is embedded in an accessory. A first electrical lead 22081 carries current, and a second electrical lead 22022 also carries a current. When first border magnet is in contact with second border magnet (e.g. at the point shown as contact region 2206) current can be carries through first border magnet to second border magnet and through electrical leads, and the current can be used to provide power to an active accessory.

Finally, it should be noted that there are alternative ways of implementing the embodiments disclosed herein. Accordingly, the present embodiments are to be considered as illustrative and not restrictive, and the claims are not to be limited to the details given herein, but may be modified within the scope and equivalents thereof.

What is claimed is:

1. A light emitting diode (LED) lamp comprising:

a lens having a light emitting surface for emitting first light, the lens having a center;

an accessory disposed on the lens, the accessory comprising a thin, optically transparent film, sheet, or plate having optical features configured to beam shape said first light and convert said first light to second light having a beam profile different from said first light; and an attachment mechanism comprising a first magnet attached to the center of the lens and a second magnet attached to the center of the accessory, the first magnet and the second magnet being configured to releasably retain the accessory against the lens.

2. An accessory for a light emitting diode (LED) lamp, said LED lamp having a lens having a light emitting surface for emitting first light and having a center, said accessory comprising:

a thin, optically transparent film, sheet, or plate comprising optical features to beam shape said first light and convert said first light to second light having a beam profile different from said first light; and an attachment mechanism comprising a magnet attached to a center of the accessory and configured to magnetically couple with a magnet attached to the center of the lens to releasably retain the accessory against the lens.

* * * * *